US012646852B2

(12) United States Patent
Lafontaine et al.

(10) Patent No.: US 12,646,852 B2
(45) Date of Patent: Jun. 2, 2026

(54) HIGHLY EFFICIENT PARABOLIC ANTENNA CONFIGURED WITH CORRECTIVE META SURFACE STRUCTURE

(71) Applicant: TELTRIUM, Inc., Greenbelt, MD (US)

(72) Inventors: Richard Lafontaine, Bethesda, MD (US); Yiru Zhou, Potomac, MD (US); Ryan Kian, Sterling, VA (US)

(73) Assignee: Teltrium, Inc., Greenbelt, MD (US)

( * ) Notice: Subject to any disclaimer, the term of this patent is extended or adjusted under 35 U.S.C. 154(b) by 58 days.

(21) Appl. No.: 18/639,215

(22) Filed: Apr. 18, 2024

(65) Prior Publication Data

US 2024/0356235 A1 Oct. 24, 2024

Related U.S. Application Data

(60) Provisional application No. 63/496,778, filed on Apr. 18, 2023.

(51) Int. Cl.
*H01Q 15/16* (2006.01)
*H01Q 15/00* (2006.01)

(52) U.S. Cl.
CPC ......... *H01Q 15/0053* (2013.01); *H01Q 15/16* (2013.01)

(58) Field of Classification Search
CPC .... H01Q 15/00; H01Q 15/0053; H01Q 15/14; H01Q 15/141; H01Q 15/16; H01Q 19/023; H01Q 19/132
See application file for complete search history.

(56) References Cited

U.S. PATENT DOCUMENTS

| | | | | |
|---|---|---|---|---|
| 10,931,252 | B2 * | 2/2021 | Stevens | H01P 1/20381 |
| 12,166,297 | B1 * | 12/2024 | Tianang | H01Q 15/16 |
| 2021/0044748 | A1 * | 2/2021 | Hu | G02B 13/06 |
| 2021/0384638 | A1 * | 12/2021 | Chan | H01Q 13/02 |
| 2023/0318188 | A1 * | 10/2023 | Cui | H01Q 19/108 |
| 2024/0195062 | A1 * | 6/2024 | Seo | H01Q 13/106 |
| 2024/0222876 | A1 * | 7/2024 | Yang | H01Q 3/14 |

* cited by examiner

*Primary Examiner* — Thai Pham
(74) *Attorney, Agent, or Firm* — Rosenberg, Klein & Lee

(57) ABSTRACT

Corrective meta surface lens is used to reduce the illumination and spill-over losses and improve the overall efficiency of a parabolic antenna when is horn-mounted, and/or top-mounted, and/or deposited directly on the frontal reflector surface of the parabolic antenna. For the horn-mounted model, a meta surface lens is placed in front of or in the aperture of the feed horn to reduce side lobe level, which results in lower parabolic antenna spill-over losses and overall efficiency improvement by more than 40% (1.5 dB). For the top-mounted model, the meta surface lens is mounted on top of (or above) the parabolic reflector, which results in reduction in illumination losses, and greater than 70% (2.5 dB) efficiency. The meta surface lens has a wideband response, is lightweight and has a lattice structure which makes it a great candidate for withstanding wind forces.

31 Claims, 44 Drawing Sheets
(21 of 44 Drawing Sheet(s) Filed in Color)

HIGHLY EFFICIENT PARABOLIC ANTENNA CONFIGURED WITH CORRECTIVE META SURFACE STRUCTURE

REFERENCE TO RELATED PATENT APPLICATION(S)

This Utility patent Application is based on the Provisional Patent Application, Ser. No. 63/496,778 filed on Apr. 18, 2023.

FIELD OF INVENTION

The present invention is directed to parabolic antennas, and more in particular, to parabolic antennas exhibiting highly increased performance efficiency.

Even more in particular, the present invention addresses a parabolic antenna where the illumination loss and spill-over loss is drastically reduced by integrating a corrective meta surface lens with a parabolic antenna, where the meta surface lens can be mounted in front of the horn feed, in the aperture of the horn feed, in front or on the top of the reflector, or directly on the frontal surface of the reflector.

BACKGROUND OF THE INVENTION

Transmitting and receiving data from space-to-Earth or Earth-to-space is vital to space missions as well as for commercial industries which rely on satellite communications for numerous applications, such as, for example, data delivery from science and imagery satellites, direct-to-home broadcasting, internet to underserved areas, business connectivity, etc. Parabolic antennas are commonly used to support such services because of their performance-to-price ratio. Parabolic antennas are also widely used for terrestrial point-to-point applications such as microwave links.

The performance, or efficiency, of parabolic antennas is unfortunately sub-optimal, with typical efficiency values in the range of 50% to 65%. Illumination loss and spill-over loss are the two significant factors that reduce the overall efficiency of the antenna. Illumination loss is a product of both the non-uniformity of the Electric field (E-field) observed at the antenna's aperture and the impacts of the antenna feed not being a perfect single-point source. Spill-over loss is the radiation leak from the feed that falls outside the edge of the antenna's dish and is wasted, thus lowering gain, and causing back lobes.

Numerous efforts have been undertaken to improve the efficiency of a conventional parabolic antenna. Dual-reflector antennas such as Cassegrain (described in P. A. Dufilie, "A Ka-band Dual-Pol Mono-pulse Shaped Reflector Antenna", 2018 IEEE International Symposium on Antennas and Propagation & USNC/URSI National Radio Science Meeting, Boston, 2018) and Gregorian (described in R. L. a. D. I. L. d. Villiers, "Wideband Feed Performance Limits on Shaped and Unshaped Offset Gregorian Reflector Antennas", 13th European Conference on Antennas and Propagation (EuCAP), Krakow, 2019) were developed to provide higher antenna efficiency. Another solution for attaining an improved antenna radiation efficiency was suggested by using a corrugated horn feed to excite the parabolic reflector, as described in Y. Z. R. H. a. Z. Y. B. Zhu, "Design of A Multimode Corrugated Horn for Single Offset Reflector Antenna," International Conference on Microwave and Millimeter Wave Technology (ICMMT), Guangzhou, 2019. However, the afore-mentioned approaches require overly complicated structural modifications and cannot be applied to an already-deployed parabolic antenna. Improving the efficiency of existing parabolic antennas without exorbitantly increasing their price is highly desirable as the additional gain realized by the antenna can be leveraged to improve data throughput or to decrease the size, weight, and power (SWAP) burden on the user (fixed station or mobile station) without installation of entirely new antennas.

Both the illumination and spill-over losses can be translated into non-uniformity of the electric field (E-field) which can be observed on top of the antenna for the case of the illumination loss and at the aperture of the feed (e.g., horn antenna) in the case of the spill-over loss. Thus, by improving (i.e., compensating) the E-field non-uniformity to a close-to-uniform E-field aperture, a decreased loss may be attained, resulting in improvement of the overall efficiency of the antenna.

As presented in FIG. 1A, parabolic antenna 10 includes two main parts: (a) a parabolic reflector 12, and (b) a feed 14 which acts as a focal point. In transmission operation of the parabolic antenna 10, a signal/electromagnetic wave is provided to the antenna feed 14 and illuminates the parabolic reflector 12. Subsequently, the illuminated electromagnetic wave is reflected from the parabolic reflecting surface of the reflector 12 as a collimated wavefront. In receiving operation, a plane wave hits the aperture 12 and is reflected onto the feed point 14. When the electric field (E-field) is uniform in amplitude and phase across the aperture 12, and the feed 14 is an ideal source (i.e., a point source), the antenna 10 performs as an ideal parabolic antenna and achieves maximum gain.

However, an actual parabolic antenna never achieves the maximum theoretical gain of the ideal parabolic antenna due to different losses, including mainly a spill-over loss and an illumination loss, as reflected in FIG. 1B. Both losses can result in a flaw in the amplitude and phase distribution on the surface of interest.

It therefore would be highly desirable to provide a parabolic antenna where the aforementioned defect could be corrected to attain an improvement of the parabolic antenna efficiency.

Meta surfaces can be used in a variety of applications, including frequency selective surfaces (FSS), as presented in A. Kesavan, et al., "A Novel Wideband Frequency Selective Surface for Millimeter-Wave Applications," IEEE Antennas and Wireless Propagation Letters, vol. 15, pp. 1711-1714, 2016, antenna gain enhancement, as presented in Z. Szabó, "Antenna Gain Enhancement with Magnetic Meta surfaces," in 2020 23rd International Microwave and Radar Conference, 2020, phase shifters, electromagnetic cloacking, as presented in Y. Yang, et al., "A meta surface carpet cloak for electromagnetic, acoustic and water waves," Scientific Reports, vol. 6, 2016, as well as in reduced radar cross sections (RCS), as presented in Y. Pang, et al., "Wideband RCS Reduction Meta surface With a Transmission Window," IEEE Transactions on Antennas and Propagation, vol. 68, no. 10, pp. 7079-7087, 2020.

Meta materials are materials that are composed of periodic subwavelength metal/dielectric structures. When resonantly coupled to the electric and/or magnetic components of incident electromagnetic fields, metamaterials exhibit negative and near-zero refractive indices which can be corrected for phase and amplitude errors for uniform E-field distribution. It follows that a meta surface lens created from a single-layer or minimal-layer stack of planar metamaterial structures with subwavelength thickness can introduce a spatially varying electromagnetic response, molding wavefronts into shapes that can be designed at will in order to make corrections in the phase and amplitude response of a signal.

The concept of using a dielectric meta surface structure mounted in a specific manner relative to the parabolic antenna has not been considered for improving the operational parameters of parabolic antennas.

SUMMARY OF THE INVENTION

It is therefore an objective of the present invention to provide a parabolic antenna having improved efficiency where the imperfections in the electromagnetic filed phase distribution are compensated.

It is another objective of the present invention to provide a parabolic antenna designed with all dielectric meta surface to improve the efficiency of the parabolic antenna.

It is a further objective of the present invention to provide a highly efficient parabolic antenna where the illumination loss is reduced by mounting a dielectric meta surface structure over the parabolic antenna.

It is an additional objective of the present invention to provide a highly efficient parabolic antenna where the spill-over loss is reduced by mounting a dielectric meta surface structure on the aperture of the horn feed of the parabolic antenna.

In one aspect, the present invention addresses a highly efficient parabolic antenna, which comprises (a) a parabolically configured reflector member having a frontal parabolic reflecting surface, (b) a feed horn antenna suspended at a focal point of said frontal parabolic reflecting surface of the parabolically configured reflector member, and (c) a corrective meta surface structure secured at a predetermined position relative the parabolic antenna, where the predetermined position is selected from a group consisting of a position in front of the frontal parabolic reflecting surface of the parabolically configured reflector member, in front of the feed horn antenna, within the aperture of the feed horn antenna, and/or directly at the frontal parabolic reflecting surface of the parabolically configured reflector member.

One design option is for the corrective meta surface structure to consist of a number of unit cells interconnected with one another. In one embodiment, the unit cell includes a solid dielectric cubically shaped member optionally surrounded by air. The cubically shaped member may be fabricated from at least one dielectric material, where the size of a rib at the cubically shaped member ranges from 1.5 m to 10 mm.

In another embodiment, each unit cell has a gyroid configuration fabricated from at least one dielectric material to create a predetermined air-to-dielectric ratio, wherein the gyroid configuration has an infinitely connected triply periodic minimal surface having a zero mean curvature.

In another alternative implementation, the unit cell may have a meshed structure with a plurality of mesh pores, each mesh pore having a size of 0.1 mm in X-Y-Z directions. The corrective meta surface structure (lens) includes an array of the meshed unit cells fabricated by 3D printing.

Each unit cell may be fabricated from a single dielectric material, multiple dielectric materials, combination of at least one dielectric material and a conductive material including copper, gold, silver, aluminum, and combination thereof.

A support member may be used to position the corrective meta surface structure at predetermined location relative to the reflector member. The support member may be configured with a bottom ring, a top ring, and a plurality of spacers secured between the bottom and top rings to maintain the bottom and top rings at a predetermined spaced apart configuration. In use, the bottom ring is secured to the parabolically configured reflector member at its frontal side, while the corrective meta surface structure is secured to the top ring of the support member.

The corrective meta surface structure may include an array of meta surface cell units fabricated with a polymer, including at least one of a plastic, a thermoplastic, an amorphous polymer, and acrylo-nitrile butadiene styrene (ABS), and alternatively a metallization layer deposited on the polymer, where the metallization layer may be fabricated from at least one of copper, silver, aluminum, gold, platinum, palladium, and steel.

Each unit cell may be configured as a gyroid configuration, a cube, a cone, etc. The corrective meta surface structure may have a rectangular configuration, a curved configuration, an annular configuration, etc. The corrective meta surface structure may be formed as a singular-layer structure, or as a multi-layer structure.

In another aspect, the present invention addresses a method of improving the efficiency of a parabolic antenna. The subject method includes the steps of: (a) fabricating a parabolic antenna with a parabolically configured reflector member having a frontal parabolic reflecting surface and a feed horn antenna suspended at a focal point of the parabolically configured reflector member, and (b) fabricating and securing a corrective meta surface structure at a predetermined position relative the parabolic antenna, where the predetermined position may be the position in front of the frontal parabolic reflecting surface of the parabolically configured reflector member, and/or in front of the feed horn antenna, and/or within the aperture of the feed horn antenna, and/or directly at the frontal parabolic reflecting surface of the parabolically configured reflector member.

The subject method assumes fabrication of the corrective meta surface structure (lens) with a plurality of unit cells interconnected with one another, where each unit cell is fabricated as (a) solid dielectric cubically shaped member optionally surrounded by air, where the cubically shaped member is fabricated from at least one dielectric material, and where a size of a rib at said cubically shaped member ranges from 1.5 m to 10 mm, as (b) gyroid configuration fabricated from at least one dielectric material to create a predetermined air-to-dielectric ratio, where the predetermined air-to-dielectric ratio defines an effective dielectric constant (DK) of the unit cell, the DK ranging from 1.75 to 3, as (c) meshed structure of at least one dielectric material with a plurality of mesh pores, where each mesh pore may have a size of 0.1 mm in X-Y-Z directions and various shapes, such as, for example, rectangular, hexagonal, a circular, oval, etc.

The dielectric material for fabrication of the unit cell may include a polymer, such as, for example, a plastic, a thermoplastic, an amorphous polymer, and acrylo-nitrile butadiene styrene (ABS), Rogers© radix 49 material having a dielectric constant of 4.9 and a tangent loss of 0.002, Zetamix ε material having a dielectric constant of 7.5 and tangent loss of 0.0015, etc. The unit cell from Zetamix ε filament at a printing speed of 9 mm/sec by Fused Deposition Modeling (FDM), wherein the Zetamix ε filament is a ceramic dielectric filament including 40-90% Titanium Dioxide ($TiO_2$). 34. The unit cell may be fabricated from a single dielectric material, multiple dielectric materials, combination of at least one dielectric material and a conductive material including copper, gold, silver, aluminum, and combination thereof. A metallization layer may be deposited on the polymer, where the metallization layer may be fabricated from copper, silver, aluminum, gold, platinum, palladium, steel, etc.

The meta surface structure may be fabricated by arraying a plurality of the cell units with one another by 3D printing, or PCB process. The corrective meta surface structure may have a rectangular configuration, a curved configuration, an annular configuration, a singular-layer configuration, or a multi-layer configuration.

These and other objectives and advantages of the present invention will become more apparent when considered in view of further description of the Preferred Embodiment(s) with the accompanying Patent Drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 41A-41B are holograms representative of the realized gain 3D pattern at 5.85 GHz for the parabolic antenna without the meta surface (FIG. 42A) and for the subject parabolic antenna with the meta surface (FIG. 42B);

DETAILED DESCRIPTION OF THE PREFERRED EMBODIMENT(S) OF THE PRESENT INVENTION

Figure 1A:
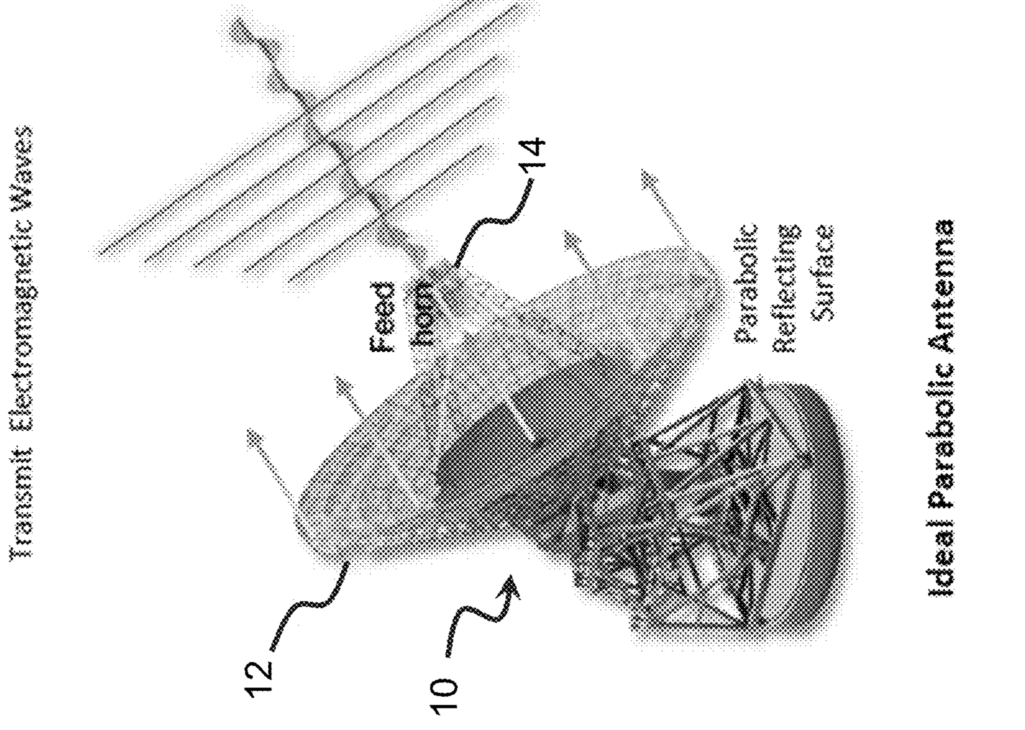
FIG. 1A Prior Art
FIGS. 1A-1B reflect a conceptual illustration of a prior art ideal parabolic antenna without losses (FIG. 1A) and realistic implementation of the prior art parabolic antenna with losses and reduced efficiency (FIG. 1B)
Figure 1B:
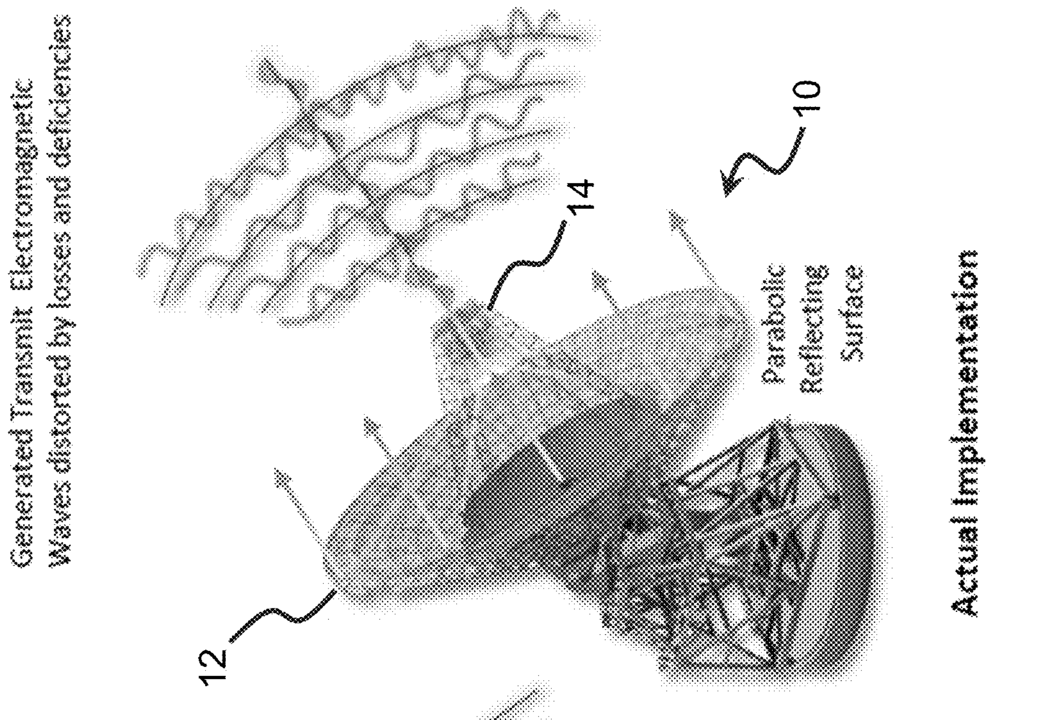
FIG. 1B Prior Art

Represented in FIGS. 1C-1F, is the subject parabolic antenna 20 which includes a parabolic reflector 22 and feed horn 24 positioned along the axis and in focus of the parabolic reflector 22. The parabolic reflector 22 has a parabolically curved surface with the cross-sectional shape of a parabola to direct the radio waves. The most common form is shaped like a dish with an internal (frontal) parabolically shaped reflecting surface 23. The main advantage of a parabolic antenna is that it has high directivity. It functions to direct radio waves in a narrow beam, or receive radio waves from one particular direction only. Parabolic antennas have some of the highest gains, meaning that they can produce the narrowest beam widths, of any antenna type. In order to achieve narrow beamwidths, the parabolic reflector must be much larger than the wavelength of the radio waves used, so parabolic antennas are used in the high frequency part of the radio spectrum, at UHF and microwave (SHF) frequencies, at which the wavelengths are small enough that conveniently sized reflectors can be used.

The operating principle of a parabolic antenna is that a point source of radio waves at the focal point in front of a paraboloidal reflector of conductive material will be reflected into a collimated plane wave beam along the axis 25 of the reflector. Conversely, an incoming plane wave parallel to the axis will be focused to a point at the focal point. The reflector 22 has a metallic surface 23 formed into a paraboloid of revolution and usually truncated in a circular rim that forms the diameter of the antenna. In a transmitting antenna, radio frequency current from a transmitter is supplied through a transmission line cable to the feed antenna, which converts it into radio waves. The radio waves are emitted back toward the dish by the feed antenna and reflect off the dish into a parallel beam. In a receiving antenna the incoming radio waves bounce off the dish and are focused to a point at the feed antenna, which converts them into electric currents which travel through a transmission line to the radio receiver.

A small feed antenna (also referred to herein as a feed horn) 24 is suspended in front of the reflector 22 at its focus, pointed back toward the reflector. The feed antenna at the reflector's focus is typically a low-gain type, such as a half-wave dipole or (more often) a small horn antenna. Alternatively, a secondary reflector may be used to direct the energy into the parabolic reflector from a feed antenna located away from the primary focal point. The feed antenna 24 is connected to the associated radiofrequency (RF) transmitting or receiving equipment by means of a coaxial cable transmission line or waveguide.

At the microwave frequencies used in many parabolic antennas, a waveguide is required to conduct the microwaves between the feed antenna and transmitter or receiver. Because of the high cost of waveguide runs, in many parabolic antennas the RF front end electronics of the receiver may be located at the feed antenna, and the received signal is converted to a lower intermediate frequency (IF) so it can be conducted to the receiver through a cheaper coaxial cable. Similarly, in transmitting dishes, the microwave transmitter may be located at the feed point.

An advantage of parabolic antennas is that most of the structure of the antenna (all of it except the feed antenna) is non-resonant, so it can function over a wide range of frequencies (i.e., at a wide bandwidth). All that is necessary to change the frequency of operation is to replace the feed antenna with one that operates at the desired frequency. In order to transmit or receive at multiple frequencies, the parabolic antenna may be provided with several feed antennas mounted at the focal point, close together.

The system and method presented herein have been designed to improve performance, i.e., to increase the efficiency of parabolic antennas which typically is sub-optimal and disadvantageously ranges between 50% and 65%, depending on the specific design of the parabolic dish 22 and the feed antenna 24.

Two dominant losses are known to reduce the parabolic antenna efficiency, i.e., (a) the illumination loss and (b) the spill over loss. Illumination loss is a product of both the non-uniformity of the electric field (E-field) observed at the aperture and the impacts of the antenna feed not being a perfect single-point source. Spillover loss is radiation from the feed that falls outside the dish's edge and is wasted, lowering gain, and causing back lobes.

Two different approaches have been proposed herein to reduce the aforementioned losses and to improve the overall efficiency of the parabolic antenna, including (a) the horn-mount meta surface lens and (b) the top-mount corrective meta surface lens. For these two approaches, a series of Computer Simulation Technology (CST) and MATLAB models were first developed to assess each concept performance. For the horn-mount meta surface lens model approach, a novel meta surface structure was placed in front of the feed horn 24 to reduce side lobe level, which resulted in lower parabolic antenna spill-over losses. The overall efficiency of the parabolic antenna has been improved by more than 40% (1.5 dB) by using the horn-mount meta surface lens.

For the meta surface structure mounted on top of (or over) the parabolic antenna, simulation results showed that greater than 70% (2.5 dB) efficiency improvement can be achieved by using the top-mount corrective meta surface lens.

The designed meta surface has a wideband response, is lightweight and has a lattice structure which makes it a great candidate for wind forces.

Figure 1D:
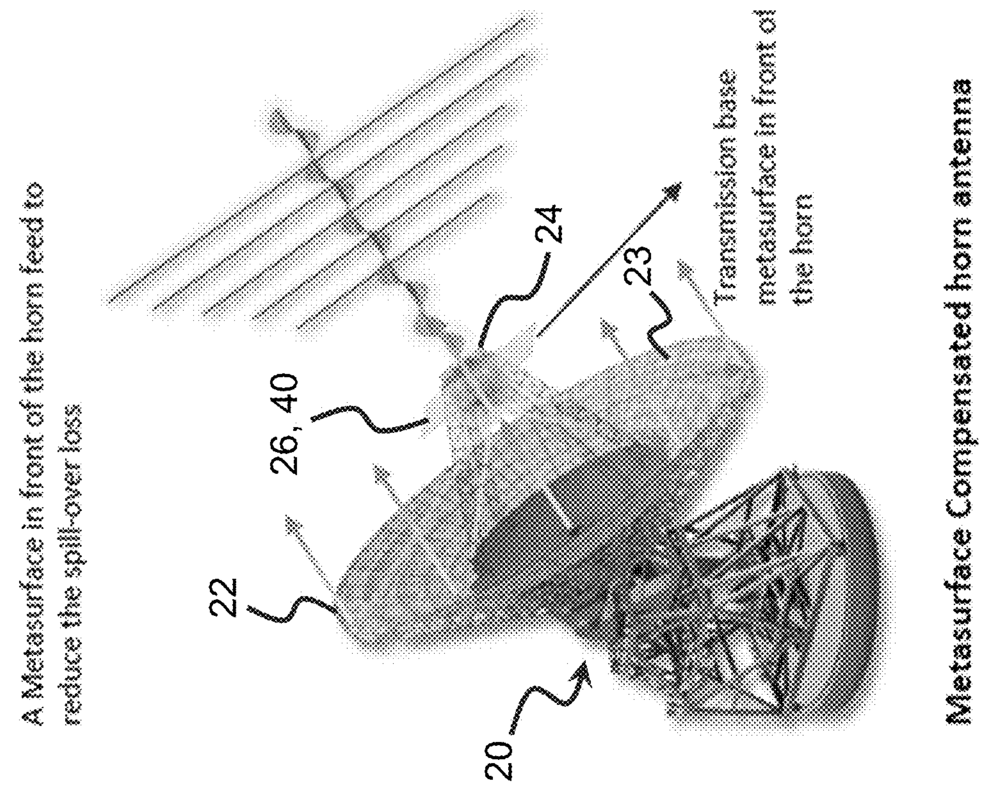
FIGS. 1C-1F depict a conceptual illustration of the subject parabolic antenna augmented with the meta surface structure mounted over the parabolic antenna (FIG. 1C) to reduce the illumination loss, the meta surface structure integrated on the aperture of the horn feed (FIG. 1D) to reduce the spill-over loss, the meta surface structure positioned at the reflection surface and a planar transmission meta surface structure (lens) mounted over the parabolic antenna depicting propagation of electromagnetic waves (FIG. 1E) to correct for losses and deficiencies, and a representation of the principles of attaining a higher power signal with the planar meta surface structure (FIG. 1F)
Figure 1C:
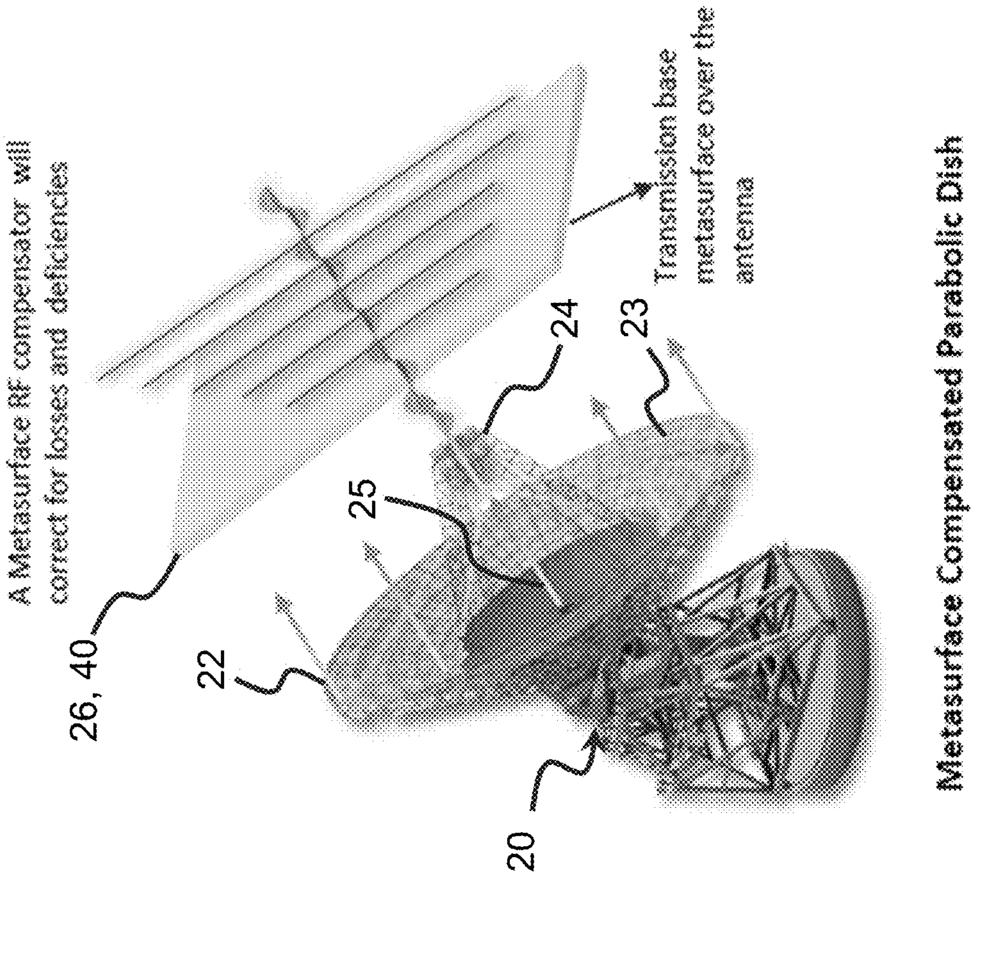
Figure 1E:
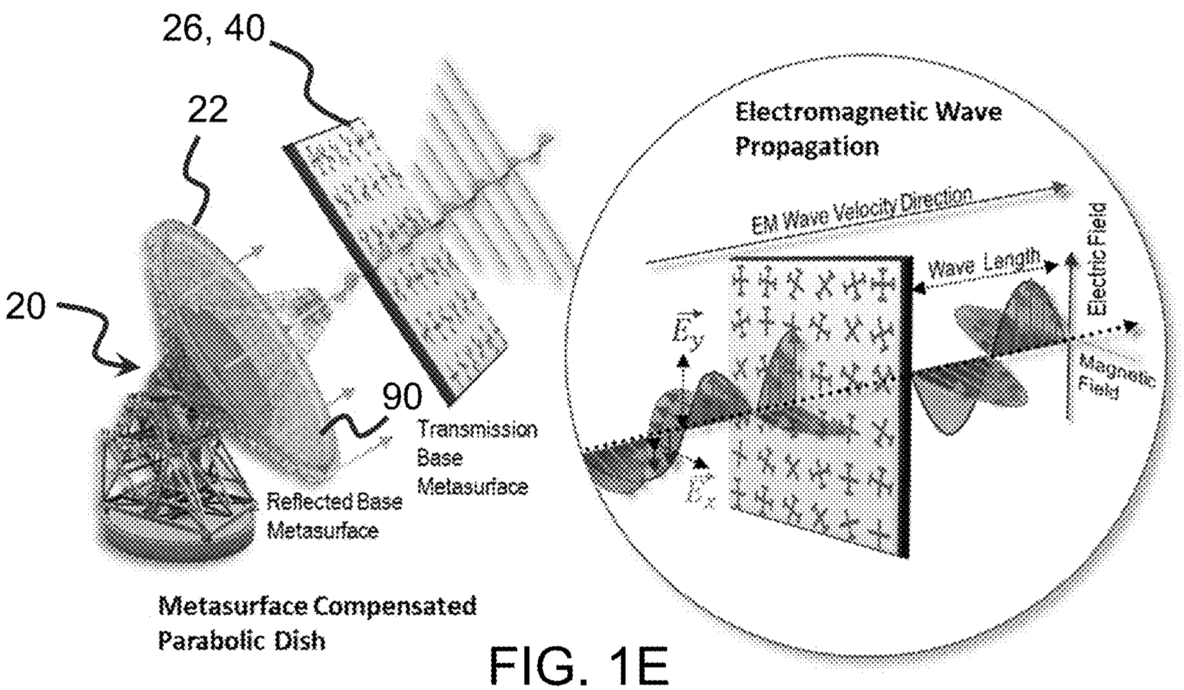
Figure 1F:
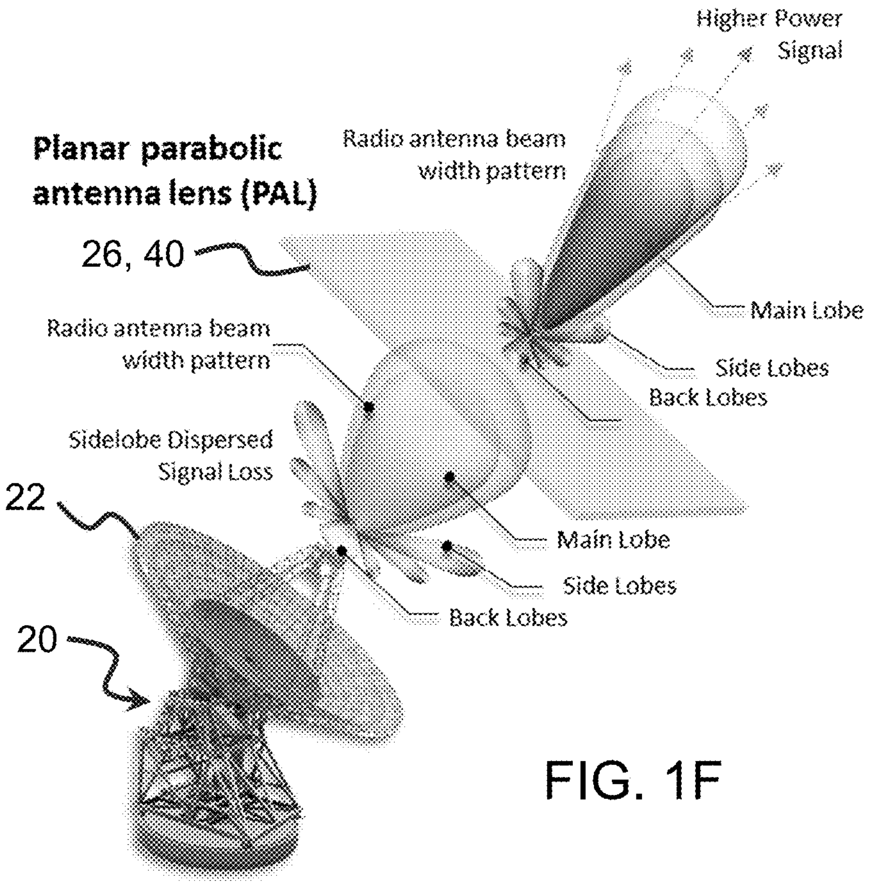

FIGS. 1C-1D and 1F detail the two afore-presented approaches to compensate any imperfection on the electric field phase distribution. A novel all dielectric meta surface structure 26 has been designed and optimized for both scenarios to improve the antenna efficiency, as will be detailed in the following paragraphs.

Figure 49:
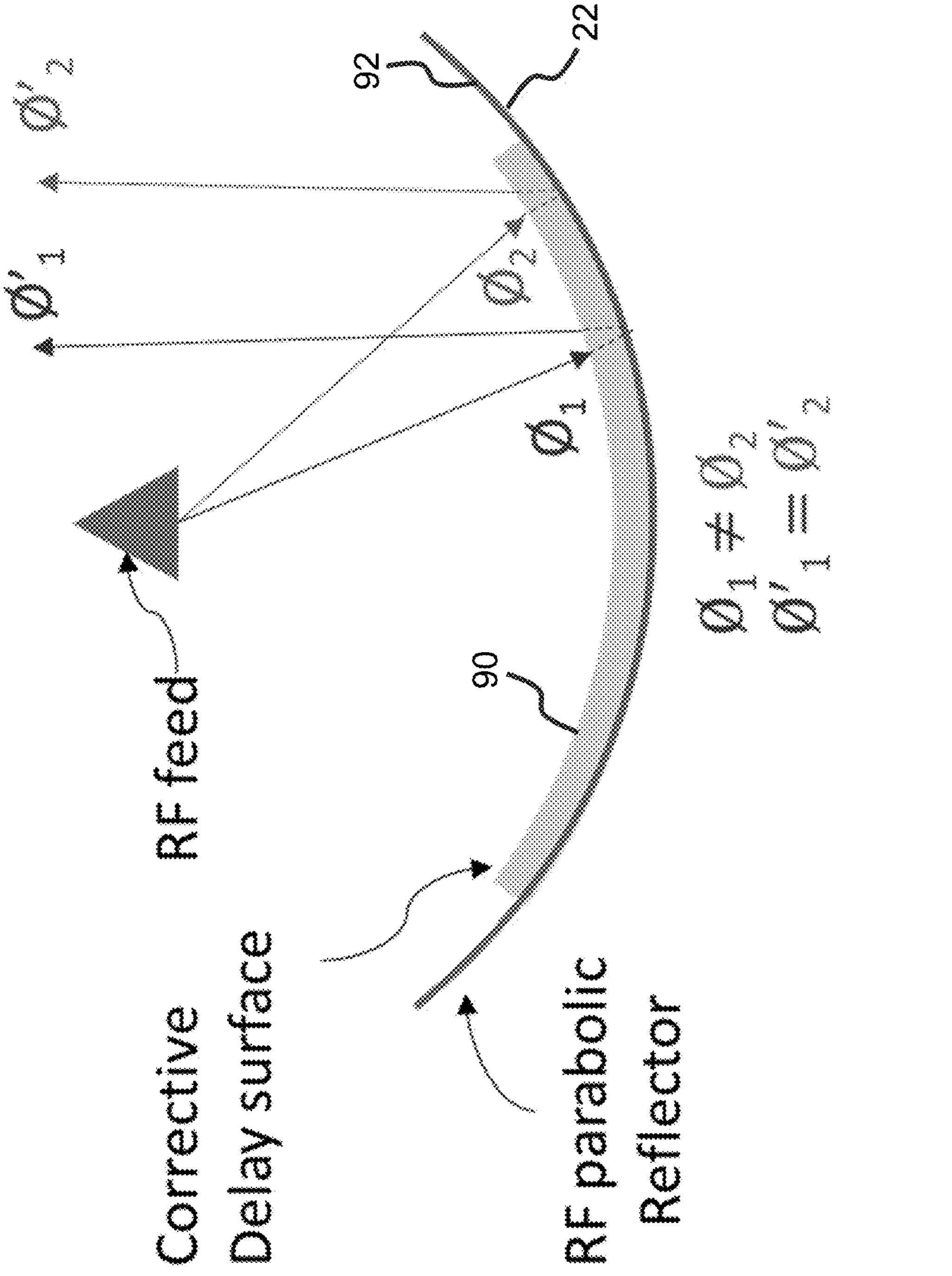
FIG. 49 is representative of the alternative approach of installing the meta surface lens directly over the parabolic reflector.

FIG. 1E and FIG. 49 (to be detailed in further paragraphs) depict another alternative approach where a meta surface lens 90 is placed directly on the reflecting surface of the parabolic reflector 22, either alone or in combination with the planar transmission meta surface structure (lens) 26, 40 mounted above the reflector 22.

Meta Surface Structure Design and Discussion on the Simulation Results

The process of improving antenna gain efficiency was divided into the following steps. First, an electric field distribution across the surface of interest was obtained. Subsequently, a perfect meta surface structure 26 was mounted on top of (over) the antenna 20, as shown in FIG. 1C, and, in addition, the perfect meta surface structure 26 was mounted on the aperture of the feed horn 24 as shown in FIG. 1D, to analyze the maximum theoretical improvement potential of the efficiency improvement.

The next step was to design a practical meta surface structure. For the practical meta surface structure, initially, a unit cell has been developed. Subsequently, a meta surface structure has been fabricated from integrated plurality of unit cells that was able to correct for the needed phase.

Finally, the designed meta surface structure was integrated with the parabolic antenna to compare the resulting gain of the antenna with and without the meta surface structure. For these experiments, the reference parabolic antenna was designed at the center frequency of 13 GHz with the efficiency of 50% equivalent to 23.7 dB gain.

Ideal Meta Surface Structure 26

Figure 2A:
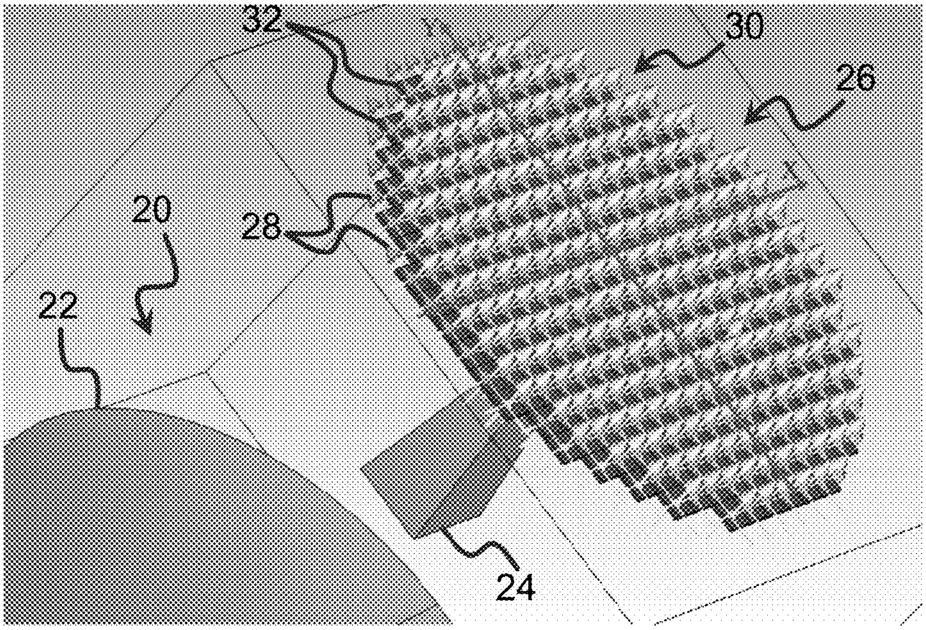
FIGS. 2A-2B depict the configuration set-up in Computer Simulation Technology (CST) composed of the electric probe on the surface of interest (FIG. 2A), and calculate electric filed phase distribution over the surface of interest (FIG. 2B)
Figure 2B:
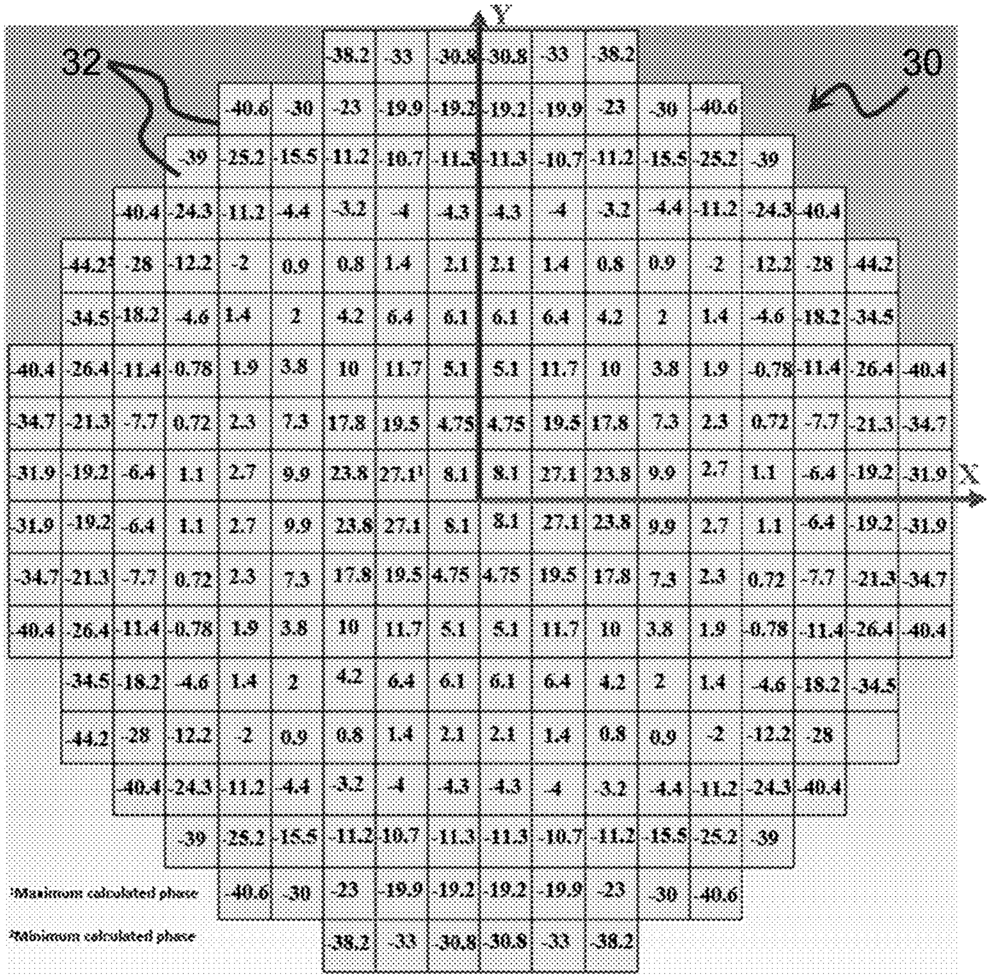

FIG. 2A depicts the simulation set-up in Computer Simulation Technology (CST) for the phase calculation over the surface of interest. Electrical probes 28 are seen in FIG. 2A being inserted on top of the antenna in an equally spaced manner. The calculated phase for each probe over the surface of interest 30 is presented in FIG. 2B. A maximum phase of 27.10 and the minimum phase of −44.20 were observed (the delta difference between the maximum and minimum phase value is 71.30).

The calculated phases were subsequently normalized to determine the required compensation phase for a uniform phase distribution. For each probe 28, an ideal unit cell 32 that can provide the required phase was designed. Finally, all the ideal unit cells 32 were integrated to generate an ideal meta surface structure 26.

Figure 3A:
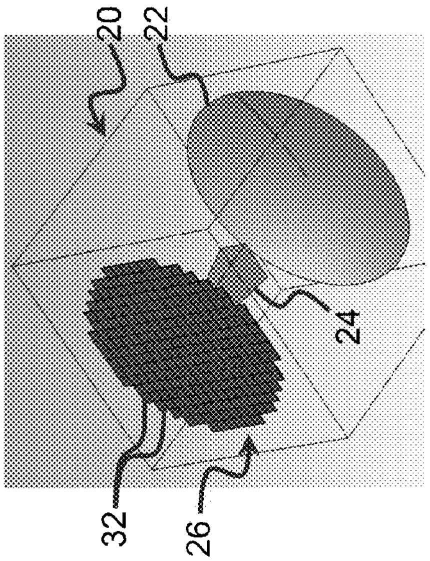
FIGS. 3A-3B represent an ideal meta surface on the top of the parabolic antenna (FIG. 3A), and gain comparison between the parabolic antenna with and without the meta surface (FIG. 3B)
Figure 3B:
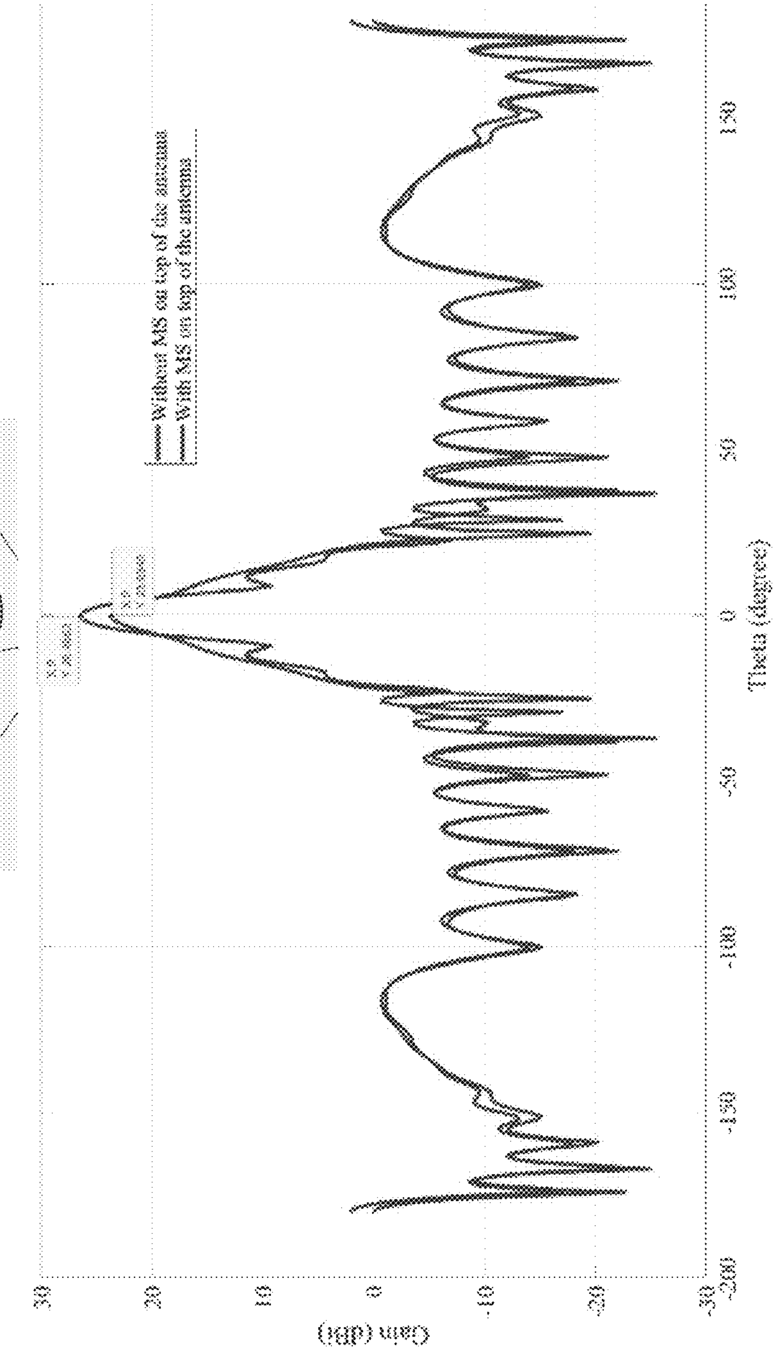

FIG. 3A shows the antenna configuration which includes a designed ideal meta surface structure 26 positioned on in front of (also referred to herein as on top of, or over) the reference parabolic antenna 20. FIG. 3B depicts the simulation results for the comparison of the antenna gain with and without the designed ideal meta surface structure 26. A 2.77 dB gain improvement can be observed from FIG. 3B.

Figure 4A:
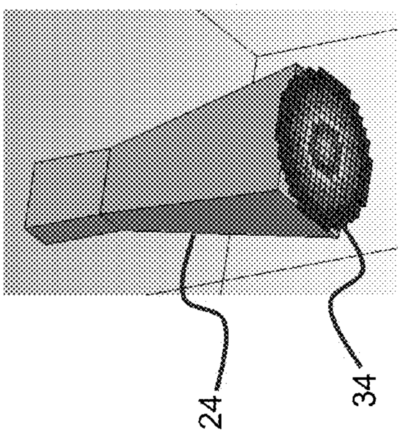
FIGS. 4A-4B represent an ideal meta surface disposed in front of the horn of the subject antenna (FIG. 4A), and comparison of the gain between the typical antenna with a conventional horn and the subject horn with the integrated ideal meta surface (FIG. 4B)
Figure 4B:
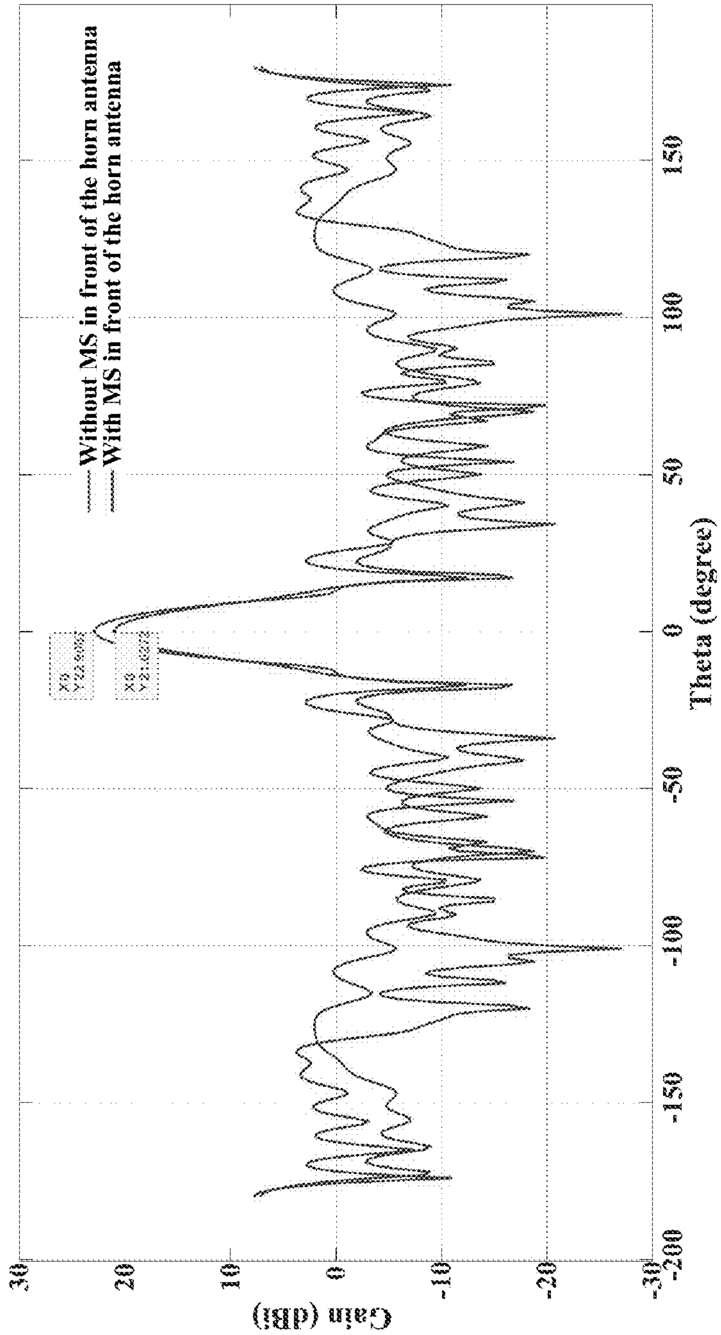

A design process, similar to that presented in previous paragraphs, was carried out to reduce the spill-over loss of the antenna. For this configuration, an ideal meta surface structure 26 was designed and installed within the aperture 34 of the horn feed 24, as depicted in FIGS. 1D and 4A. The antenna configuration and comparison results of the bore-sight gain for the subject parabolic antenna 20 with and without the ideal meta surface structure 26 at the aperture 34 of the horn feed 24 are presented in FIGS. 4A-4B. A 1.8 dB gain improvement has been achieved by the subject integration of the ideal meta surface structure 26 with the horn feed 24 of the antenna 20.

Practical Meta Surface Structure 40

The designed ideal meta surface structure 26 addressed in the previous paragraphs is a theoretical concept and, thus, it is not implementable. As a result, a practical, implementable meta surface structure 40 is desirable. The design process of the practical meta surface structure 40 is detailed in the following paragraphs. For the practical mesa surface structure 40, the initial design step, i.e., phase distribution and required phase calculation are similar to that of the ideal meta surface structure 26, and are presented in the previous paragraphs.

For the design step for the unit cell that can generate the required phase, as a rule of thumb, the phase delay of an electromagnetic wave can be derived as:

$$\varphi = \beta.d = \omega\sqrt{\mu_{eff}\varepsilon_{eff}}.d$$

where φ is the phase delay and d is the distance the wave travels from medium 1 to medium 2 (medium 1 is free space and medium 2 is the metasurface). Hence, in order to calculate the phase delay of a unit cell, the permittivity and permeability of the unit cell should be calculated.

In the present design, a MATLAB model has been developed by using the Kramers-Kronig relationship to extract the material properties, in accordance with the Z. Szabó, et al., "A Unique Extraction of Metamaterial Parameters Based on Kramers-Kronig Relationship," IEEE Transactions on Microwave Theory and Techniques, vol. 58, no. 10, pp. 2646-2653, 2010.

The Effective permittivity $\varepsilon_{eff}$ and permeability $\mu_{eff}$ were calculated as follow:

$$\mu_{eff} = \frac{1}{kd}\cos^{-1}\left[\frac{1}{2S_{21}}\left(1 - S_{11}^2 + S_{21}^2\right)\right]\sqrt{\frac{(1+S_{11})^2 - S_{21}^2}{(1-S_{11})^2 - S_{21}^2}}$$

$$\varepsilon_{eff} = \frac{1}{kd}\cos^{-1}\left[\frac{1}{2S_{21}}\left(1 - S_{11}^2 + S_{21}^2\right)\right]/\sqrt{\frac{(1+S_{11})^2 - S_{21}^2}{(1-S_{11})^2 - S_{21}^2}}$$

where k is the wavenumber of the incident wave, d is the thickness of the unit cell, S11 is the reflection coefficient, and S21 is the transmission coefficient. The reflection and transmission coefficients were derived using CST Microwave Studio based on the defined periodic boundary condition. Once the scattering parameters were calculated from CST, the refractive index, relative permittivity, and relative permeability can be extracted using a model developed in MATLAB.

Figure 5A:
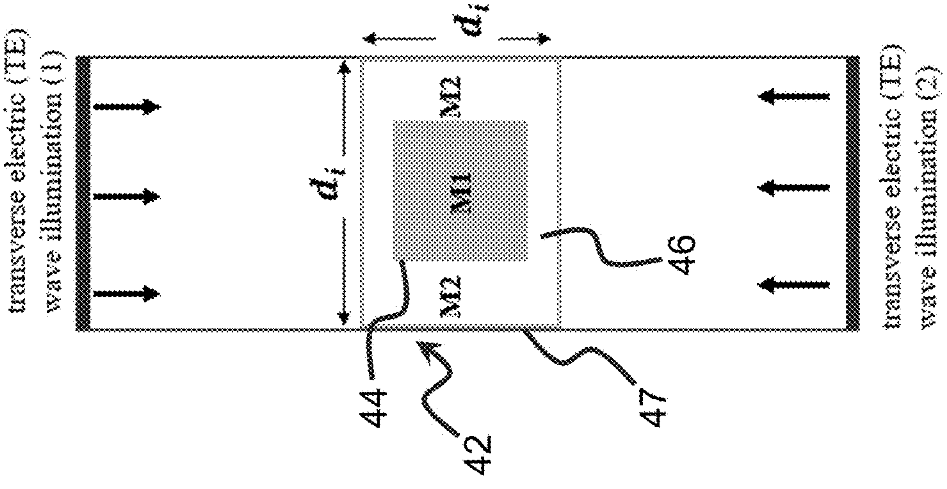
FIGS. 5A-5C depicts the subject unit cell with FIG. 5A showing the geometry and different medium configurations, FIG. 5B representing the design for maximum phase shift, and FIG. 5C representing the design for minimum phase shift.

The configuration of the subject unit cell 42 is shown in FIG. 5A. The unit cell 42 is fabricated with a solid all-dielectric cube 44 surrounded by air 46 enveloped by the cell walls 47, and specified by a unit cell whose size is dependent on the parameter $d_i$ in FIG. 5A. The dielectric of the cube 44 can be assumed as the average dielectric constant of the material and air, and, as a result, the main parameter responsible for phase variation in the proposed unit cell is the height of the central dielectric medium (M1). It should be noted that by varying the dimension of the central dielectric medium (M1), the dimension of medium 2 (M2), i.e., air, is changing accordingly.

Unit cell 42 was analyzed using CST. A normalized Transverse Electric (TE) wave was illuminated from one side of the cell (top or bottom) to be received at the opposite side (bottom or top). Once the scattering parameters were calculated from CST, the material properties were retrieved from the developed MATLAB model.

Figure 5B:
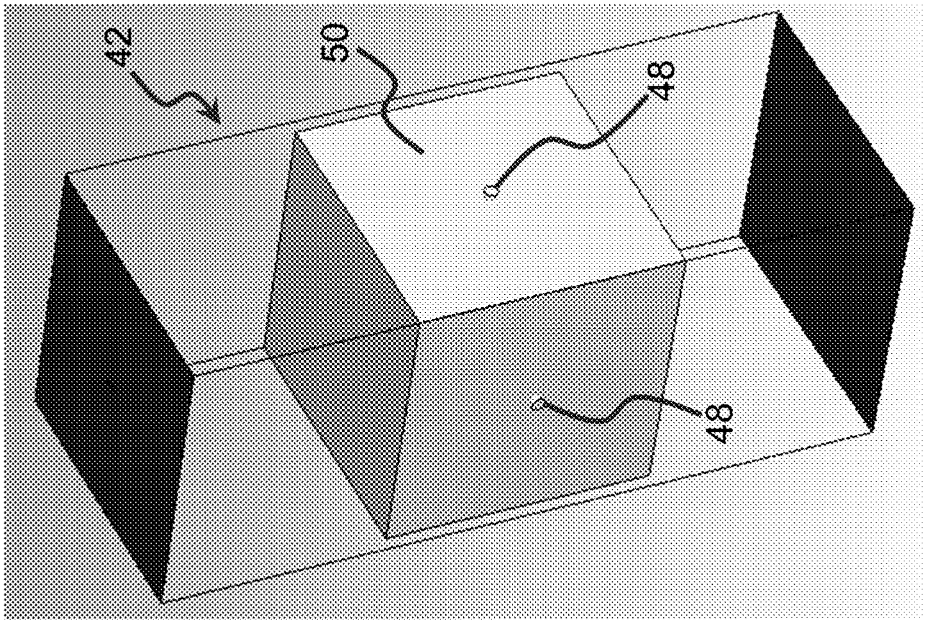
Figure 5C:
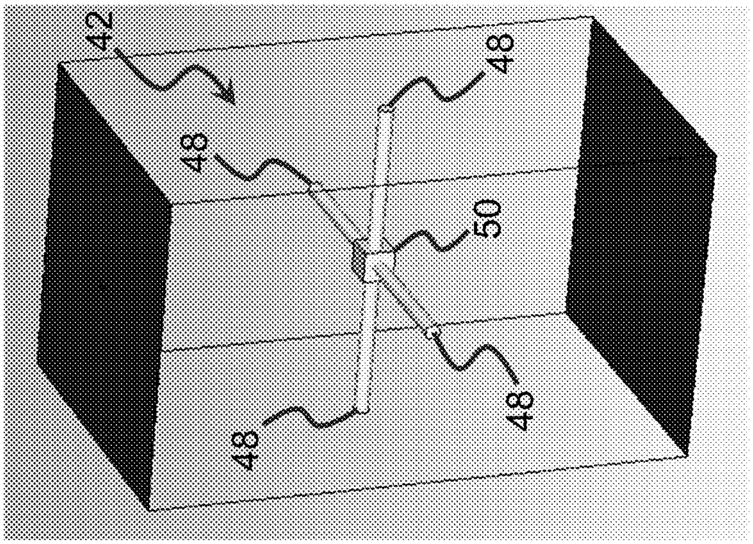

FIGS. 5B-5C show the unit cells 42 having different dimensions. The small cylinders 48 created in the walls 50 of the unit cell structure 42 can act as connectors between unit cells to bridge the unit cells together, as needed.

Figure 6B:
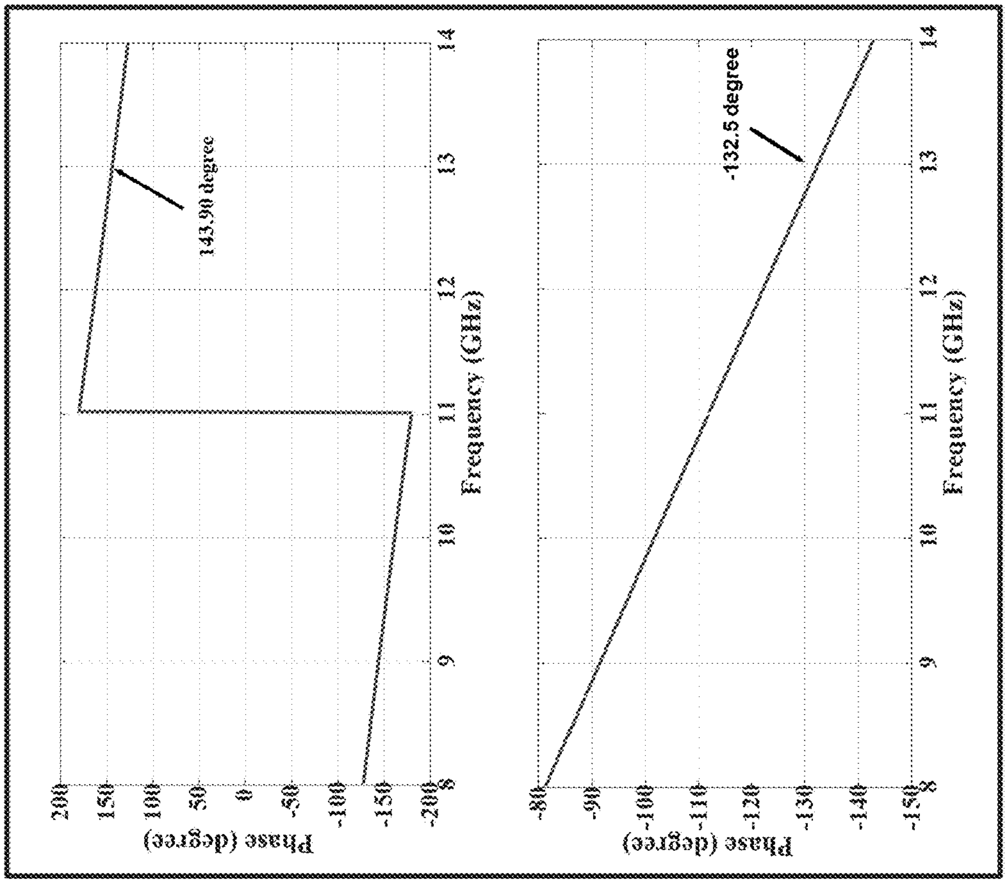
FIGS. 6A-6B are representative of the scattering response and phase value corresponding to maximum phase shift unit cell (FIG. 6A) and to minimum phase shift unit cell (FIG. 6B)
Figure 6A:
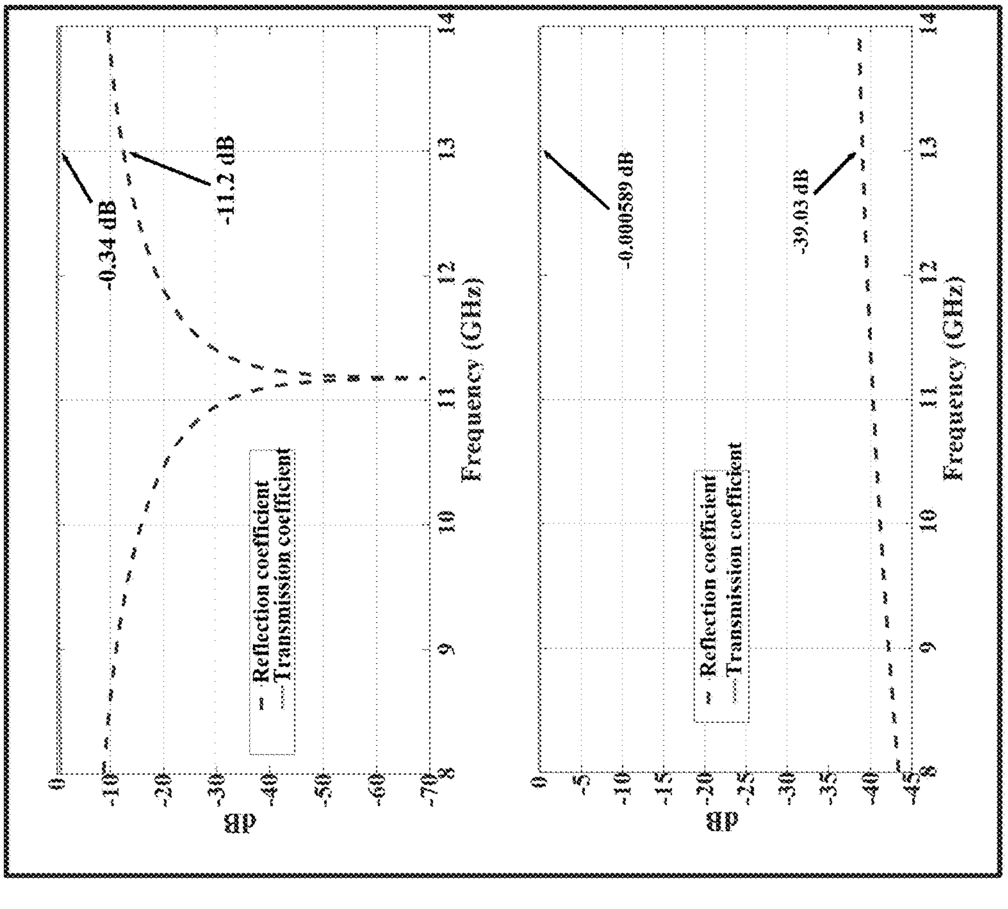

FIGS. 6A-6B represent the scattering parameters response as well the phase variation corresponding to the unit cell 42 of FIGS. 5B-5C, respectively.

Reflection coefficient and transmission loss are the two key factors impacting the unit cell response. As shown in FIG. 6A, a reflection coefficient better than 10 dB and a transmission loss less than 0.1 dB has been achieved by both unit cell designs. Also, the delta phase difference between the two-unit cell designs is about 85° which is more than the required maximum phase difference for the reference parabolic antenna (about 71.3°). It should be noted that, although the maximum and minimum phase value have been presented herein, any other values can be adjusted by varying the unit cell's dimensions.

Similar to the ideal meta surface structure 26, the designed unit cells 42 can be integrated into a one meta surface structure 40 and mounted on top of (or over) the antenna 20 as one of the two approaches and mounted at the aperture 34 of the horn feed 24 as another approach for improving the antenna efficiency.

Figure 7:
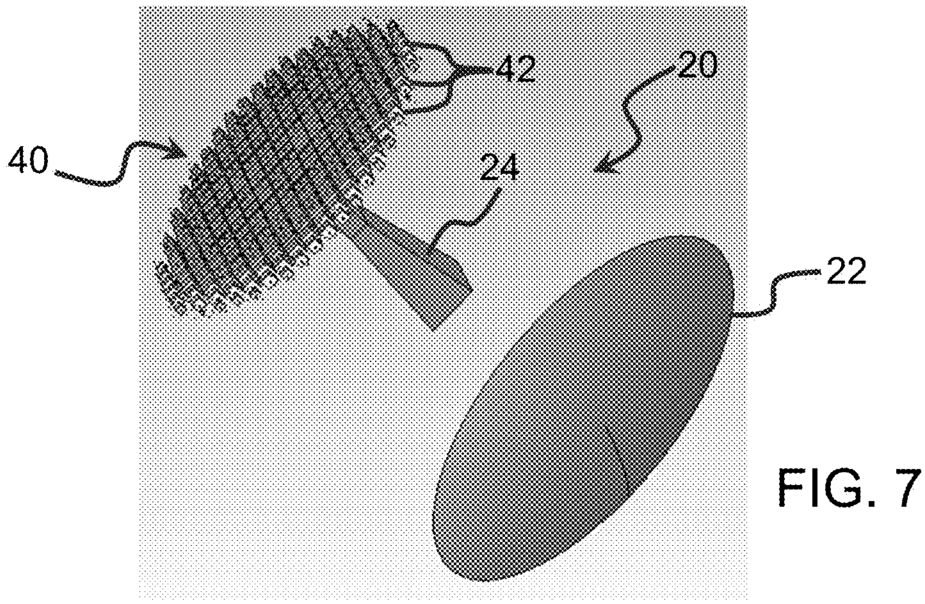
FIG. 7 depicts the configuration of the subject meta surface structure positioning in front of the parabolic antenna.
Figure 8A:
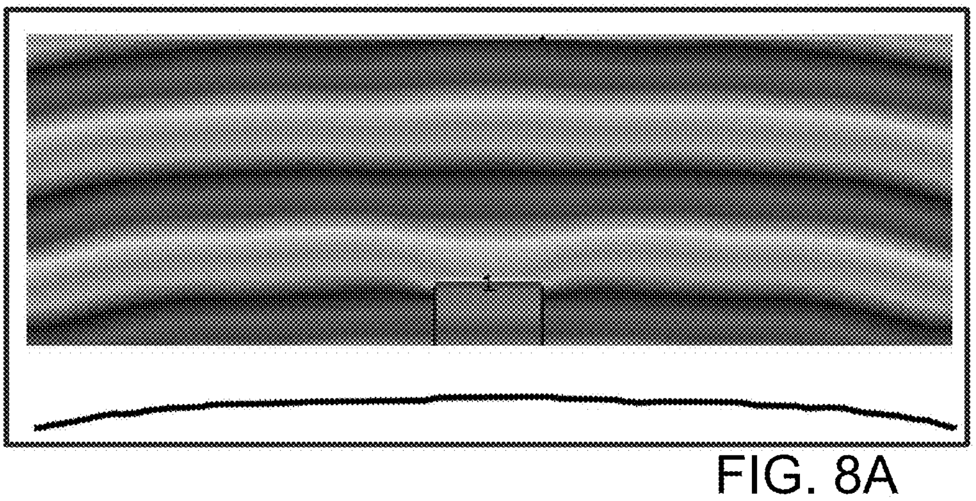
FIGS. 8A-8B show the phase distribution without the meta surface (FIG. 8A) and with meta surface (FIG. 8B)
Figure 8B:
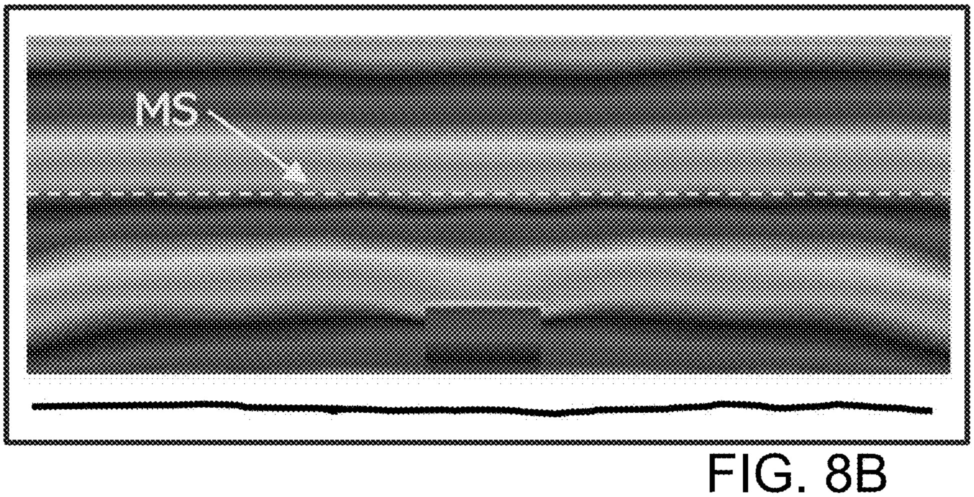
Figure 9:
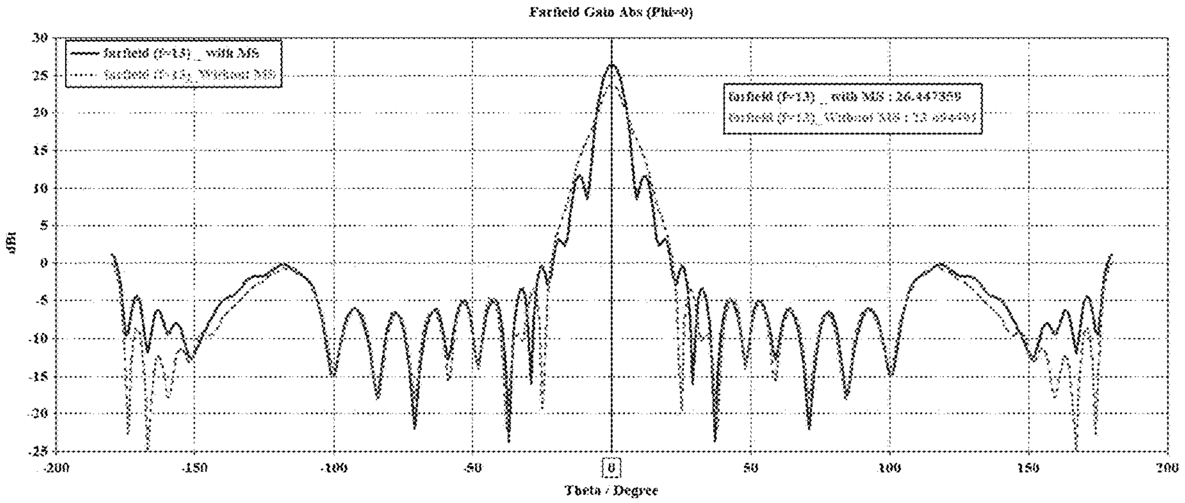
FIG. 9 is a diagram representative of the gain comparison of the boresight direction between the subject antenna with the meta surface and the typical antenna without the meta surface at 13 GHz.
Figure 10:
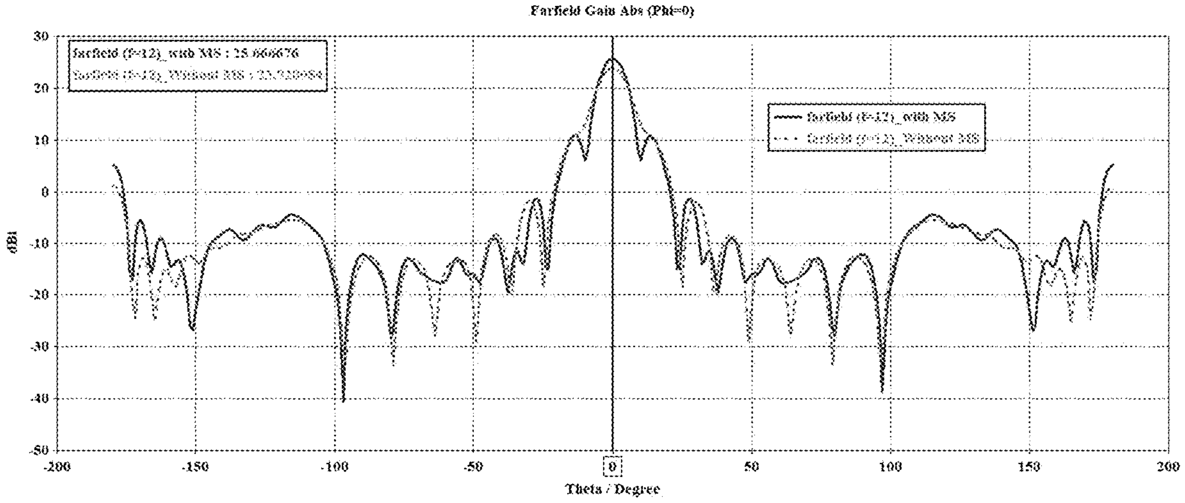
FIG. 10 is a diagram representative of the gain comparison of the boresight direction between the subject antenna with the meta surface and the typical antenna without the meta surface at 12 GHz.
Figure 11:
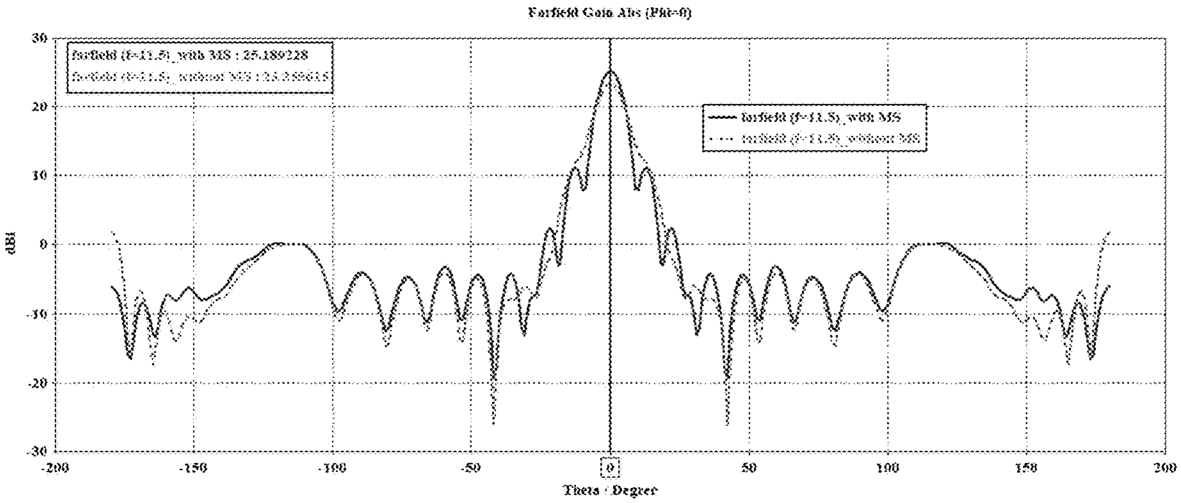
FIG. 11 is a diagram representative of the gain comparison of the boresight direction between the subject antenna with the meta surface and the typical antenna without the meta surface at 11.5 GHz.
Figure 12:
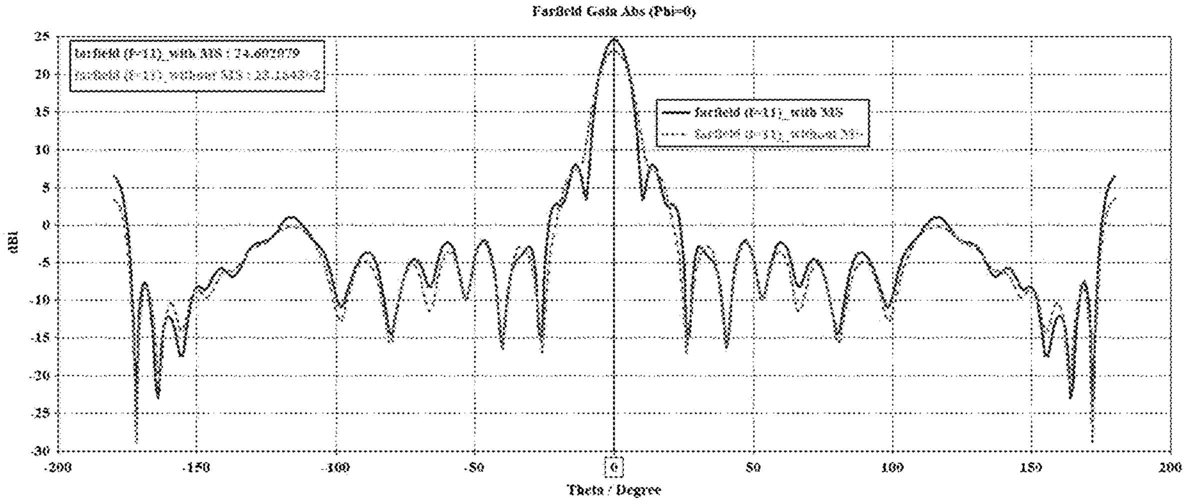
FIG. 12 is a diagram representative of the gain comparison of the boresight direction between the subject antenna with the meta surface and the typical antenna without the meta surface at 11 GHz.

FIG. 7 depicts the configuration of the subject meta surface structure 40 (composed of a plurality of the interconnected unit cells 42) disposed in front of the reference antenna 20. To clearly understand the effect of unit cell 42 over the parabolic antenna 20, the phase distribution without and with the meta surface structure 40 has been compared, as shown in FIGS. 8A-8B, respectively. An ideal phase distribution over the parabolic antenna for high efficiency should be homogeneous, and, as a result, it is expected to have a flat phase front over the antenna. FIG. 8B, which corresponds to an antenna paired with a meta surface structure 40, shows a flatter phase front as compared to FIG. 8A, which corresponds to an antenna without a meta surface structure 40.

FIGS. 9-12 illustrate the comparison of boresight gain between antennas with and without a meta surface structure 40 at 13 GHZ, 12 GHz, 11.5 GHZ, and 11 GHz, respectively. The meta surface structure 40 which has been designed for optimal performance at 13 GHz, results in a 2.75 improvement in antenna gain at this frequency (compare to 2.77 dB improvement for the ideal meta surface structure 26). The simulation results at other center frequencies (not shown here) between 11 GHz and 16 GHz indicate that a minimum antenna gain improvement of 40% can be achieved by the subject meta surface structure, thus demonstrating satisfactory wideband response of the present meta surface structure.

Figure 13A:
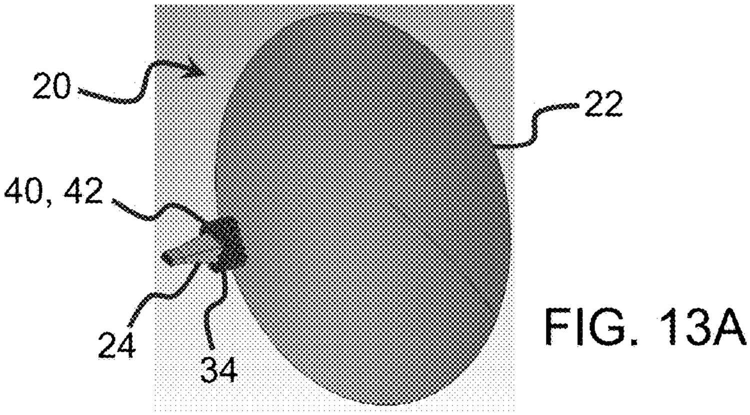
FIGS. 13A-13B are representations of the configuration of the subject meta surface disposed in front of the feed horn (FIG. 13A), and a diagram representative of the gain comparison of the boresight direction between the subject antenna with the meta surface positioned in front of the feed horn and the typical antenna without the meta surface at 13 GHZ.

FIG. 13A shows the antenna configuration in an alternative approach, where the subject unit cell 42 is integrated as a new meta surface structure 40 in front of the aperture 34 of the feed horn 24 to reduce the spill-over loss.

Figure 13B:
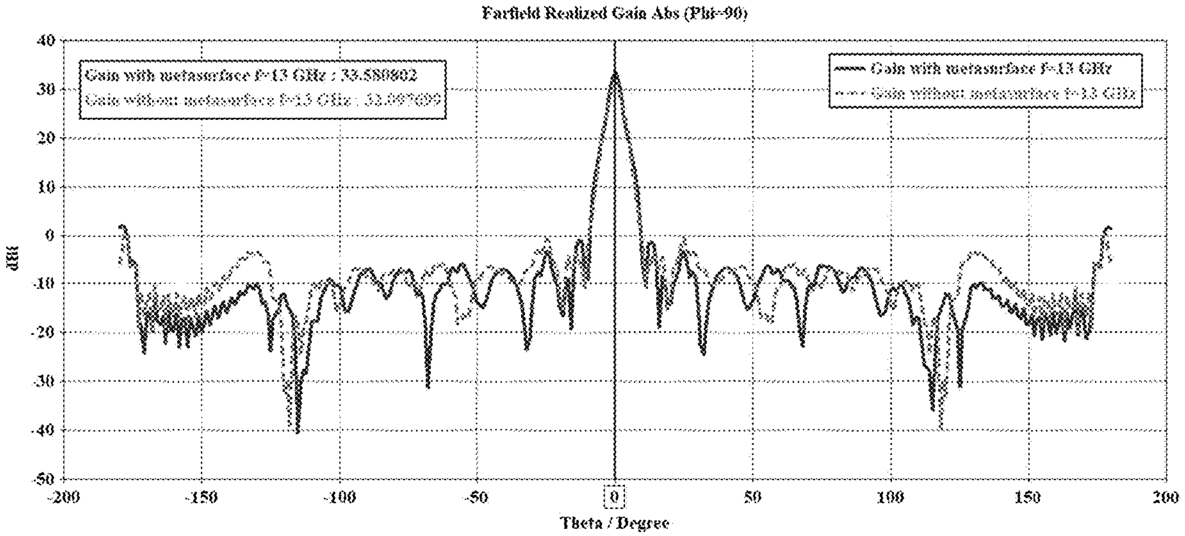

The meta surface structure 40 was installed on the aperture 34 of the feed horn 24, and optimized to reduce the spill-over loss. FIG. 13B shows the antenna gain comparison between the antenna with and without the designed meta surface structure 40 at boresight. Approximately 1.5 dB gain improvement (compared to 1.8 dB gain improvement for the ideal meta surface structure) has been achieved by the subject practical meta surface structure 40.

Parabolic Antenna Reflector

In order to validate the subject concept of the meta surface structure positioned over a parabolic reflector, a splash plate parabolic reflector operating at 5.85 GHz was used. Additionally, a mechanical support 60 was designed (as shown in FIG. 14A) using fusion 360 Autodesk© software and fabricated (as shown in FIG. 14B) using 3D printing technology to hold the meta surface structure 40.

Figure 14A:
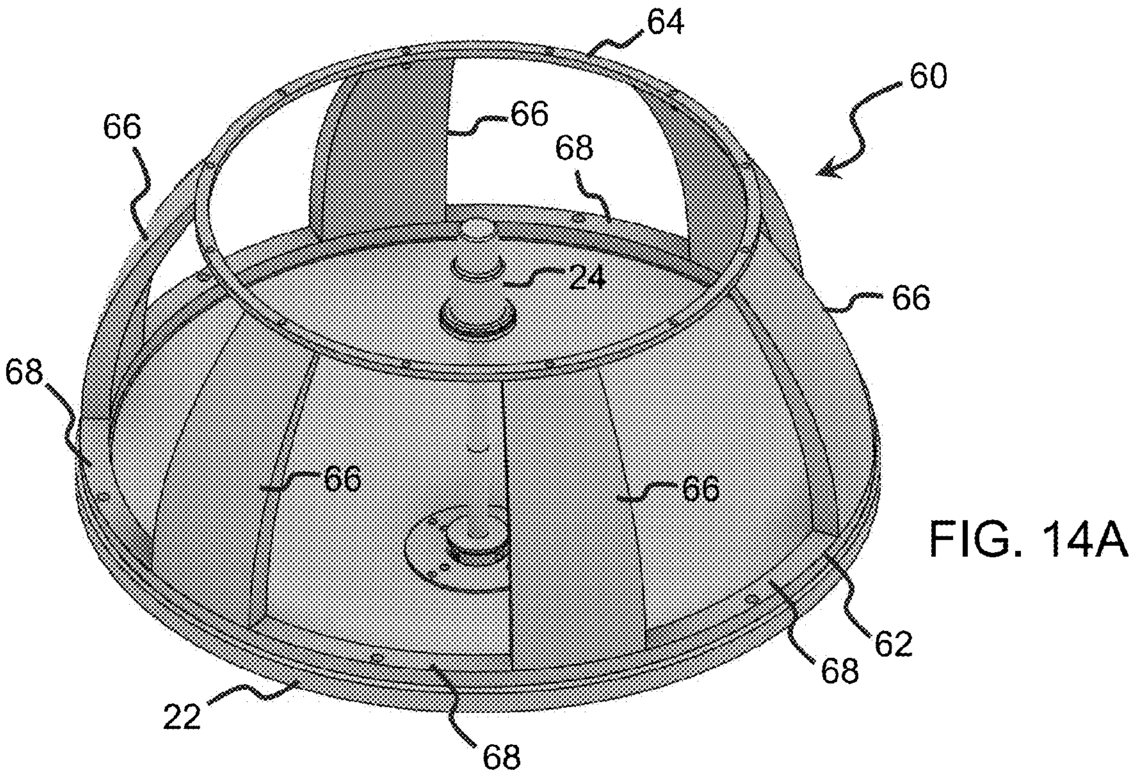
FIGS. 14A-14B depict the meta surface mechanical support with FIG. 14A showing the implementation using the fusion 360, and FIG. 14B showing the structure fabricated using 3D printing technology.
Figure 14B:
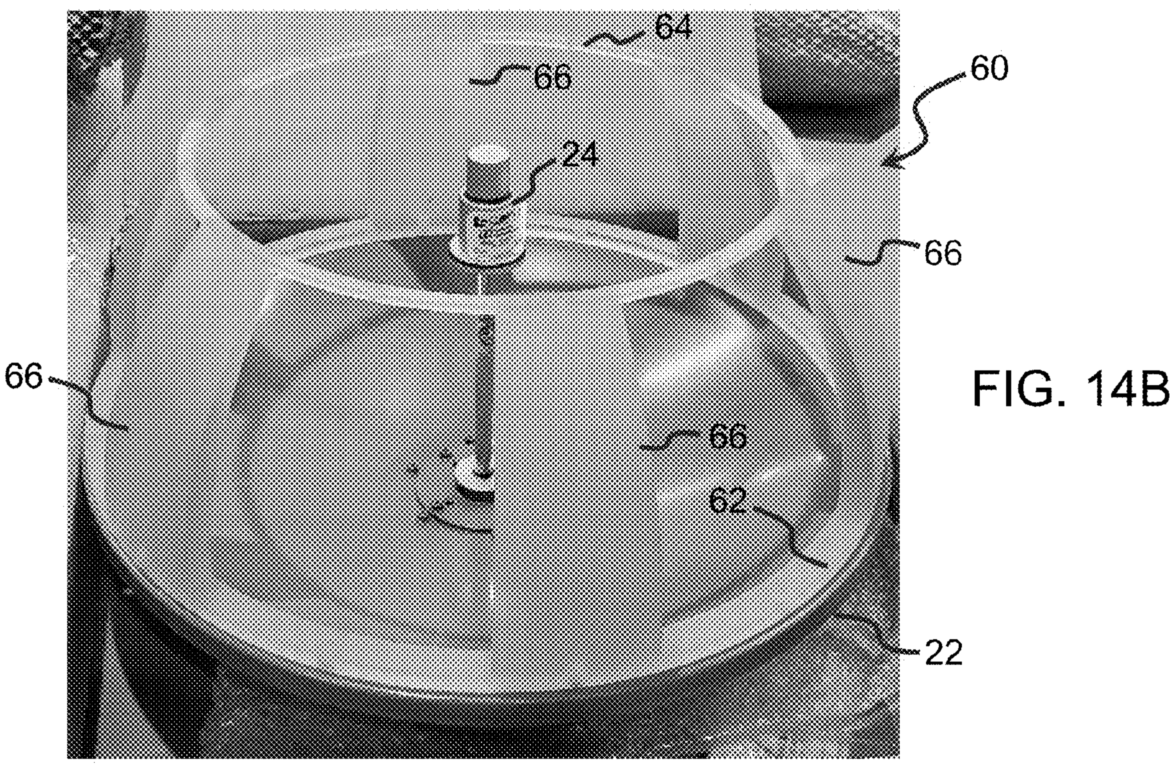

As shown in FIGS. 14A-14B, the mechanical support 60 includes a bottom ring 62 and a top ring 64 connected through six vertical supports 66. The meta surface structure 40 of 12 inches in diameter can be placed on the top ring 64 of the mechanical support 60 using 12 M5 plastic screws. The mechanical support 60 was configured for being held through the bottom ring 62 to the parabolic reflector 22 using 12 M8 screws 68.

Designing a meta surface structure/lens to improve the efficiency of the parabolic antenna requires computing the phase of the electrical field at a specific plane above the reflector 22. The electrical field can be calculated using full wave simulation or by measuring the actual electric field generated by the parabolic antenna. Simulation would have been difficult due to the complicated design of the parabolic antenna reflector, and a lack of documentation on its operation. Additionally, full-wave simulation cannot account for imperfections in the parabolic antenna reflector performance due to manufacturing imperfections, nor the addition of the custom mechanical support. It was chosen to base the design of the meta surface structure on actual electric field measurements of the parabolic antenna reflector.

Parabolic Antenna Reflector Measurements

Figure 15:
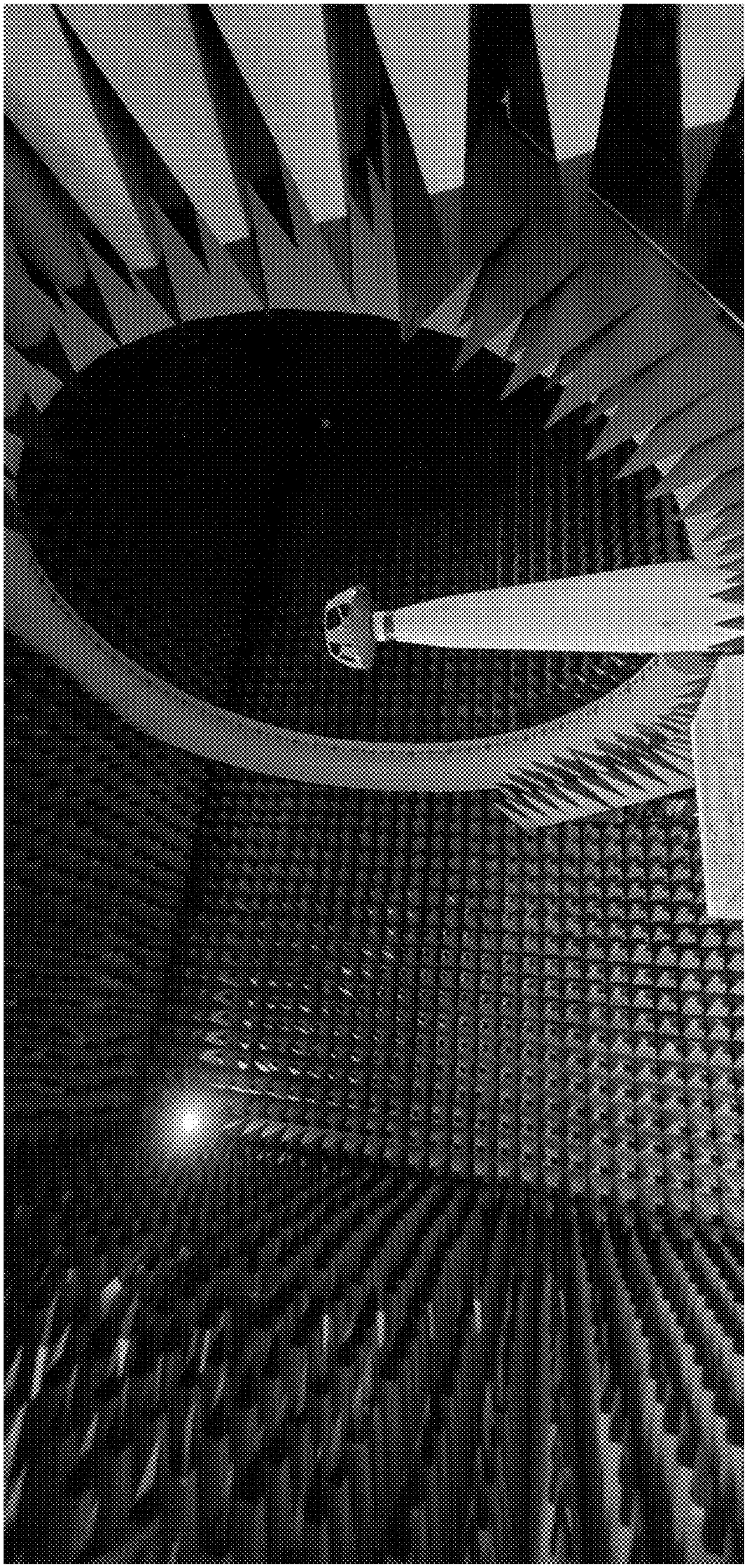
FIG. 15 shows the parabolic reflector with the mechanical support inside the MVG-SG64 near field measurement system.

The electric field generated by the parabolic antenna reflector was measured with and without the mechanical support in place, using the SG64, which is a multi-probe near field measurement system. The SG64 uses analog RF signal generators to emit EM waves from the probe array to the antenna under test (AUT) or vice versa. The SG64 measures the near field of the electrical field and uses post-processing software to calculate the magnitude and phase of the electrical field on a specific plane above the parabolic reflector. FIG. 15 depicts the antenna in the SG64 system.

Figure 16:
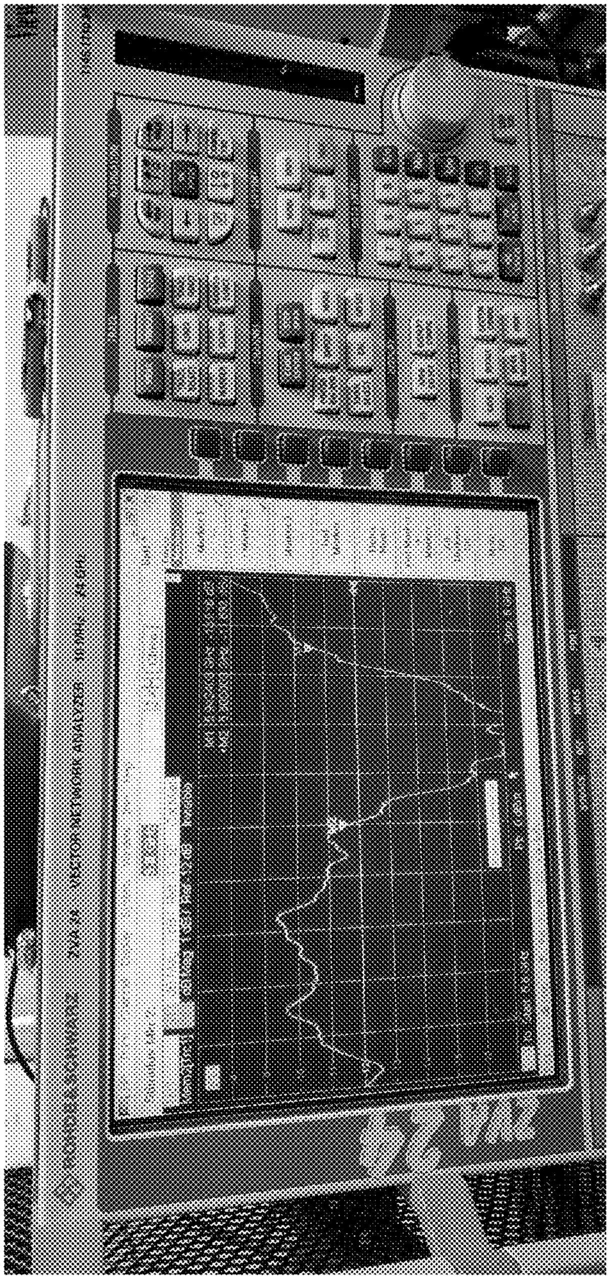
FIG. 16 represents a diagram showing that the subject antenna operates in the range 5.7-5.95 GHz.

The magnitude of the antenna reflection coefficient $|S_{11}|$ was measured using Rohde & Schwarz VNA (10 MHZ-24 GHz). The diagram depicted in FIG. 16 shows that the antenna operates between 5.7 GHz and 5.95 GHz considering an $|S_{11}|$ below −10 dB. Additionally, it can be seen that the lowest $|S_{11}|$ of the antenna (i.e., maximum radiated power) is around 5.85 GHz. Therefore, the subject meta surface lens was designed to improve the parabolic reflector efficiency/gain at 5.85 GHz to provide maximum radiated power.

The far-field gain pattern of the parabolic reflector with and without mechanical support was obtained using spherical wave expansion from the near field measured data. These measurements were performed between 5.6 GHz to 6 GHz with the sampling performed in equal steps, each of 0.025 GHz. The measured gain vs. frequency in the broadside direction (θ=0°) of the parabolic reflector with and without the mechanical support is shown in FIG. 17.

Figure 17:
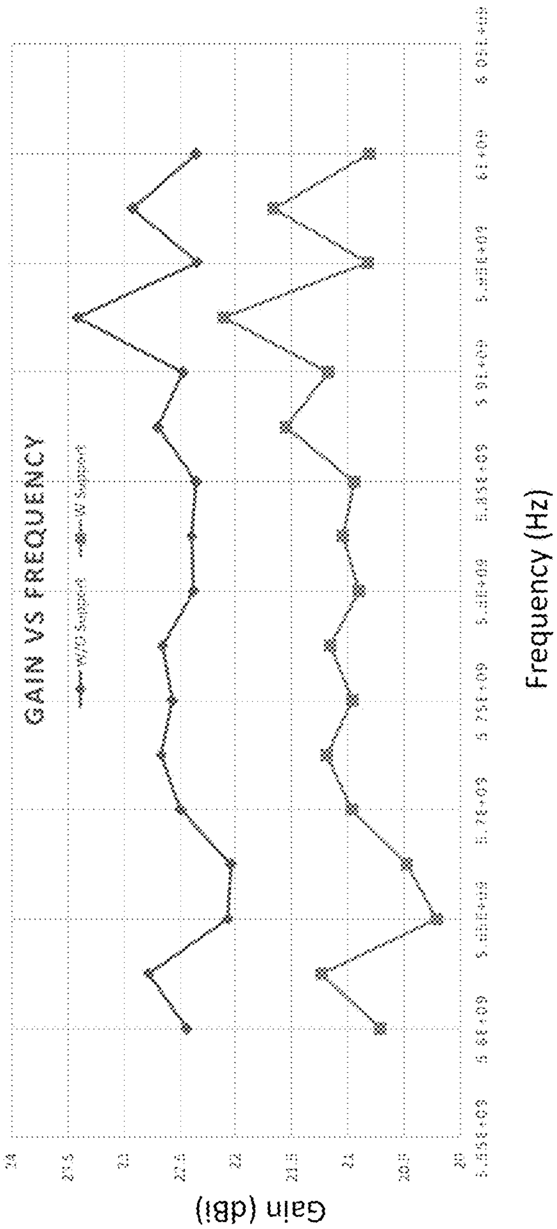
FIG. 17 is a diagram representative of the gain vs. frequency at the broadside direction for the parabolic reflector with and without the mechanical support.
Figure 18:
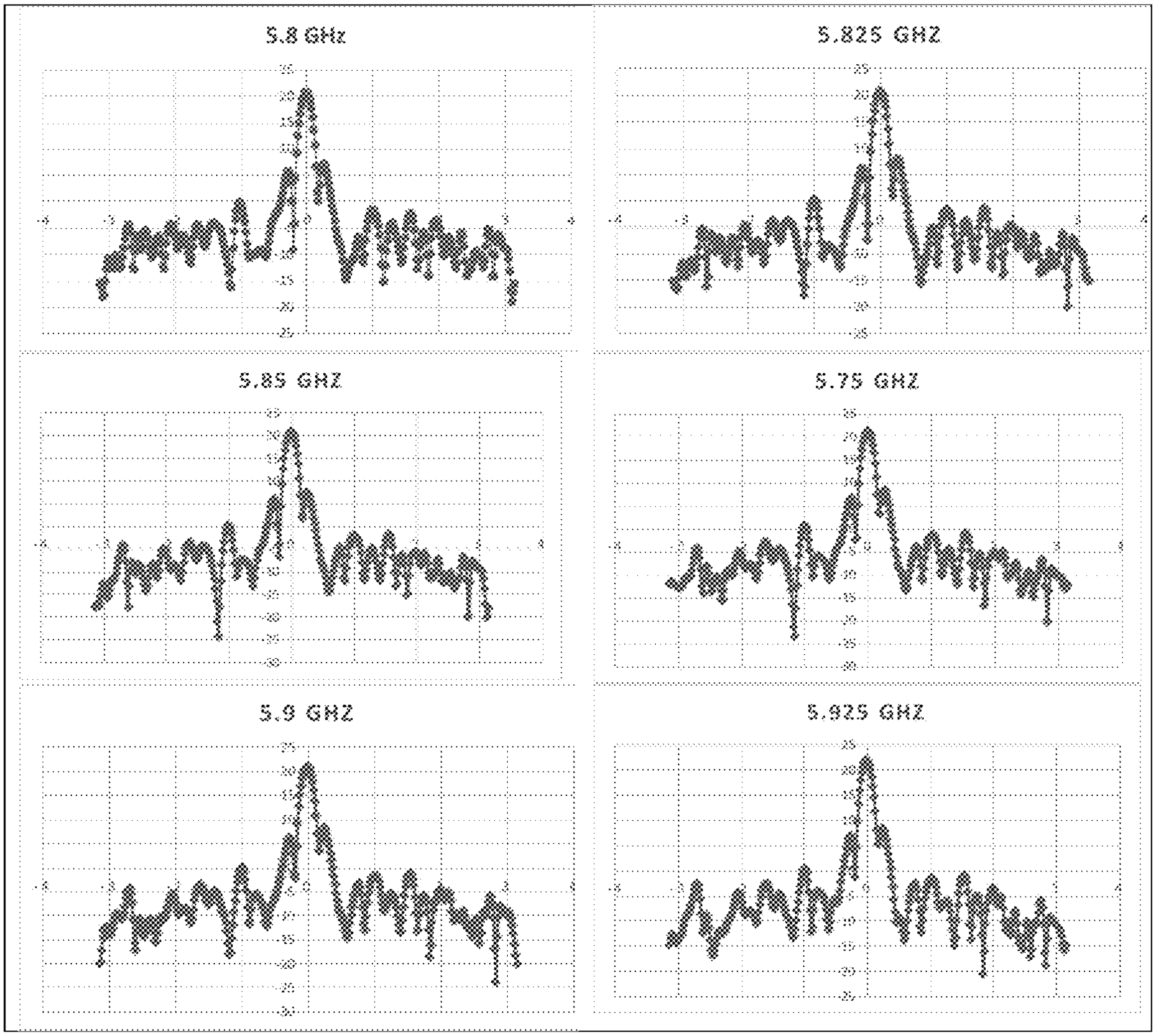
FIG. 18 is representative of the diagrams of the gain pattern of the subject parabolic antenna with the mechanical support at 5.8, 5.825, 5.85, 5.875, 5.9, and 5.925 GHZ.

As seen in FIG. 17, the mechanical support reduces the gain of the parabolic reflector by around 1.3 dB. This reduction is due to the used lossy material and the bulky structure of the mechanical support. In order to reduce the effect of the mechanical support, (a) a material should be considered that has loss properties and dielectric constant that is close to 1, or (b) the mechanical support is to be redesigned to use less material, for example, using thinner vertical rods. Additionally, it should be taken into consideration that the maximum gain of the parabolic reflector is 23.45 dB at 5.925 GHz whereas the datasheet reports a maximum gain of 24 dB at 5.8 GHz. The measured gain patterns of the parabolic reflector with mechanical support between 5.8 and 5.9 are shown in FIG. 18.

Figure 19:
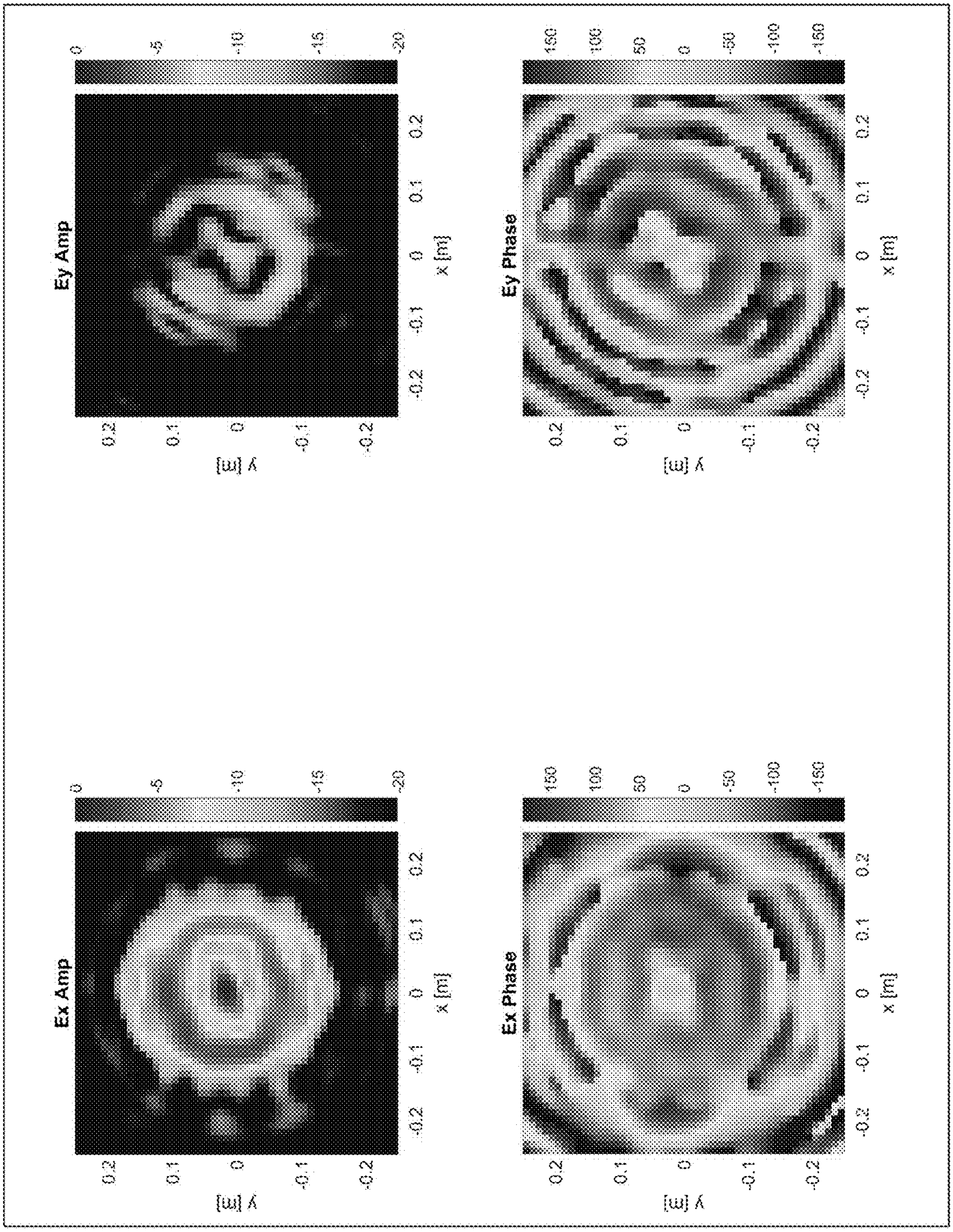
FIG. 19 shows the holograms of the phase and magnitude of the Ex and Ey components of the electric filed of the parabolic antenna without the mechanical support at 5.85 GHZ.

The amplitude and phase for both electrical field components Ex and Ey were also obtained using post-processing of the nearfield measured data. FIG. 19 shows the Ex and Ey components of the electrical field measured with the mechanical support. The Ey component of the electrical field is very low because the parabolic reflector is linearly polarized on the x axis. These results show that the phase of the electric field is not equiphasic (phase equal across the x-y plane) which explains the antenna's reduced efficiency/gain performance. Additionally, the presence of the mechanical support affects the magnitude and phase of the electric field, which explains the 1.3 drop in the gain. At 5.85 GHz, the phase of the electric field varies from 7° to 140° inside a 12-inch diameter (the size of the meta surface structure). Hence, the meta surface unit cell must have at least 147° of phase range in order to correct the parabolic reflector electric field phase.

Meta Surface Unit Cell Design and Fabrication

Two different 3D-printed meta surface lenses which were based on two different topologies were designed, and their performance was analyzed. The first meta surface lens has a gyroid unit cell configuration fabricated from a dielectric material to create a specific air-to-dielectric ratio. A gyroid is an infinitely connected triply periodic minimal surface with zero mean curvature. Depending on the dielectric-to-air ratio, an effective dielectric constant (DK) is obtained and therefore a different phase delay is achieved. The second meta surface lens is based on a unit cell having a solid single dielectric cube configuration. The phased delay of the unit cell was obtained by controlling the size of the single unit cell cube.

Gyroid Meta Surface Unit Cells 32

Figure 20:
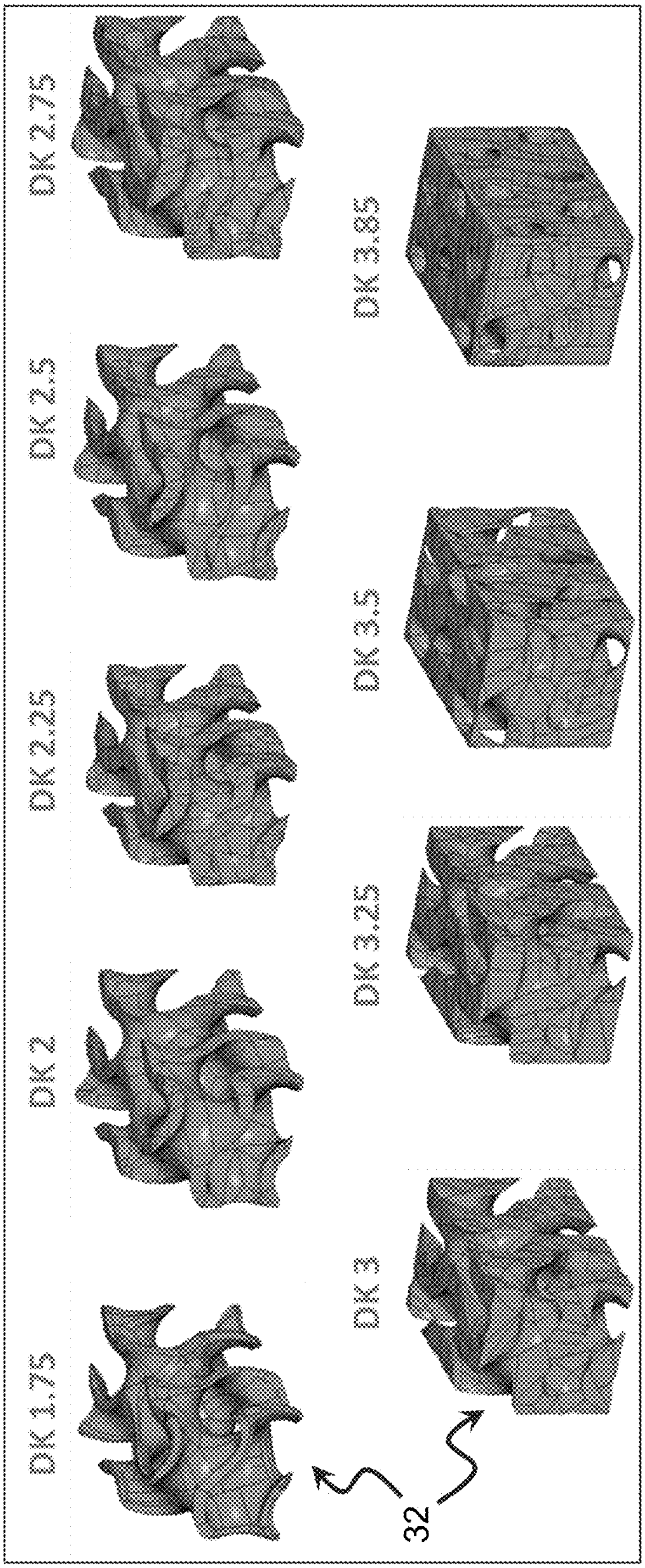
FIG. 20 represents 3D Fortify unit cells ranging from DK 1.75 to DK 3.85.
Figure 21A:
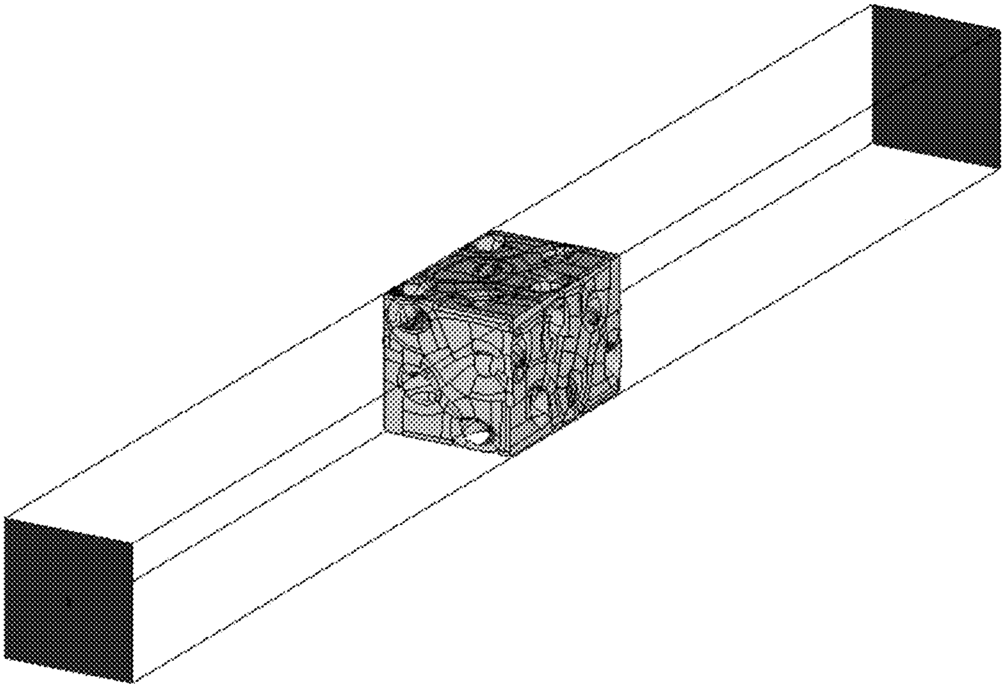
FIGS. 21A-21B show the 3D view of the unit cell DK 3.85 in the periodic boundary conditions (FIG. 21A), and the cross-section mesh view (FIG. 21B)

FIG. 20 shows the meta surface unit cells design. The unit cells 32 depend on their 3D geometry to provide an effective DK ranging from 1.75 to 3.85. The unit cells 32 were analyzed using CST periodic boundary conditions (as shown in FIG. 21A) to determine their phase offset and insertion losses.

Figure 21B:
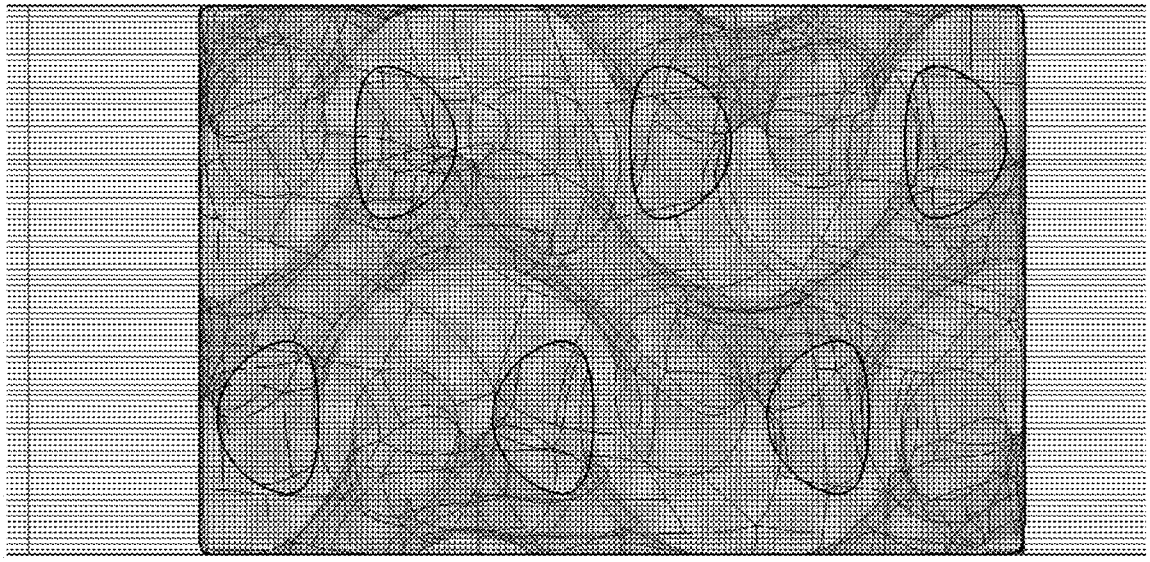

The unit cells 32 are made from Rogers© radix 49 material with a dielectric constant of 4.9 and a tang loss of 0.002. Due to their complicated 3D geometry, the unit cells were meshed accordingly to represent the exact ratio between the dielectric material and air on CST MWS. The mesh size considered in the simulation was 0.1 mm in all directions x, y, and z, as shown in FIG. 21B.

Figure 22:
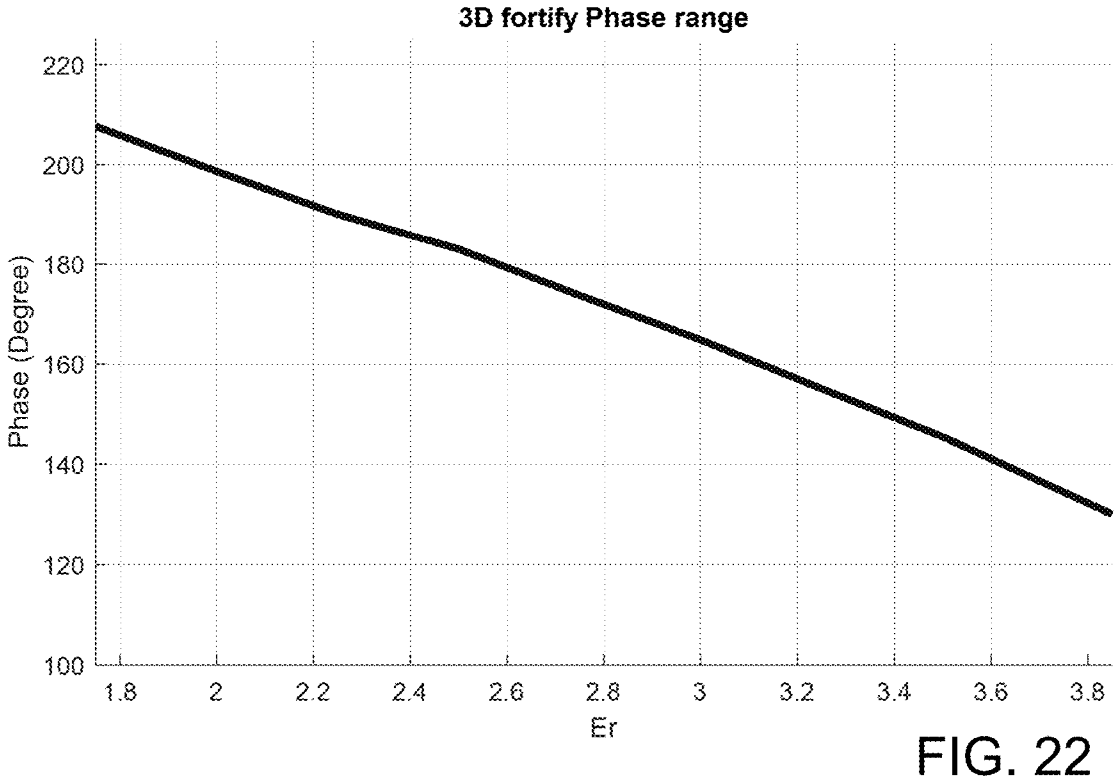
FIG. 22 is a diagram representative of the S21 phase response of the gyroid unit cell at 5.85 GHz.
Figure 23:
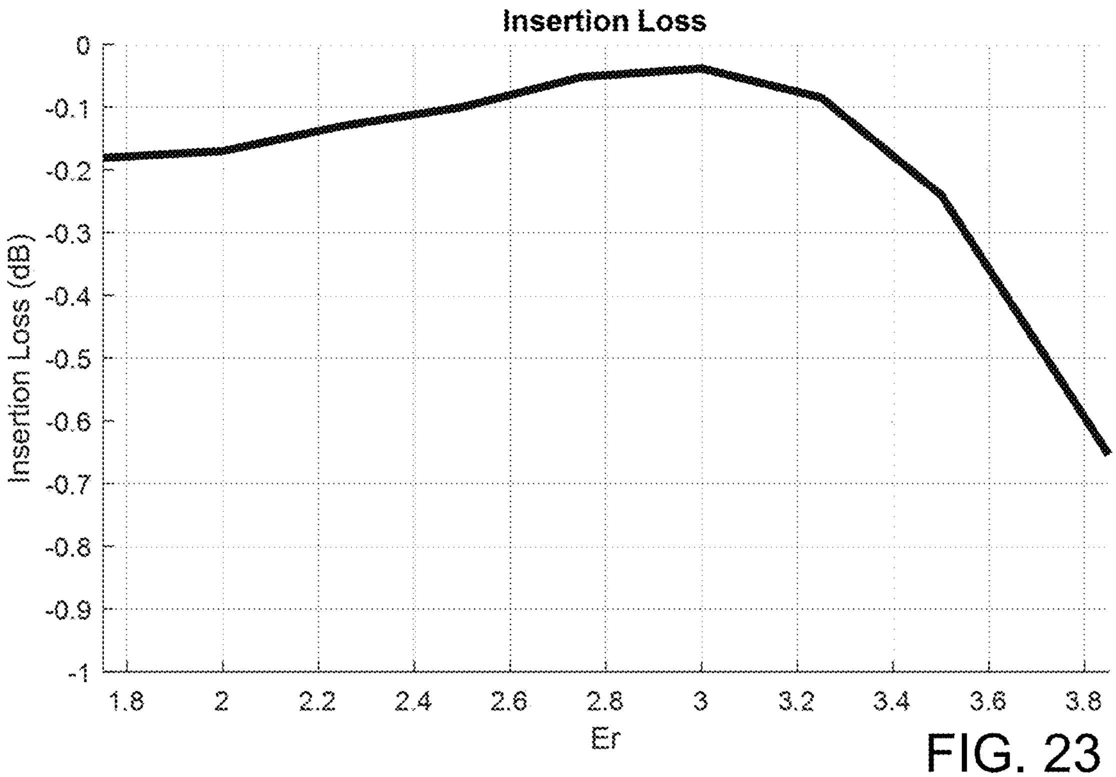
FIG. 23 is a diagram representative of the insertion loss of the gyroid unit cells as a function of the DK at 5.85 GHz.

The simulated results of the scattering parameters, phase, and insertion losses are shown in FIG. 22 and FIG. 23, respectively. These results show that the phase range achievable by the gyroid unit cells is between 200° to 133° for an effective DK from 1.75 to 3.85, respectively. Therefore, the maximum phase range achievable is 77°. These unit cells have an insertion losses maximum of 0.5 dB for the unit cell of a DK 3.

Figure 24:
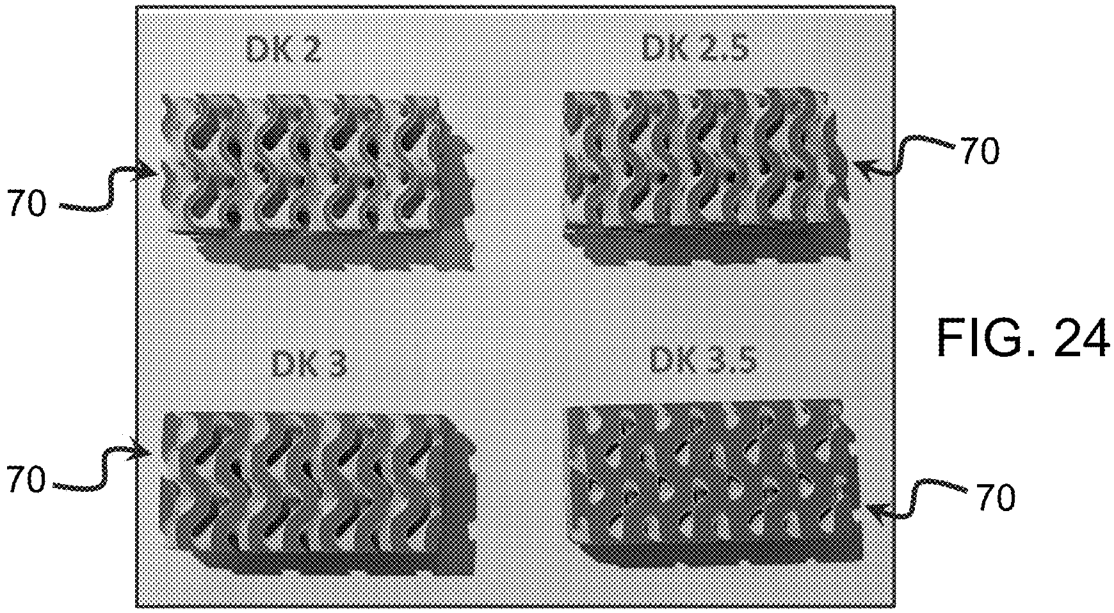
FIG. 24 shows the fabricated unit cells samples of DK 2, 2.5, 3 and 3.5.
Figure 25A:
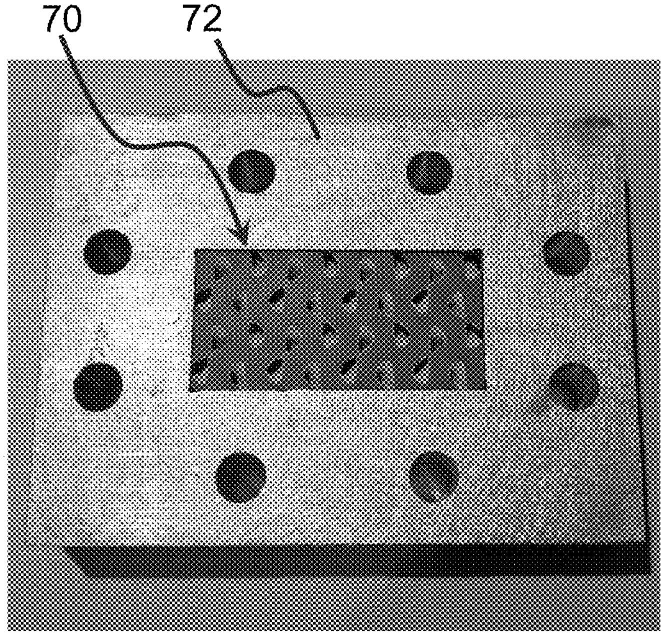
FIGS. 25A-25B depict the fabricated unit cell sample of DK 3 inside the waveguide chim (FIG. 25A), and measurement set-up of the unit cell samples using Rohde & Schwarz VNA and waveguide kit (FIG. 25B)
Figure 25B:
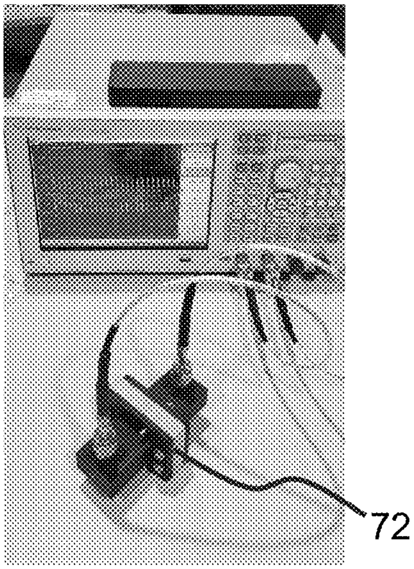

Four unit cell samples 70 of DK 2, 2.5, 3, and 3.5 were fabricated by 3D Fortify using 3D printing technology, as shown in FIG. 24. Each unit cell sample consisted of an array of 4×2 unit cells. The sample size was 20 mm×40 mm×15 mm. It was positioned between two WR159 waveguides using a 15 mm thick aluminum waveguide chim (spacer) 72. FIG. 25A and FIG. 25B depict the unit cell sample 70 inside the waveguide spacer 72 and the measurement setup of the unit cell samples, respectively.

Figure 26:
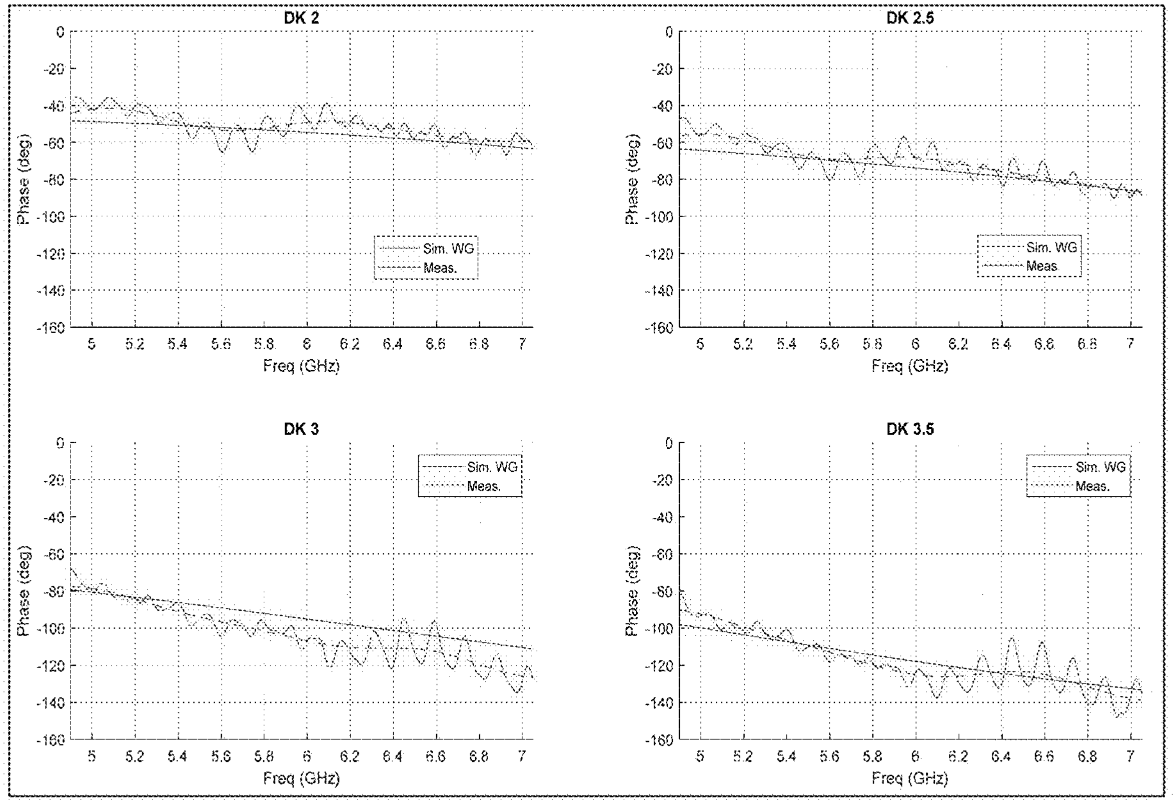
FIG. 26 shows diagrams representative of the comparison between simulation and measurements results of the phase response of the gyroid unit cells as a function of frequency.
Figure 27:
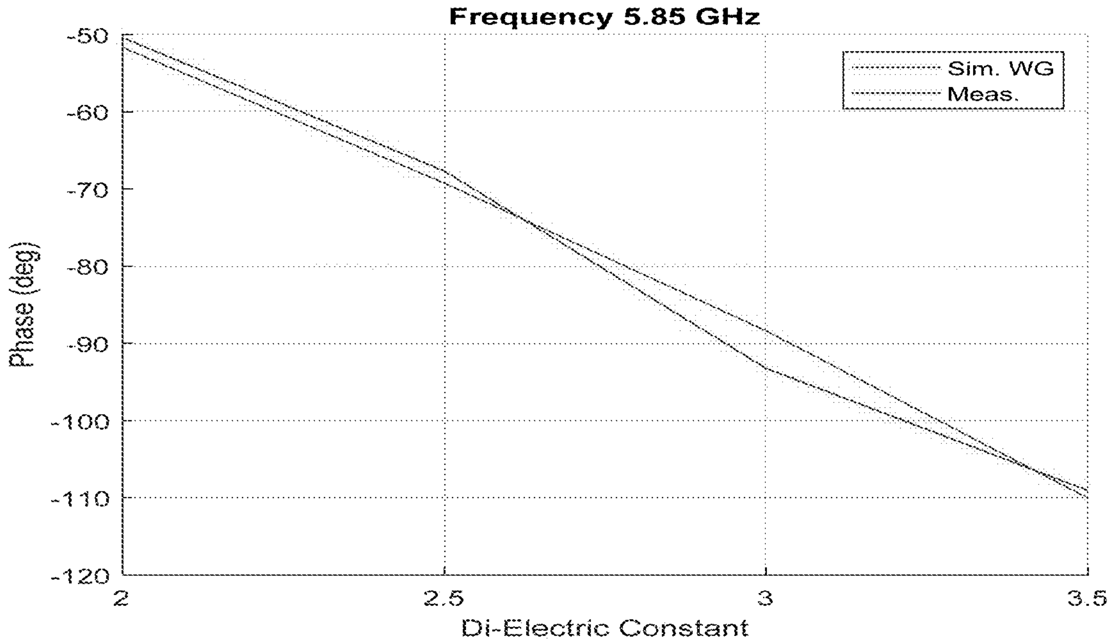
FIG. 27 is a diagram representative of the comparison between simulation and measurements results of the phase response of the gyroid unit cells as a function of the effective DK at 5.85 GHz.

FIG. 26 represents the results of comparison between the measured and simulated phase response of the unit cells. These results showed a sufficient agreement between the simulation and the measurements. It should be noted that the ripples in the measurements are due to the phase calibration of the VNA coax cable. The phase calibration requires a calibration kit for the cables that was not available at the moment of the calibration. The measured phase response at 5.85 GHz compared to simulations as a function of the unit cells DK is presented in FIG. 27. It can be seen that the measured phase is in agreement with the simulation.

Single Dielectric Unit Cell 80

An alternative meta surface unit cell configuration 80 consists of a cube 82 fabricated from a single dielectric material. The size of the cube 82 varies between 1.5 mm to 10 mm. The unit cells 80 of the meta surface structure were connected to each other using a 1.5 mm thick interconnections 84 fabricated from the same dielectric material as the cube 82.

Figure 28:
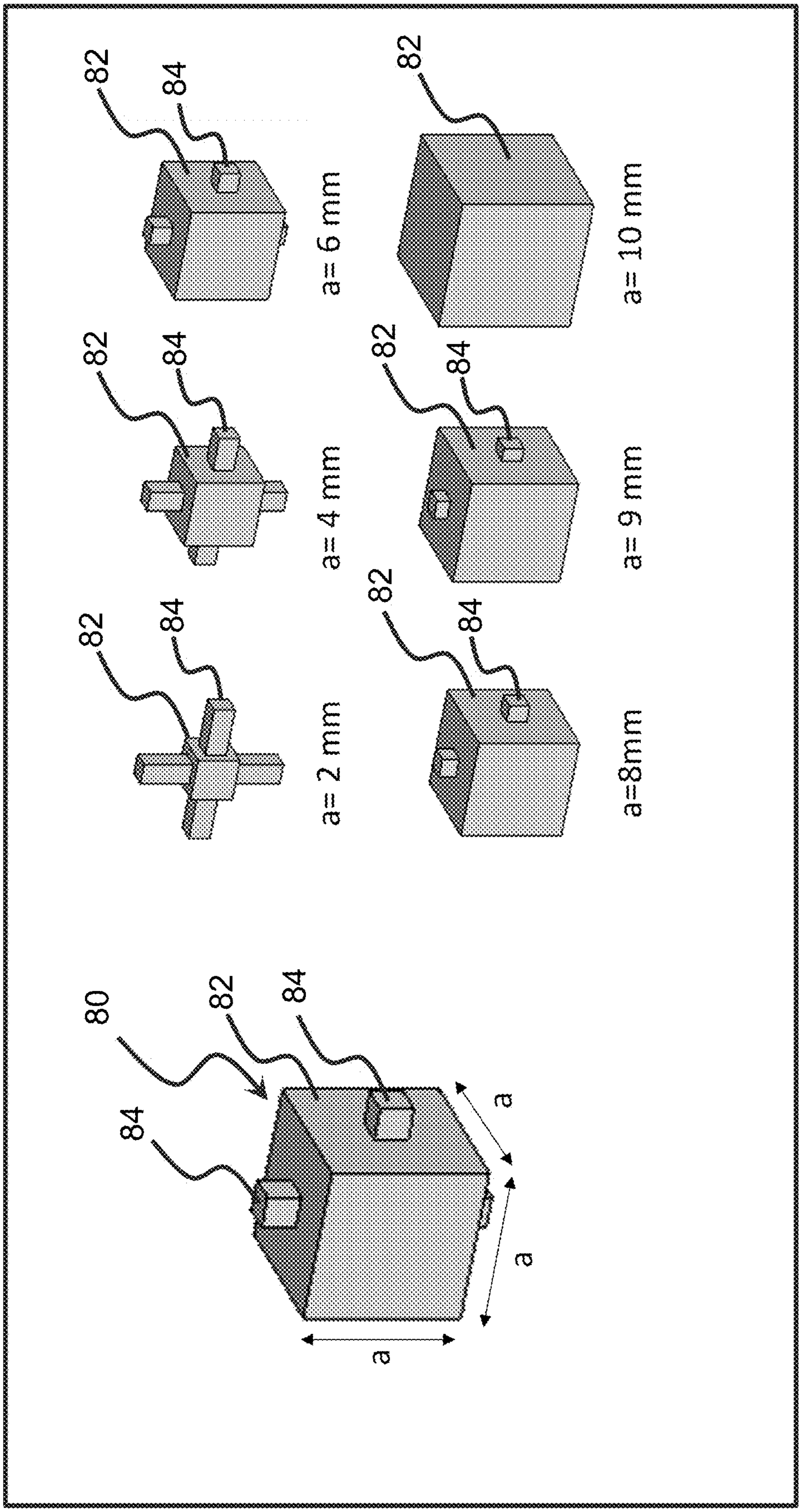
FIG. 28 is a pictorial view of the single dielectric unit cell for different sizes.

FIG. 28 shows the meta surface single dielectric unit cells 80. These unit cells 80 depend on the size "a" of the cube 82 to provide a desired phase shift. This unit cell 80 was analyzed using CST periodic boundary conditions, and the magnitude and phase offset were extracted for different unit cell sizes. As an example, the single dielectric material used for the cube 82 and the interconnections 84 can be Zetamix ε with a dielectric constant of 7.5 and tangent loss of 0.0015.

Figure 29:
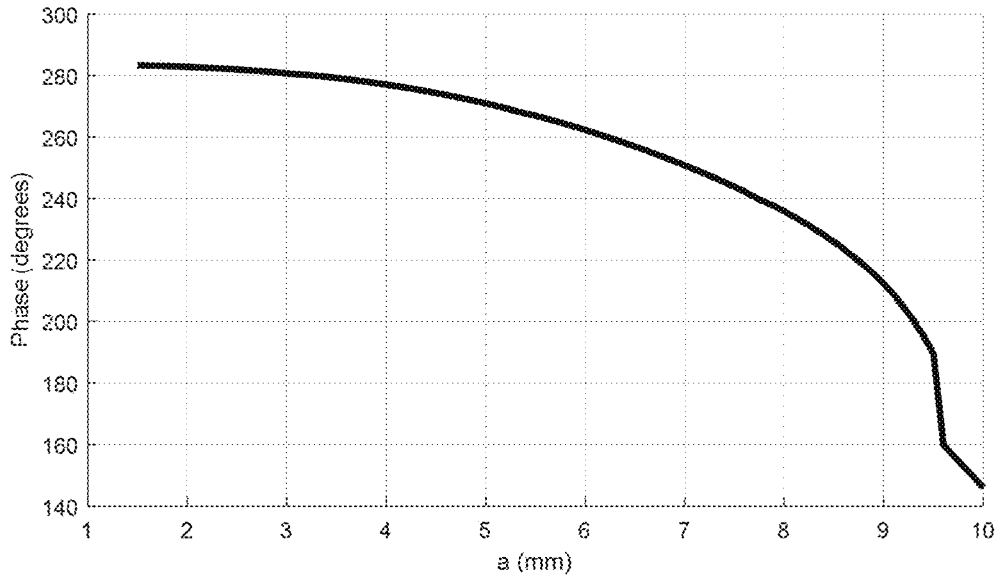
FIG. 29 is a diagram of the S21 phase response of the single dielectric unit cell at 5.85 GHz as a function of the size.
Figure 30:
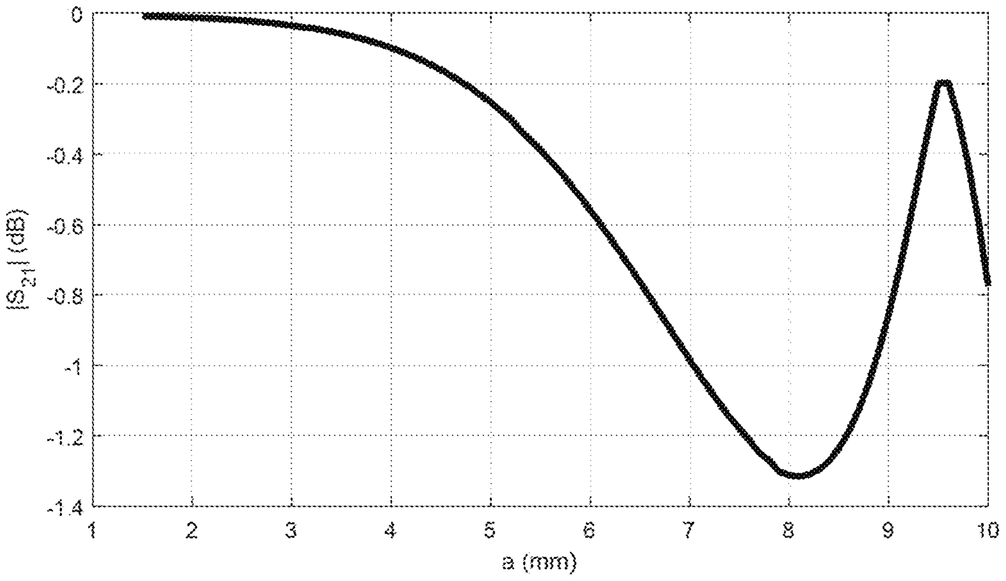
FIG. 30 is a diagram of the/S21/insertion loss of the single dielectric unit cell at 5.85 GHz as a function of the size.

The simulated results of the scattering parameters, S21 phase, and magnitude are shown in FIG. 29 and FIG. 30, respectively. These results show that the phase range of the single dielectric unit cell 80 is between 287° to 146° as a function of the size varying from 1.5 mm to 10 mm, respectively. Therefore, the maximum phase range achievable is 135°. Unit cells 80 have an insertion loss maximum of 1.38 dB for the unit cell of 8.2 mm.

Figure 31:
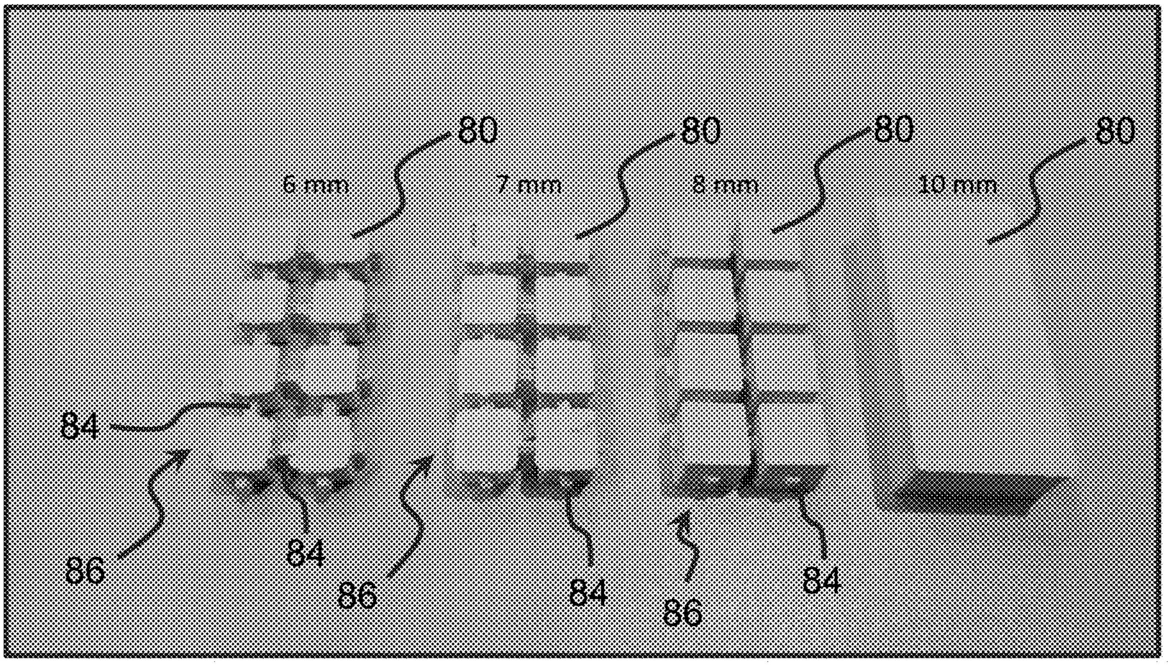
FIG. 31 depicts 3D Zetamix ε filament unit cell samples of different sizes.
Figure 32:
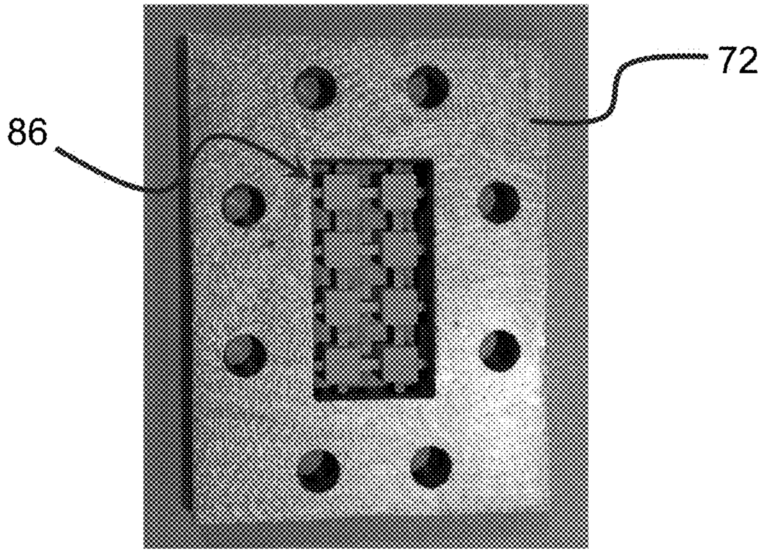
FIG. 32 shows the unit cell sample installed in the waveguide chim.

The single dielectric unit cells 80 were printed out of Zetamix ε filament. The Zetamix ε filament is 40-90% Titanium Dioxide (TiO2) ceramic dielectric filament. The printing method used was Fused Deposition Modeling (FDM), and successful printing occurred using a Lulzbot Taz5 printer. The printed samples 86 of the interconnected dielectric unit cells 80 are shown in FIG. 31. Samples 86 were printed to fit into a 10 mm thick waveguide chim (spacer) 72, similar to that shown in FIG. 25A. FIG. 32 shows the samples 86 disposed in the waveguide chim 72.

Given that the utilized filament is fabricated mostly of ceramic, the printing process using the FDM process is somewhat problematic. Printing success occurred through trial and error using several brands of FDM printers. Initial approach was based on dual extrusion using the Zetamix ε filament and water-soluble support on an Intamsys FUNMAT PRO 410, which proved to be unsuccessful due to the water-soluble material. Printing using single extrusion on the Lulzbot Taz 5 eventually proved to be successful. Since the Taz 5 is not capable of dual extruding, the Zetamix filament itself was used to print the needed supports for the cantilever sections shown in FIG. 31. Due to the nature of the filament, a very low printing speed of 9 mm/s was used to decrease the porosity of the print and decrease the likelihood of failures.

Figure 33:
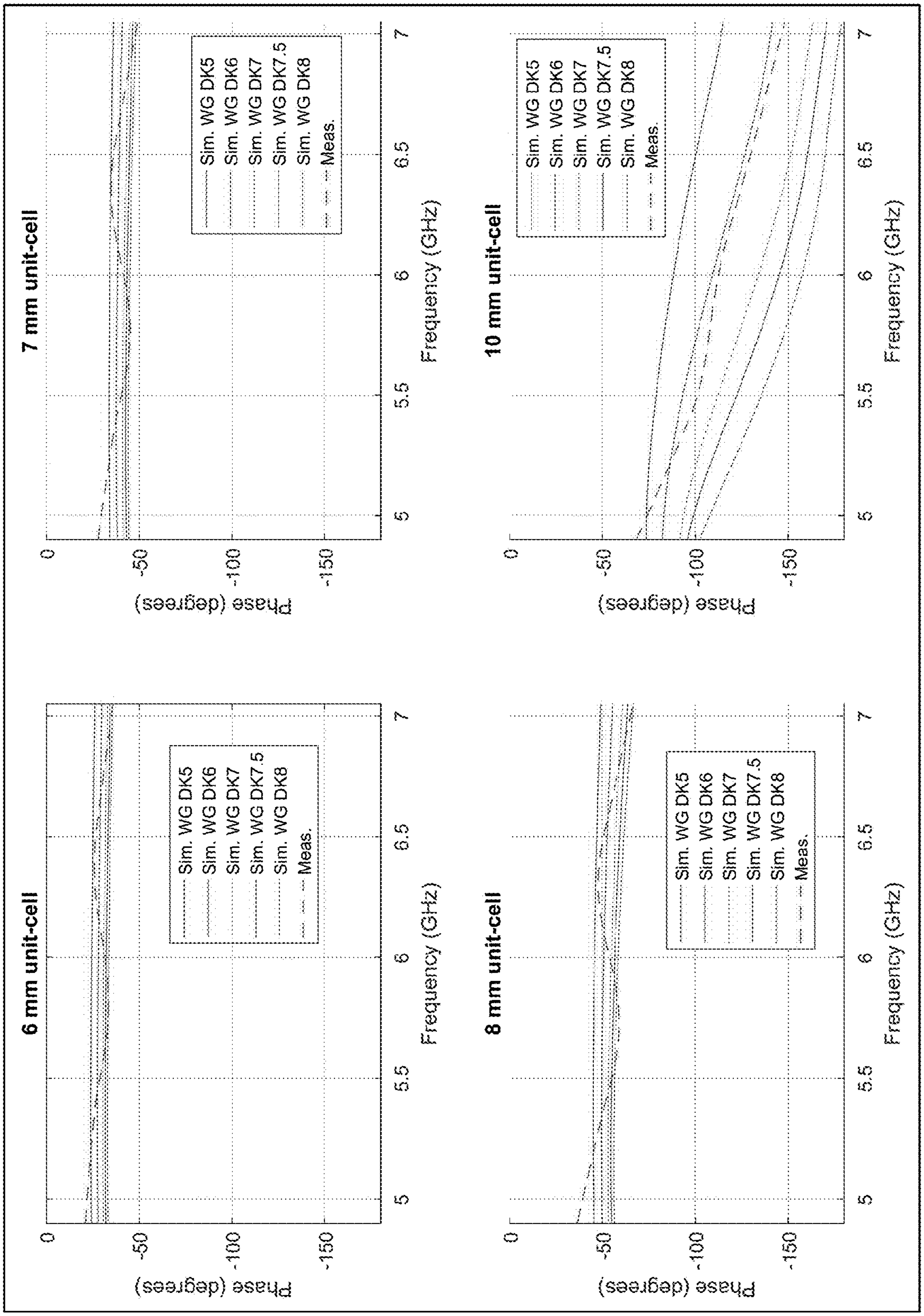
FIG. 33 shows diagrams representative of the comparison between simulation and measurements results of the phase response of the single dielectric unit cells of different sizes as a function of frequency.
Figure 34:
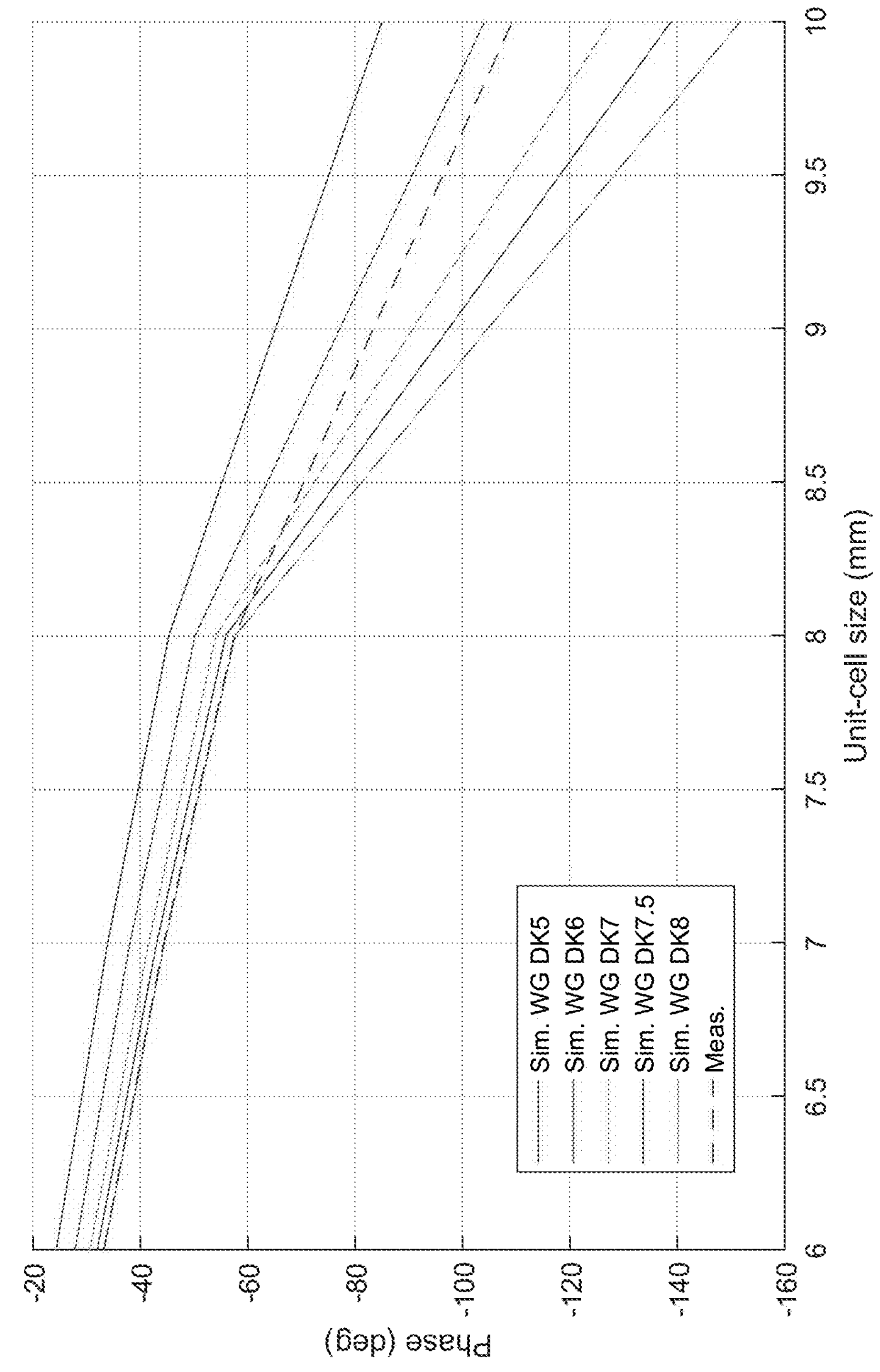
FIG. 34 shows diagrams representative of the comparison between simulation and measurements results of the phase response of the single dielectric unit cells as a function of the size at 5.85 GHz.

FIG. 33 is representative of comparison between the measured and simulated phase response of the 6, 7, 9, and 10-mm single dielectric unit cells. The measured phase response at 5.85 GHz is compared to simulations as a function of the unit cells size is presented in FIG. 34. These results showed an agreement between the simulation and the measurements when a DK of 6 is considered in the simulation.

Figure 35B:
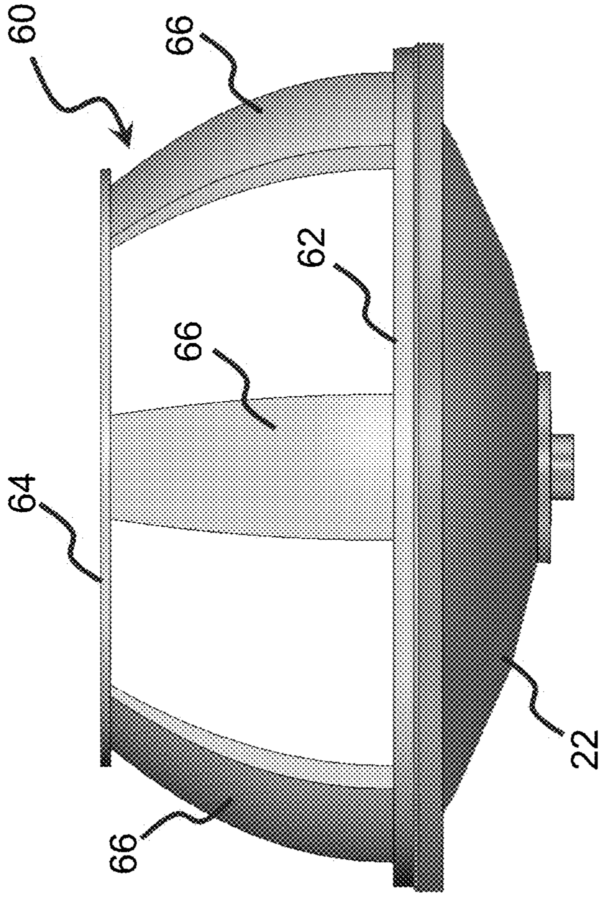
FIGS. 35A-35B represent a 3D view of the parabolic reflector with the meta surface support simulated in CST MWS with FIG. 35A being a frontal view and FIG. 35B being a side view.
Figure 35A:
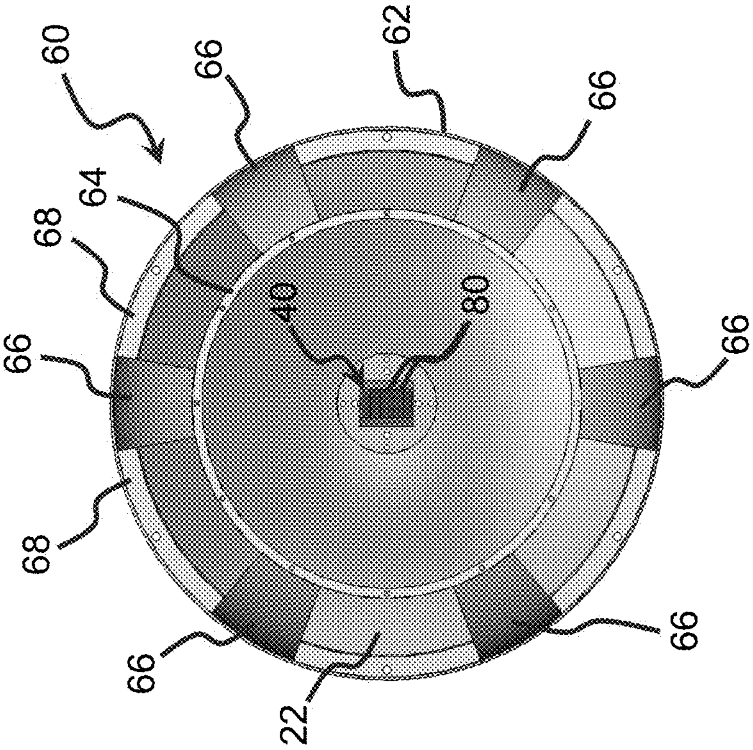

Meta Surface Optimization and Design on a Test Case Gyroid Unit Cell Meta Surface In order to quantify the performance of the fabricated meta surface structure/lens 40, as well as its synthesis method, the parabolic reflector was modeled with the meta surface mechanical support 60 using CST MWS as shown in FIGS. 35A-35B. The meta surface structure 40 having a DK of 3.9 and a tangent loss of 0.02 was simulated on the mechanical support 60.

Figure 36B:
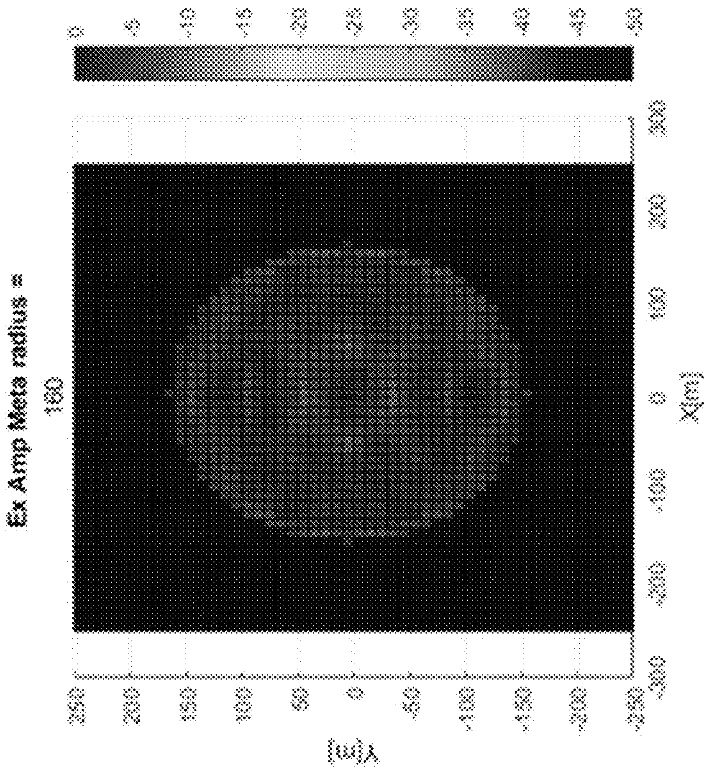
FIGS. 36A-36B are holograms of the electric filed Phase (FIG. 36A) and electric field magnitude (FIG. 36B) for the subject meta surface support covering a circular area having a radius of 160 cm at 5.85 GHz.
Figure 36A:
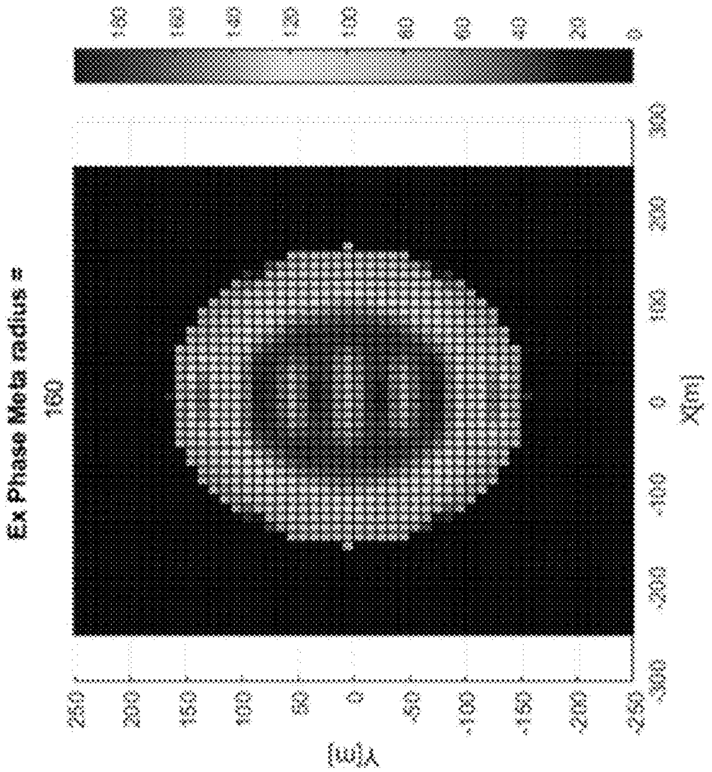

First, parabolic reflector 22 was simulated, and the phase and the magnitude of the electrical field were extracted at the top of the meta surface's mechanical support 60 at 5.85 GHz. The electrical field phase and magnitude are shown in FIG. 36A and FIG. 36B, respectively. The phase of the electric field varied from 0° to 180° inside a 32 cm diameter (the size of the meta surface structure 40). Hence, the meta surface unit cell 80 must have at least 180° of phase range to perfectly correct the electric field phase. It should be noted that the meta surface structure 40 consisted of 805 unit cells 80, with each unit cell 80 being dimensioned as 10 mm×10 mm×15 mm.

Figure 37:
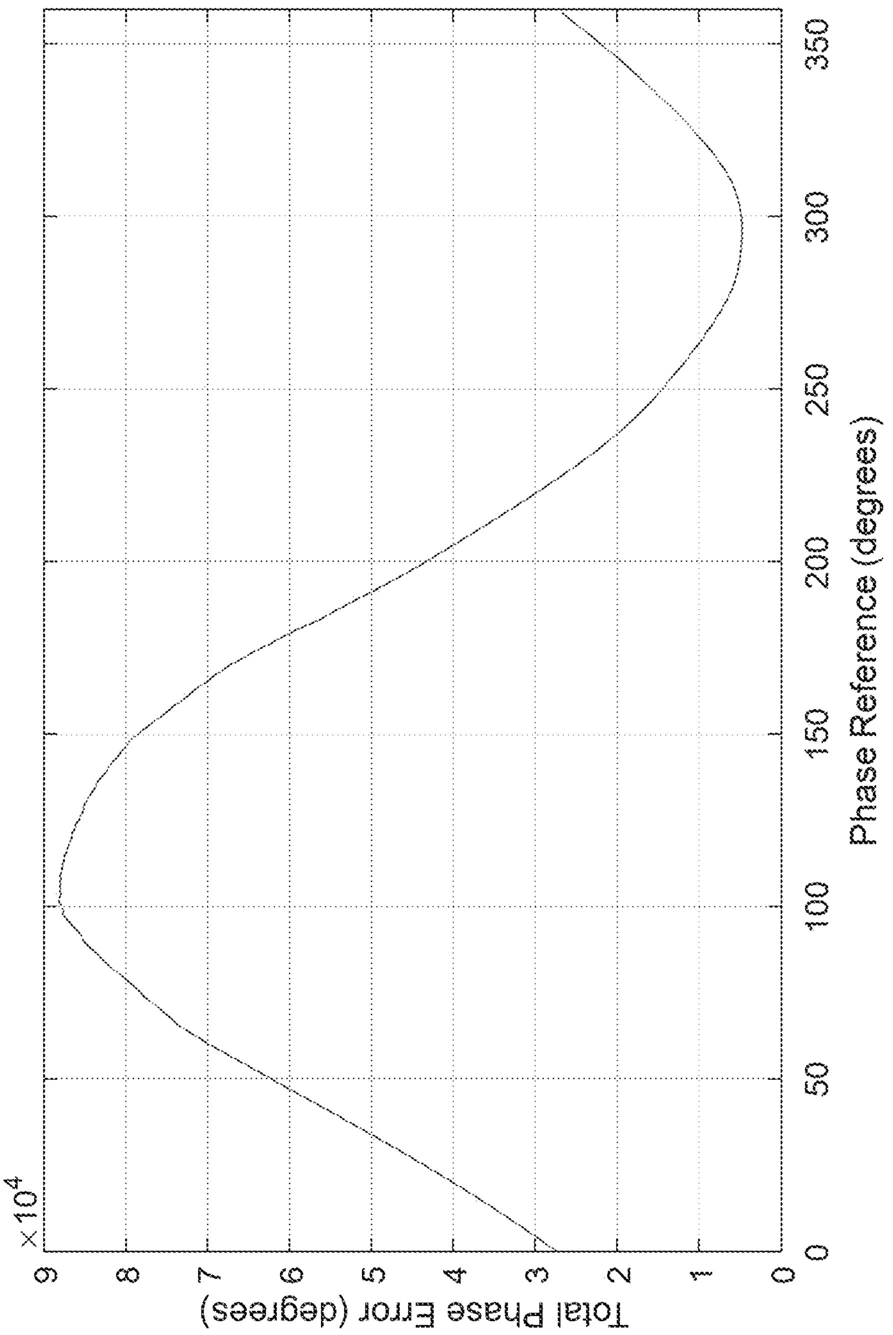
FIG. 37 is a diagram of the meta surface phase error vs. Phase reference using gyroid unit cell.

To synthesize the DK distribution of the meta surface structure/lens 40 that would be capable of correcting the electrical field, the phase distribution of the meta surface structure/lens 40 was first calculated. The phase required for the meta surface lens, $Phase_{meta}$, is calculated from Equation 1.

$$Phase_{meta} = Phase_{E\ field} - Phase_{Reference} \qquad \text{Equation 1}$$

where the phase reference, $Phase_{Reference}$, is the desired phase of the electrical field at the output of the meta surface lens to maximize the gain in the broadside direction. The phase reference was chosen as the phase reference that provides the smallest phase error across the meta surface structure/lens using the gyroid unit cell. The total phase error of the meta surface structure/lens as a function of the phase reference is shown in FIG. 37. It can be seen that a phase reference of 256° provides the smallest phase error of 4754° which corresponds to a 5.9° phase error per unit cell, and therefore can be chosen as a phase reference of the meta surface structure/lens.

Figure 38A:
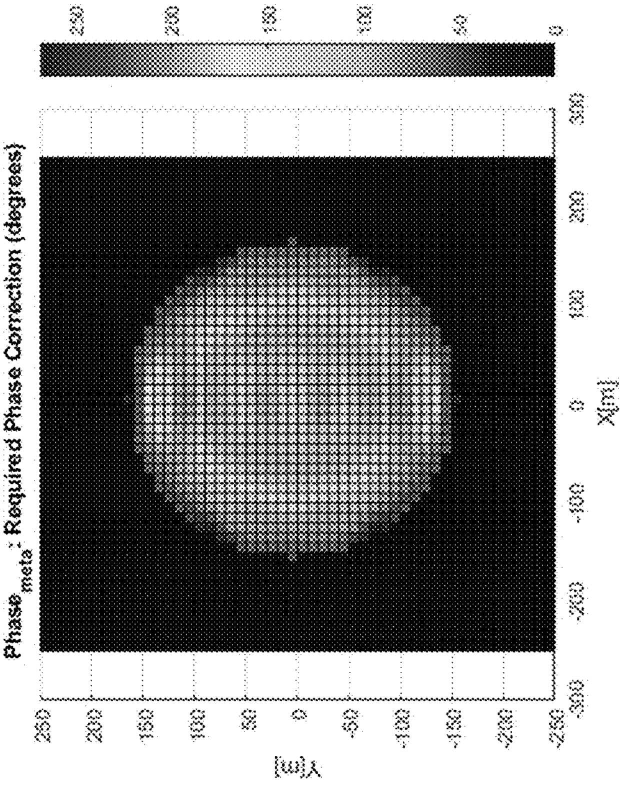
FIGS. 38A-38D are holograms of the required phase correction (FIG. 38A) and implemented Phase correction (FIG. 38B) for the meta surface calculated for a phase reference of 256 degree, Phase error on the unit cell (FIG. 38C), and electric filed phase at the output of the meta surface lens (FIG. 38D)
Figure 38B:
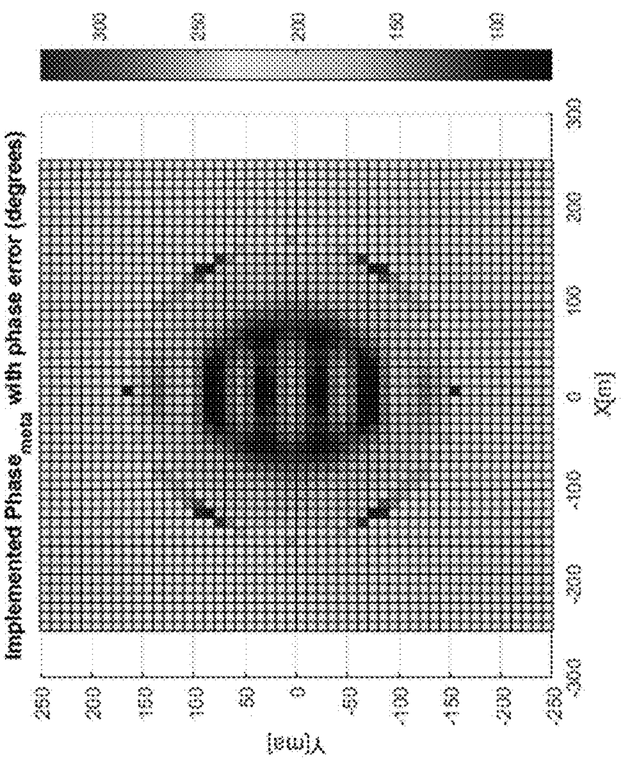
Figure 38C:
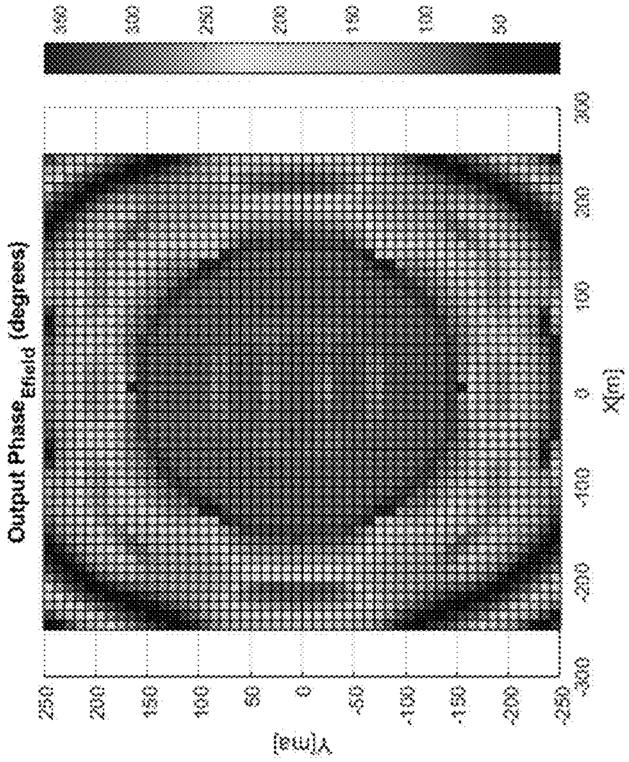
Figure 38D:
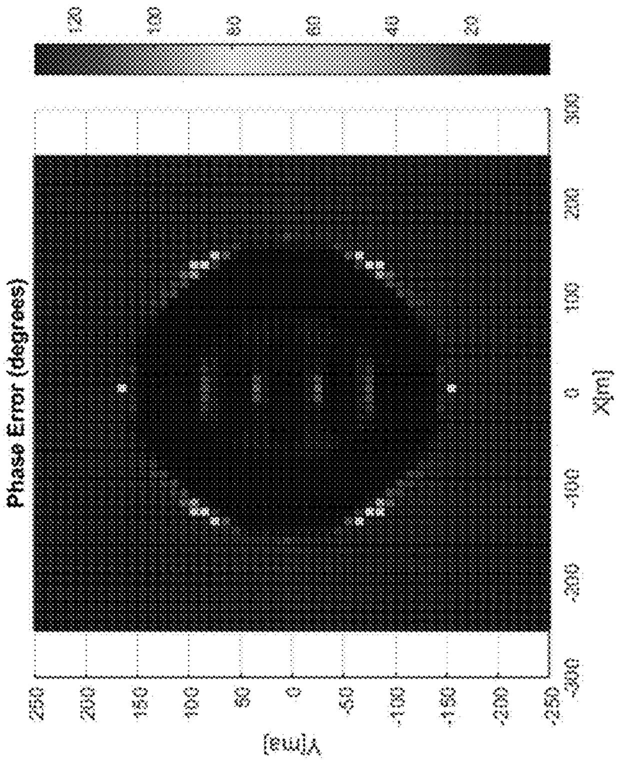

The calculated required phase correction $Phase_{meta}$ and the implemented phase correction (taking into account the phase errors) for the meta surface were calculated for a phase reference of 256°, as shown in FIG. 38A and FIG. 38B, respectively. The phase error on each unit cell is shown in FIG. 38C, and the electric field phase at the output of the meta surface lens is shown in FIG. 38D. It can be seen that the electrical field is equiphasic around 256° in the area where the meta surface structure is present.

Figure 39B:
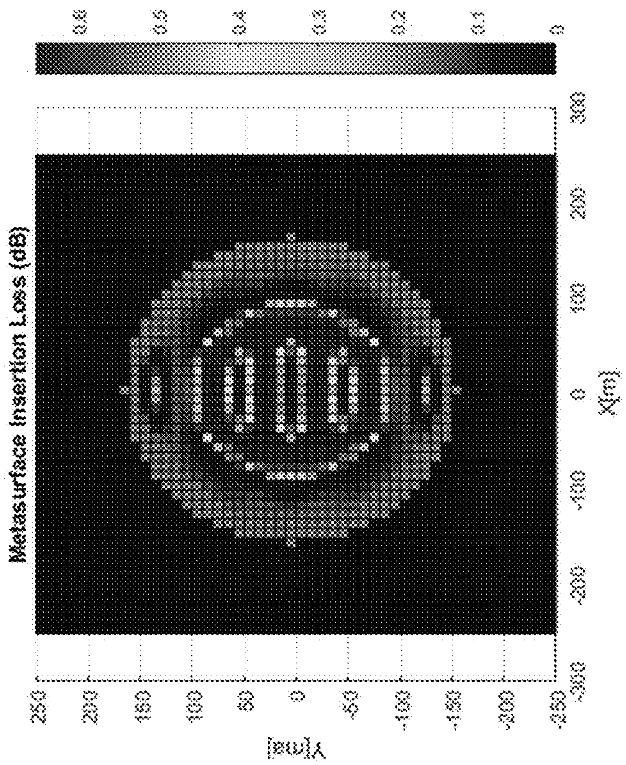
FIGS. 39A-39B are holograms of the DK distribution (FIG. 39A) and insertion loss distribution (FIG. 39B) for the parabolic antenna with the meta surface.
Figure 39A:
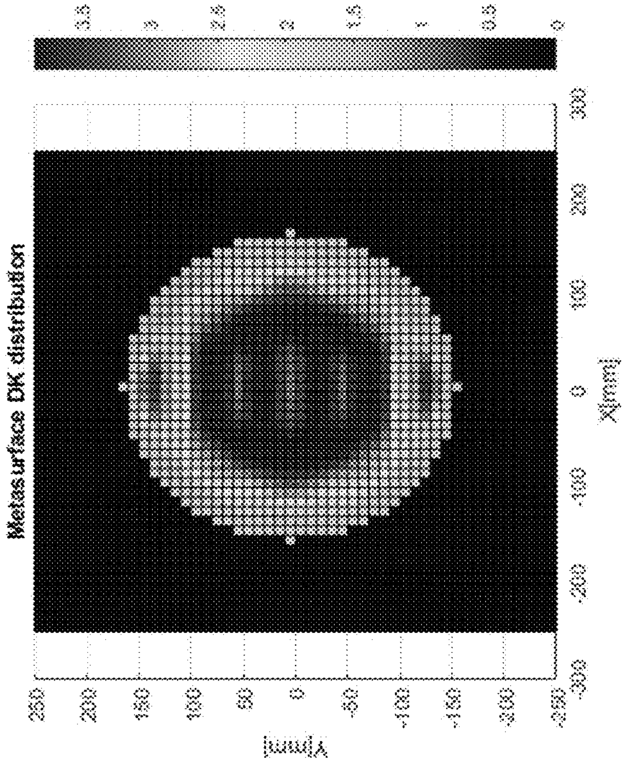

Based on the required $Phase_{meta}$, the DK distribution of the gyroid meta surface can be calculated using the CST MWS simulation of the relationship between the phase $<S_{21}$ and the dielectric constant as presented in FIG. 22. The calculated DK distribution of the meta surface lens is shown in FIG. 39A. The insertion losses at each unit cell of the meta surface lens are also shown in FIG. 39B.

Figure 40B:
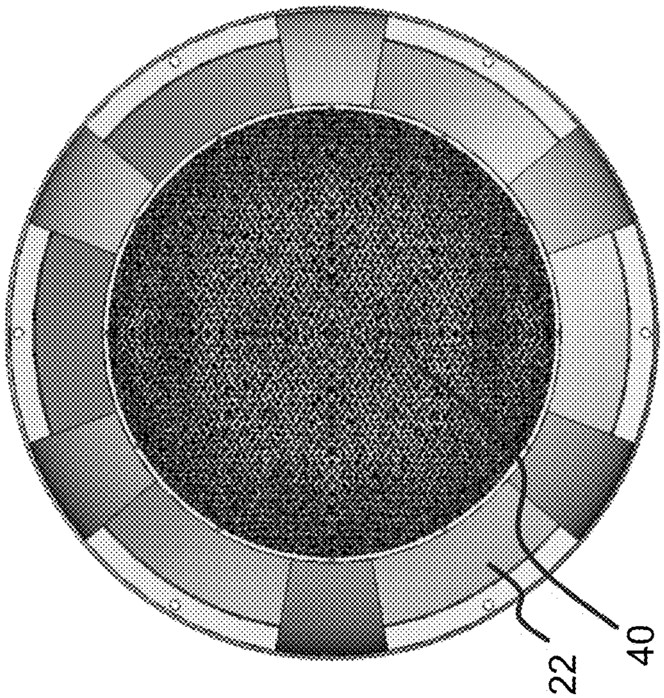
FIGS. 40A-40B show the side 3D view (FIG. 40A) and top view (FIG. 40B) of the gyroid meta surface lens installed above the parabolic reflector in the subject antenna in CST MWS.
Figure 40A:
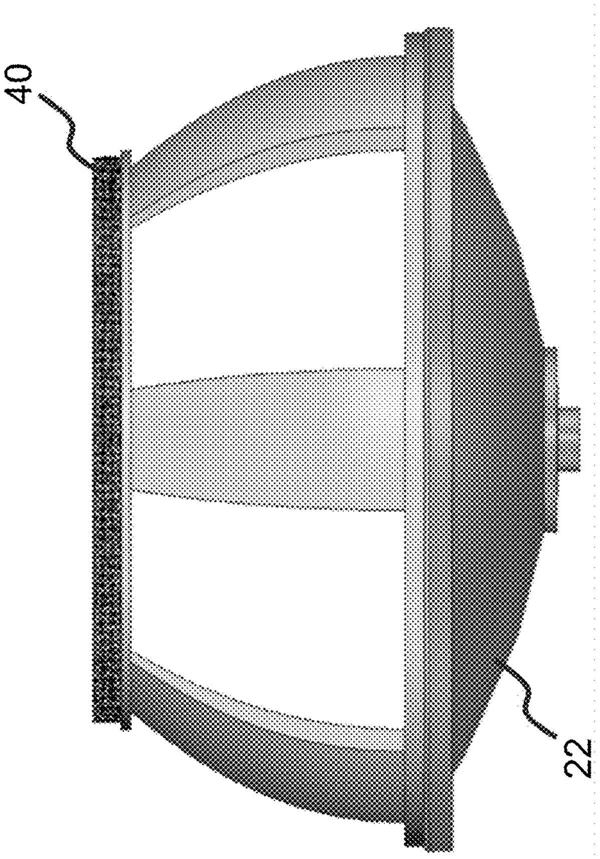

To validate the meta surface synthesis method described above, a 3D model of the meta surface structure/lens 40 was created based on the calculated DK meta surface distribution and simulated as being positioned over (or on the top of) the parabolic reflector 22 using CST MWS. The parabolic reflector 22 with the gyroid meta surface lens 40 is shown in FIGS. 40A-40B.

Figure 41:
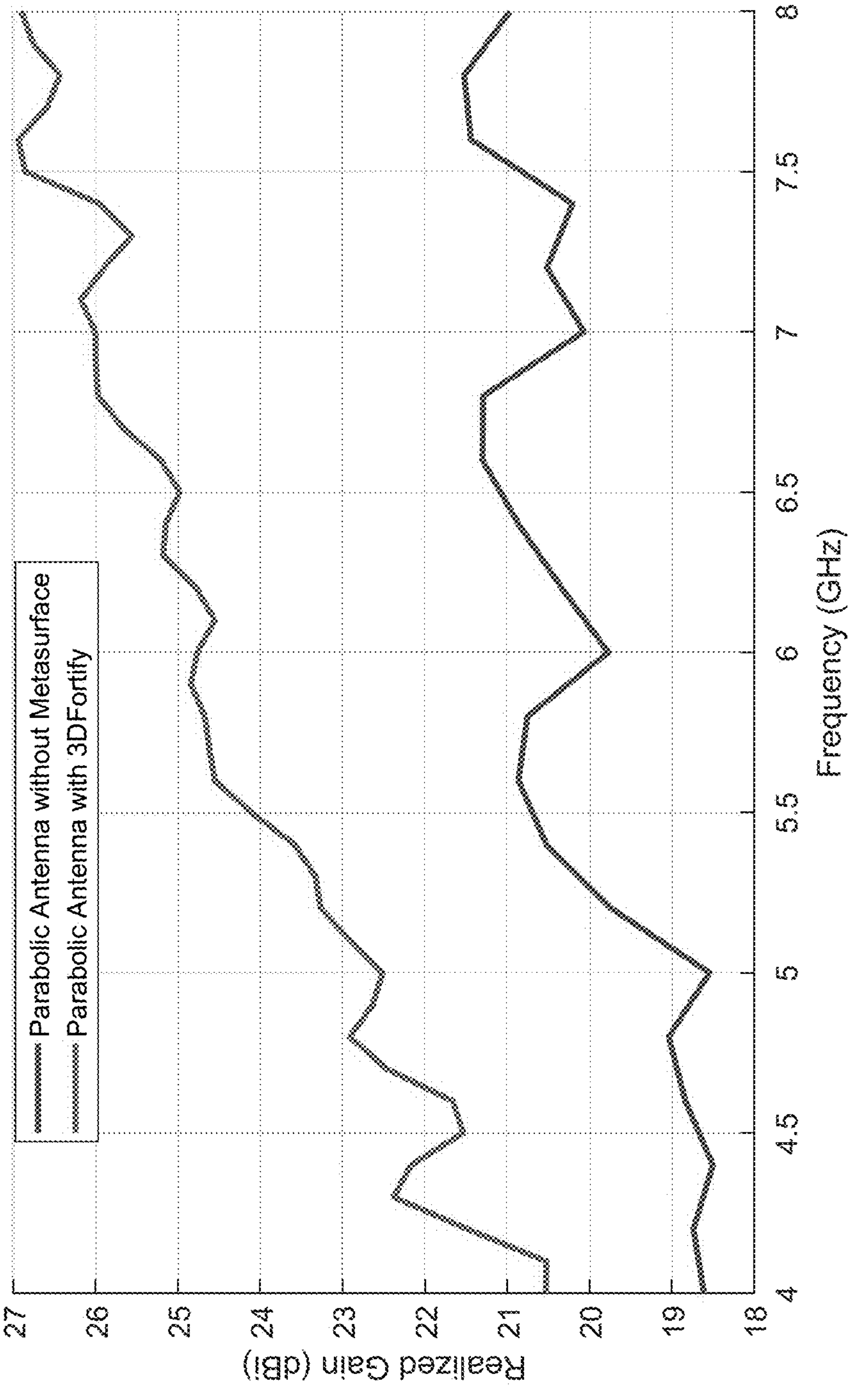
FIG. 41 is a diagram representative of the comparison results of the realized gain of the parabolic reflector of the subject antenna with the meta surface lens and typical antenna without the meta surface lens.
Figure 42B:
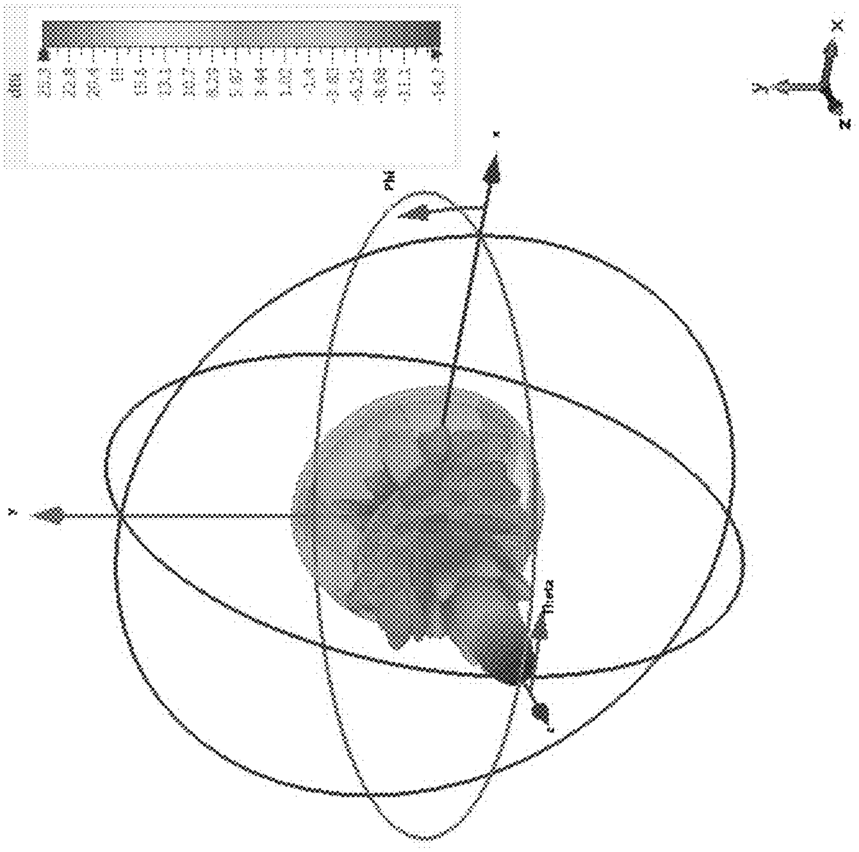
Figure 42A:
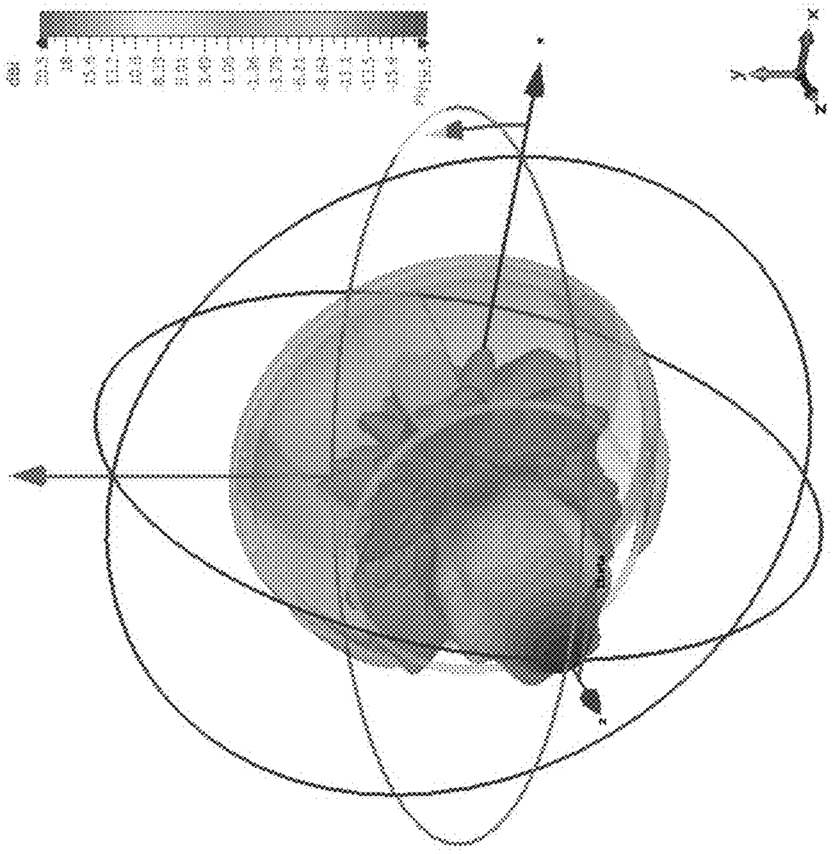
Figure 43:
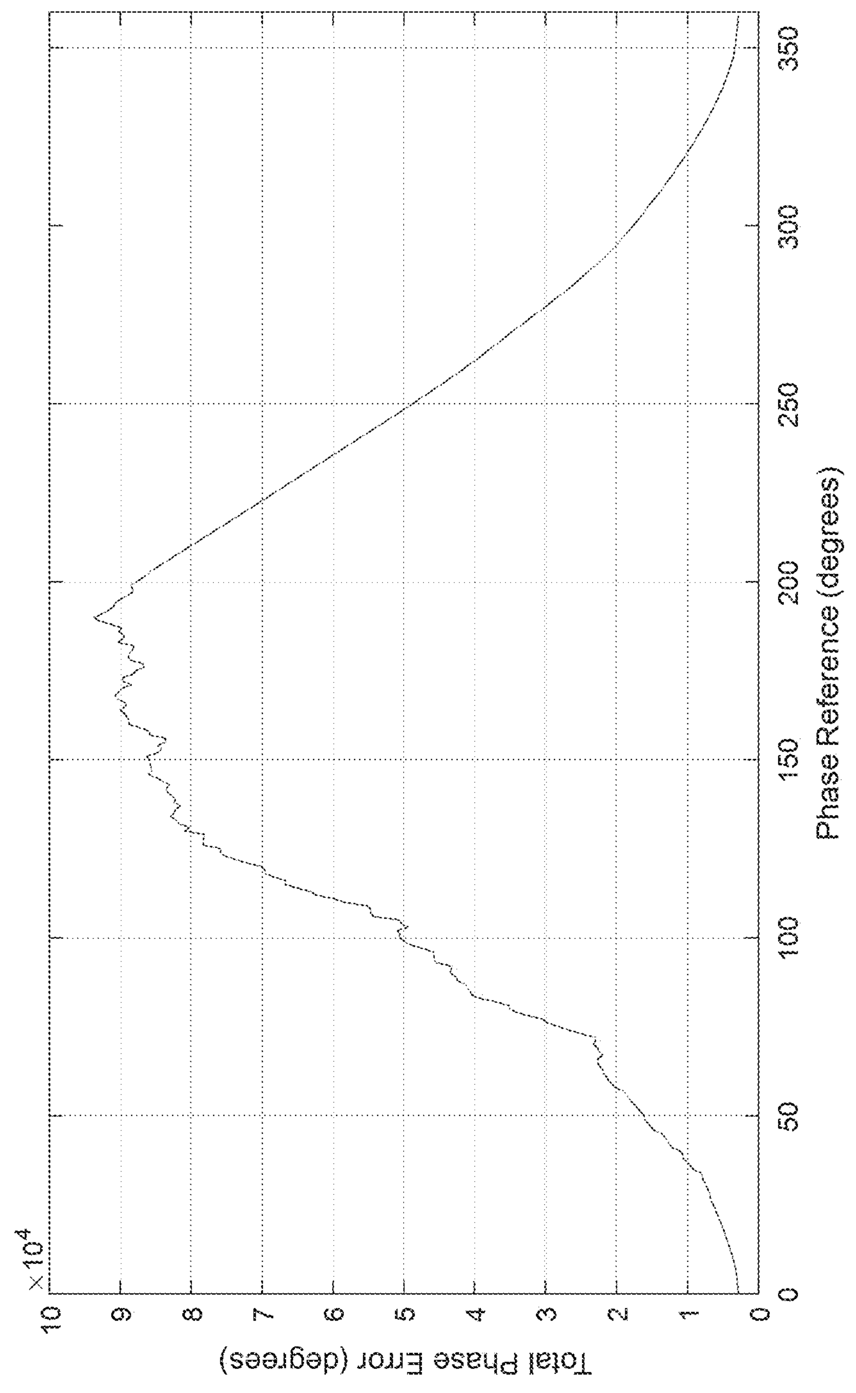
FIG. 43 is a diagram representative of the meta surface phase error as a function of the phase reference using the single dielectric unit cell.

The obtained realized gain of the parabolic reflector with and without meta surface lens 40, as a function of the frequency between 4 and 8 GHz, is depicted in FIG. 41. It is shown that, with the meta surface structure positioned over the parabolic reflector 22, the realized gain is enhanced over the total simulated bandwidth by at least 3 dB. At 5.85 GHZ, the realized gain is 20.7 dBi and 24.7 dBi without and with the gyroid meta surface lens, respectively. This gain enhancement corresponds to a 4 dBi of gain improvement. The corresponding realized gain 3D patterns for the parabolic reflector with and without the meta surface lens at 5.85 GHz are shown in FIG. 42A and FIG. 42B, respectively.

Single Dielectric Meta Surface Unit Cell

To synthesize the size distribution of the meta surface lens, the optimal phase distribution of the meta surface lens was first calculated. The total phase error of the meta surface structure/lens as a function of the phase reference is shown in FIG. 37. It can be seen that 359° provides the smallest phase error that was chosen as a phase reference of the meta surface structure.

Figure 44B:
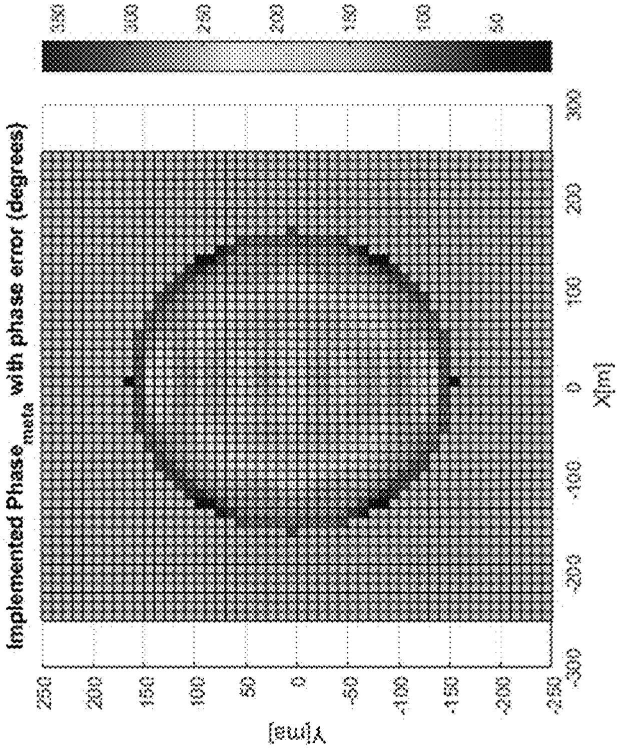
FIGS. 44A-44D are holograms of a calculated required Phase correction (FIG. 44A) and implemented Phase correction (FIG. 44B) for the meta surface, as well as the Phase error for each unit cell (FIG. 44C) and the electric filed Phase at the output of the meta surface lens (FIG. 44D)
Figure 44A:
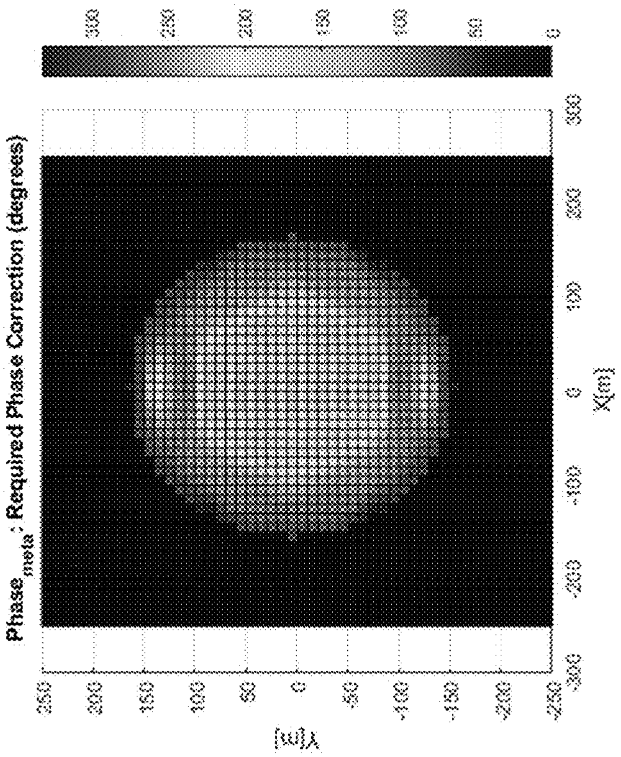
Figure 44C:
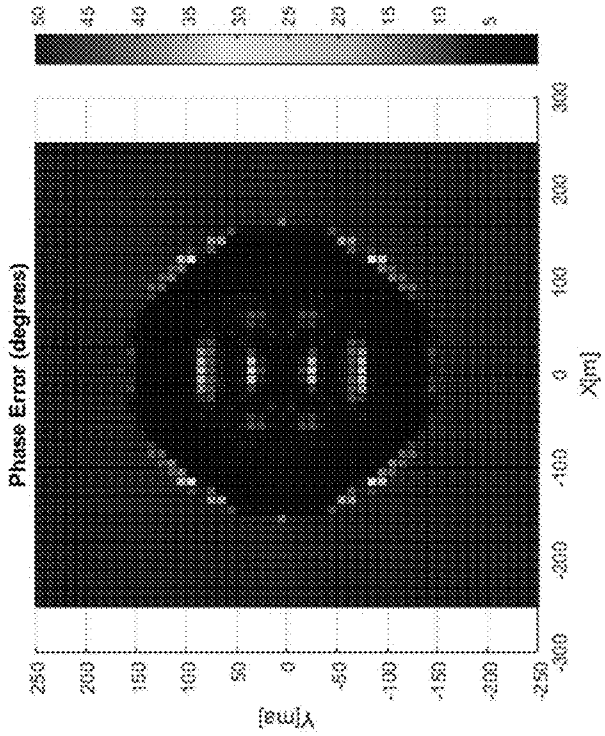
Figure 44D:
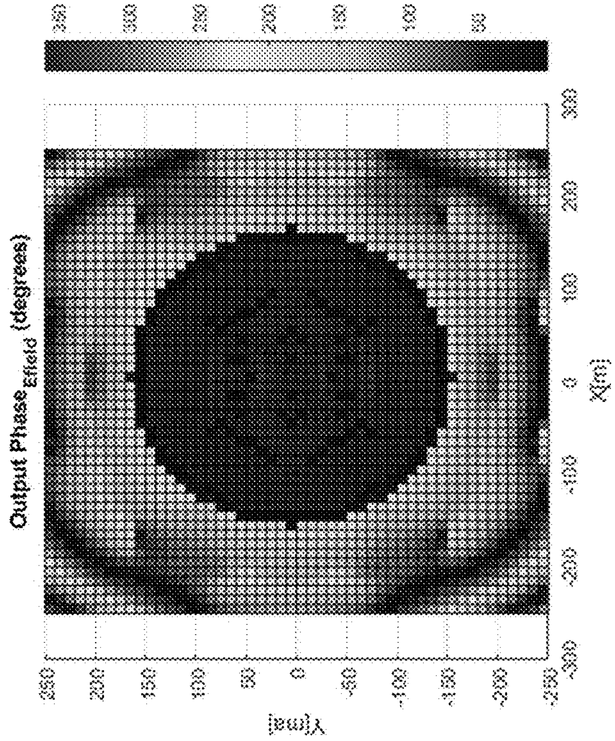

The calculated required Phase correction $Phase_{meta}$ and the implemented Phase correction (taking into account the phase errors) for the meta surface structure were calculated for a phase reference of 256°, as shown in FIG. 44A and FIG. 44B, respectively. The Phase error on the unit cells on each unit cell is shown in FIG. 44C, and the final electric field phase at the output of the meta surface lens is shown in FIG. 44C. It can be seen that the electrical field is equiphasic in the area where the meta surface is present.

Figure 45B:
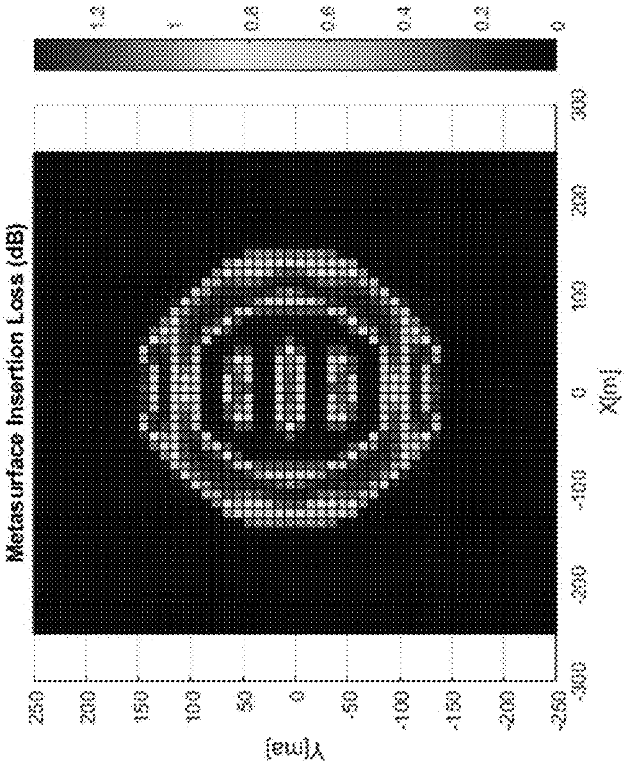
FIGS. 45A-45B are holograms of the DK distribution (FIG. 45A) and insertion loss distribution (FIG. 45B) for the parabolic antenna with the meta surface.
Figure 45A:
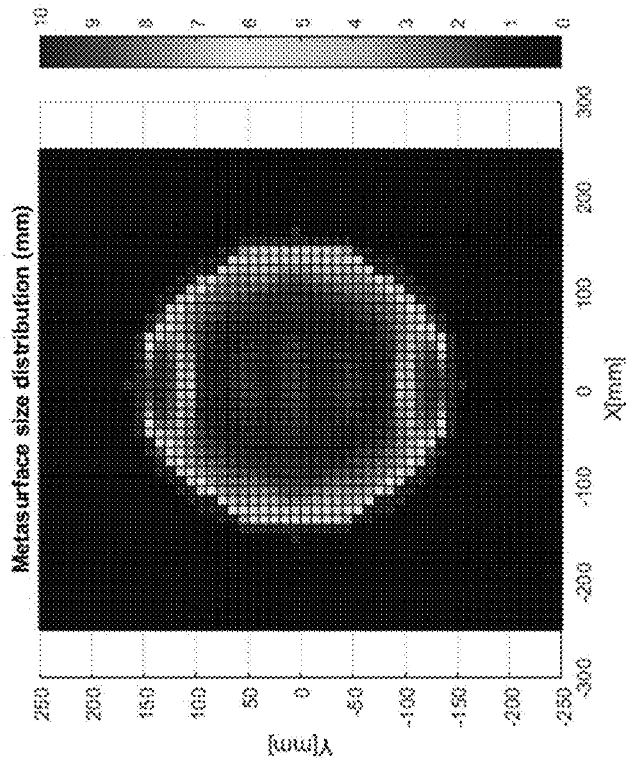

Based on the required $Phase_{meta}$ the unit cell size distribution of the single dielectric meta surface can be calculated using the CST MWS simulation of the relationship between the phase$<S_{21}$ and the dielectric constant. The calculated size distribution of the meta surface lens is shown in FIG. 45A. The insertion losses at each unit cell of the meta surface lens are shown in FIG. 45B.

Figure 46B:
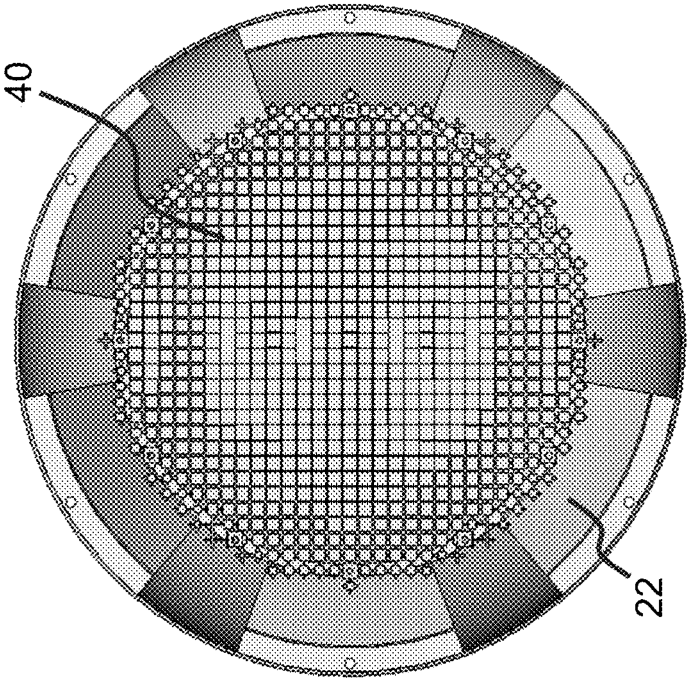
FIGS. 46A-46B show the side 3D view (FIG. 46A) and top view (FIG. 46B) of the single dielectric meta surface lens installed above the parabolic reflector in the subject antenna in CST MWS.
Figure 46A:
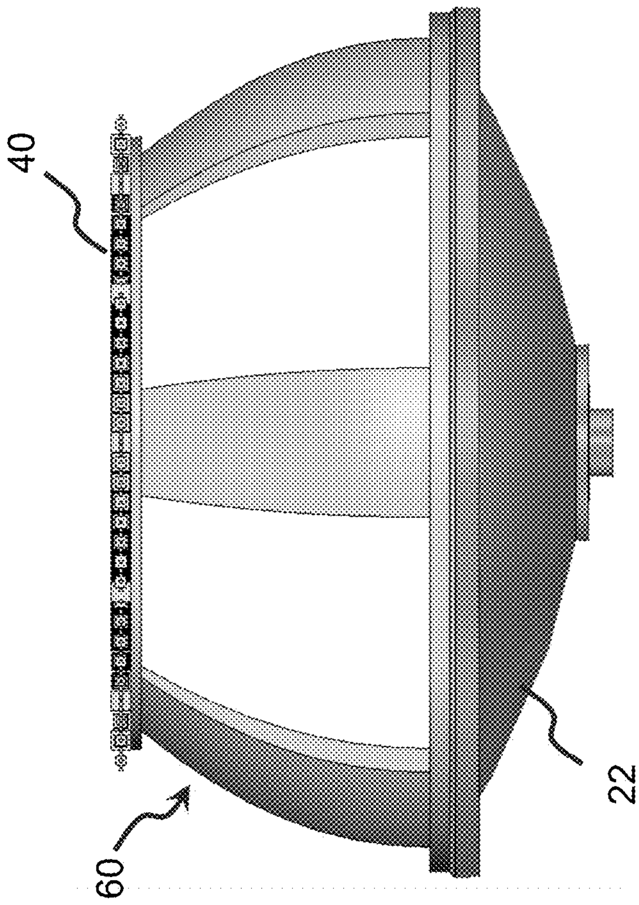

To validate the meta surface synthesis method described above, the meta surface structure 3D model was built based on the generated unit cell size meta surface distribution. This model was placed over parabolic reflector 22 (using the mechanical support 60) and simulated using CST MWS full wave simulator. Parabolic reflector 22 with the single dielectric meta surface structure 40 is shown in FIGS. 46A-46B.

Figure 47:
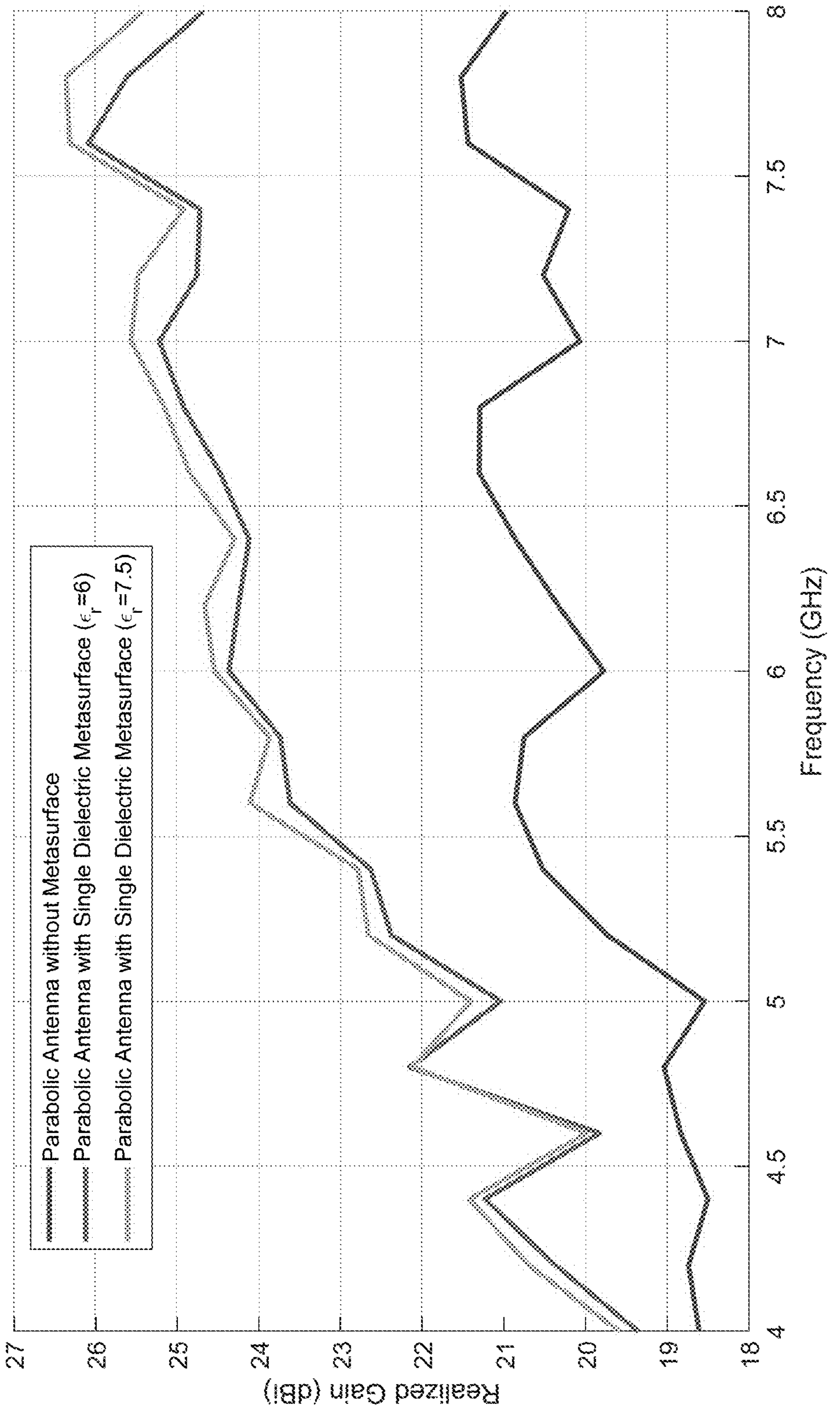
FIG. 47 is a diagram representative of the comparison results of the realized gain of the parabolic reflector of the subject antenna with the single dielectric meta surface lens and typical antenna without the meta surface lens.
Figure 48B:
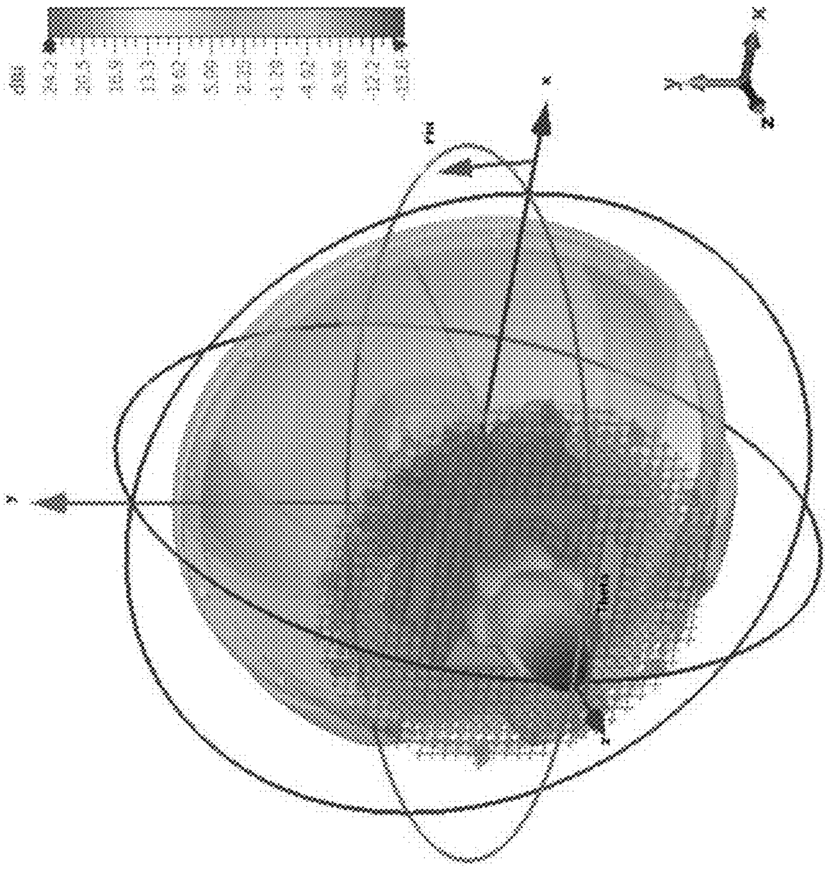
FIGS. 48A-48B are holograms representative of the realized gain 3D pattern at 5.85 GHz for the parabolic antenna without the meta surface (FIG. 48A) and for the subject parabolic antenna (FIG. 48B) with the single dielectric meta surface (DK 7.5)
Figure 48A:
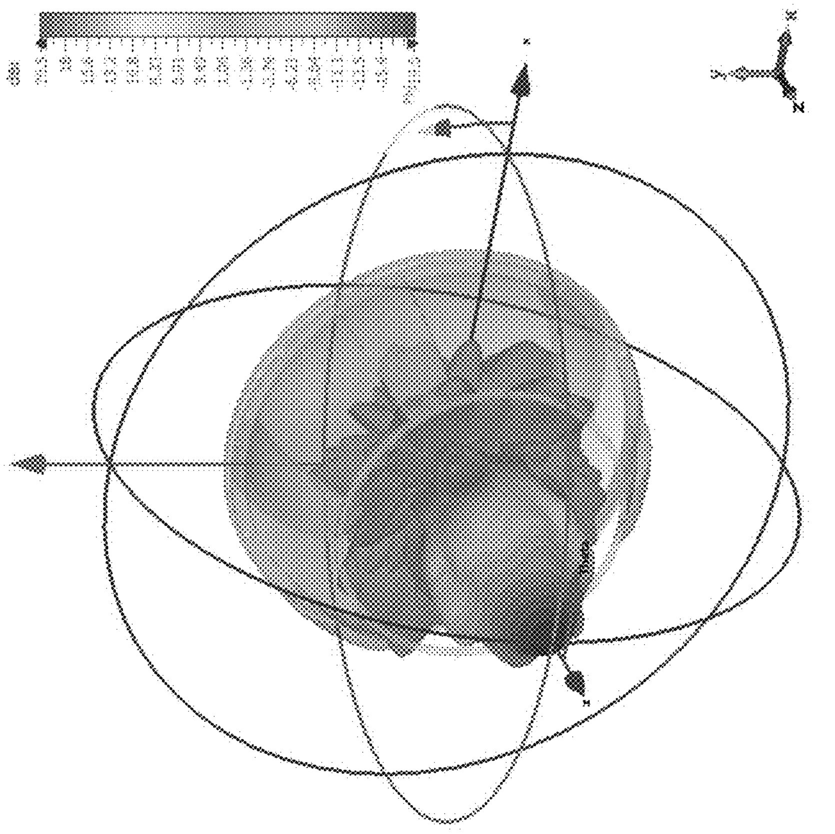

The obtained realized gain of the parabolic reflector with and without the meta surface structure, as a function of the frequency between 4 and 8 GHz, is depicted in FIG. 47. It is seen that the realized gain is enhanced over the total simulated bandwidth by at least 3 dB. At 5.85 GHZ, the realized gain is 20.7 dBi and 24.2 dBi without and with the single dielectric meta surface lens, respectively. This gain enhancement corresponds to a 3.5 dBi of gain improvement. Also, it should be noted that there is not a major difference in terms of gain enhancement if the dielectric material had a DK of 6 instead of 7.5. The corresponding realized gain 3D patterns for the parabolic reflector with and without the meta surface structure at 5.85 GHz are shown in FIG. 48A and FIG. 48B, respectively.

Meta Surface Lens Placed Over Parabolic Reflector

Another alternative approach for improving the efficiency of the parabolic antenna using the meta surface structure 40, is placing the meta surface material 90 directly on the surface 92 of the parabolic reflector 22 as shown in FIGS. 1E and 49. This approach provides a lightweight solution, where the mechanical support is not used, and its effect on the EM properties of the parabolic reflector is suppressed. Additionally, such concept is mechanically stable in harsh environments (wind) and is a perfect solution for large parabolic reflectors. This approach may be combined with any other approach shown in FIGS. 1C-1F described in previous paragraphs, as, for example, depicted in FIG. 1E.

Summarizing the concept presented in the previous paragraphs, the subject novel approach to increasing the efficiency of the parabolic antenna, can be supported by the following manufacturing features:

- Meta surface lens can be made from a 3D structure or using printed circuit board technology.
- The meta surface array can be fabricated by, for example, printing (e.g., 3D printing) with a polymer (e.g., a plastic, such as a thermoplastic, and/or amorphous polymer, such as acrylonitrile butadiene styrene (ABS), or a similar material). The meta surface can subsequently be metallized with one or more metals (e.g., copper, silver, aluminum, gold, platinum, palladium, and/or steel).
- 3D shaped meta surface can be designed using any unit-cell geometrical shapes, including, for example, gyroids, cubes, cones, etc.
- PCB based meta surface can be made using any variable size geometrical shapes, including, for example, rectangular configuration, circular configuration, curved configurations, rings, etc.
- PCB based meta surface can be made as a single layer or in the form of multiple stacking layers.
- Meta surface lattice can be rectangular, hexagonal, circular, etc.
- Meta surface lens can be fabricated using any material with a dielectric constant.
- Meta surface lens can be manufactured from multiple dielectric material, (two, three, or more).
- Meta surface lens can be fabricated using a combination of a dielectric material and a conductive material (copper, gold, silver, aluminum, etc.).
- Meta surface lens can be placed anywhere above or directly on the surface of the parabolic reflector of the parabolic antenna.
- Meta surface lens can be positioned at any location in front of the parabolic antenna feed (horn feed).
- Meta surface lens can be designed and optimized using multiple tools such as, for example, synthesis tools or machine learning technology.

A highly efficient parabolic antenna has been attained by using a novel meta surface structure/lens. A meta surface structure is used as a corrective lens to provide a cost-effective way of improving the performance of existing parabolic antennas. The subject concept takes advantage of meta surfaces which are 3D-printable and can be fabricated by modern modeling techniques which leverage machine learning for speed and accuracy during design development. Two different configurations were proposed to improve the efficiency of the parabolic antennas. For one configuration, the designed meta surface structure can be mounted on top of (or over) the parabolic antenna to reduce the illumination loss, resulting in more than 70% improvement of the efficiency at the frequency of 13 GHz. Simulation results of other frequencies showed a minimum of 40% efficiency improvement throughout the entire of Ku-band (i.e., 11-16 GHZ). For another configuration, the meta surface structure can be mounted in front of the aperture of the horn feed to reduce the spill-over loss, resulting in more than 40% improvement in efficiency at the frequency of 13 GHz. The designed meta surfaces are low weight, passive without any bias requirement with a wide band frequency response that can be a great candidate for any existing, as well as newly designed, parabolic antenna.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A highly efficient parabolic antenna, comprising:

a parabolic antenna including:

a parabolic reflector member having a frontal parabolic reflecting surface, and a feed horn antenna suspended at a focal point of said frontal parabolic reflecting surface of said parabolic reflector member, said feed horn antenna having an aperture, and a corrective meta surface structure secured at a predetermined position relative said parabolic antenna, said predetermined position being selected from a group consisting of a position in front of said frontal parabolic reflecting surface of said parabolic reflector member, in front of said feed horn antenna, within said aperture of said feed horn antenna, directly at said frontal parabolic reflecting surface of said parabolic reflector member, and a combination thereof; said corrective meta surface structure functioning as a corrective lens;

wherein said corrective meta surface structure is formed as a singular-layer structure, or as a multi-layer structure.

2. The highly efficient parabolic antenna of claim 1, wherein said corrective meta surface structure includes a plurality of unit cells interconnected with one another.

3. The highly efficient parabolic antenna of claim 2, wherein each unit cell includes a solid dielectric cubically shaped member surrounded by air.

4. The highly efficient parabolic antenna of claim 3, wherein said dielectric cubically shaped member has cell walls, wherein said each unit cell further comprises connecting members, each connecting member extending from each of said cell walls for interconnection with the neighboring unit cells in said corrective meta surface structure.

5. The highly efficient parabolic antenna of claim 4, wherein said cubically shaped member is fabricated from a dielectric material, wherein a size of a rib at said cubically shaped member ranges from 1.5 m to 10 mm, wherein each of said connecting members has a thickness of 1.5 mm, and wherein said connecting members are fabricated from said dielectric material.

6. The highly efficient parabolic antenna of claim 5, wherein said dielectric material is Zetamix ε having a dielectric constant of 7.5 and tangent loss of 0.0015.

7. The highly efficient parabolic antenna of claim 6, wherein said unit cell is printed from Zetamix ε filament by Fused Deposition Modeling (FDM), and wherein the Zetamix ε filament is a ceramic dielectric filament including 40-90% Titanium Dioxide ($TiO_2$).

8. The highly efficient parabolic antenna of claim 7, wherein said printing is performed at a printing speed of 9 mm/sec.

9. The highly efficient parabolic antenna of claim 2, wherein each unit cell of said plurality thereof has a phase range exceeding 147° of an electric field generated by the parabolic reflector member at an operating frequency of 5.85 GHz of said parabolic antenna.

10. The highly efficient parabolic antenna of claim 2, wherein each unit cell of said plurality thereof has a gyroid configuration fabricated from at least one dielectric material to create a predetermined air-to-dielectric ratio, wherein said gyroid configuration has an infinitely connected triply periodic minimal surface having a zero mean curvature.

11. The highly efficient parabolic antenna of claim 10, wherein said predetermined air-to-dielectric ratio defines an effective dielectric constant (DK) of said unit cell, said DK ranging from 1.75 to 3.05.

12. The highly efficient parabolic antenna of claim 10, wherein said dielectric material is Rogers© radix 49 having a dielectric constant of 4.9 and a tangent loss of 0.002.

13. The highly efficient parabolic antenna of claim 10, wherein said unit cell has a meshed structure with a plurality of mesh pores, each mesh pore having a size of 0.1 mm in X-Y-Z directions.

14. The highly efficient parabolic antenna of claim 13, wherein said corrective meta surface structure includes an array of said meshed unit cells fabricated by 3D printing.

15. The highly efficient parabolic antenna of claim 13, wherein said mesh pores have a configuration, selected from a group including a rectangular configuration, a hexagonal configuration, a circular configuration, an oval configuration, and a combination thereof.

16. The highly efficient parabolic antenna of claim 2, wherein said corrective meta surface structure has a phase exceeding 180° of an electric field generated by said parabolical antenna, said meta surface structure including about 805 unit cells, with each said unit cell dimensioned at 10 mm×10 mm×15 mm.

17. The highly efficient parabolic antenna of claim 2, wherein said corrective meta surface structure is a meta surface lens fabricated by 3D printing or PCB process.

18. The highly efficient parabolic antenna of claim 17, wherein said corrective meta surface structure includes an array of meta surface cell units fabricated with a polymer, said polymer including at least one of a plastic, a thermoplastic, an amorphous polymer, and acrylo-nitrile butadiene styrene (ABS).

19. The highly efficient parabolic antenna of claim 18, wherein said unit cell further includes a metallization layer disposed on said polymer, said metallization layer being fabricated from at least one of copper, silver, aluminum, gold, platinum, palladium, and steel.

20. The highly efficient parabolic antenna of claim 2, wherein said unit cell has a configuration selected from a group of a gyroid configuration, a cubical configuration, a conical configuration, and a combination thereof.

21. The highly efficient parabolic antenna of claim 2, wherein said unit cell is fabricated from a material selected from a group consisting of: a single dielectric material, multiple dielectric materials, combination of at least one dielectric material and a conductive material including copper, gold, silver, aluminum, and combination thereof.

22. The highly efficient parabolic antenna of claim 1, further comprising a support member configured with a bottom ring, a top ring, and a plurality of spacers secured between said bottom and top rings to maintain said bottom and top rings at a predetermined spaced apart configuration, wherein said bottom ring is secured to said parabolic reflector member at the frontal side thereof, and wherein said corrective meta surface structure is secured to said top ring of said support member.

23. The highly efficient parabolic antenna of claim 1, wherein said corrective meta surface structure has a configuration selected from a group of a rectangular configuration, a curved configuration, an annular configuration, and a combination thereof.

24. A method of attaining a high efficiency of a parabolic antenna, comprising:

fabricating a parabolic antenna with a parabolic reflector member having a frontal parabolic reflecting surface and a feed horn antenna suspended at a focal point of said parabolic reflector member, said feed horn antenna having an aperture, and fabricating and securing a corrective meta surface structure at a predetermined position relative said parabolic antenna, said predetermined position being selected from a group consisting of a position in front of said frontal parabolic reflecting surface of said parabolic reflector member, in front of said feed horn antenna, within said aperture of said feed horn antenna, directly at said frontal parabolic reflecting surface of said parabolic reflector member, and a combination thereof;

configuring said corrective meta surface structure with a plurality of unit cells interconnected with one another, said corrective meta surface structure functioning as a corrective lens; and fabricating said corrective meta surface structure in a configuration selected from a group of a rectangular configuration, a curved configuration, an annular configuration, as a singular-layer structure, or as a multi-layer structure, and a combination thereof.

25. The method of claim 24, fabricating each unit cell in a configuration selected from a group consisting of: (a) solid dielectric cubically shaped member surrounded by air, wherein said cubically shaped member is fabricated from at least one dielectric material, wherein a size of a rib at said cubically shaped member ranges from 1.5m to 10 mm, (b) gyroid configuration fabricated from at least one dielectric material to create a predetermined air-to-dielectric ratio, wherein said predetermined air-to-dielectric ratio defines an effective dielectric constant (DK) of said unit cell, said DK ranging from 1.75 to 3, (c) meshed structure of at least one dielectric material with a plurality of mesh pores, each mesh pore having a size of 0.1 mm in X-Y-Z directions, and a mesh pore shape selected from a group including a rectangular configuration, a hexagonal configuration, a circular configuration, an oval configuration, and (d) a combination thereof.

26. The method of claim 25, wherein said at least one dielectric material includes a polymer formed from at least one of a plastic, a thermoplastic, an amorphous polymer, and acrylo-nitrile butadiene styrene (ABS), Rogers© radix 49 material having a dielectric constant of 4.9 and a tangent loss of 0.002, Zetamix ε material having a dielectric constant of 7.5 and tangent loss of 0.0015, and a combination thereof.

27. The method of claim 26, further comprising: printing said unit cell from Zetamix ε filament at a printing speed of 9 mm/sec by Fused Deposition Modeling (FDM), wherein the Zetamix ε filament is a ceramic dielectric filament including 40-90% Titanium Dioxide ($TiO_2$).

28. The method of claim 26, further comprising: depositing a metallization layer on said polymer, said metallization layer being fabricated from at least one of copper, silver, aluminum, gold, platinum, palladium, and steel.

29. The method of claim 25, further comprising: fabricating said each unit cell from a material selected from a group consisting of: a single dielectric material, multiple dielectric materials, combination of at least one dielectric material and a conductive material including copper, gold, silver, aluminum, and combination thereof.

30. The method of claim 24, further comprising: fabricating said meta surface structure by arraying a plurality of said cell units with one another by 3D printing.

31. The method of claim 24, further comprising:

fabricating said corrective meta surface structure by 3D printing or PCB process.

* * * * *